(12) United States Patent
Zhou

(10) Patent No.: US 11,876,206 B2
(45) Date of Patent: Jan. 16, 2024

(54) COMPACT UNIT OF REFILLABLE ALUMINUM-AIR BATTERY WITH CONCURRENT HYDROGEN UTILIZATION SYSTEM

(71) Applicant: Dai Zhou, New York, NY (US)

(72) Inventor: Dai Zhou, New York, NY (US)

( * ) Notice: Subject to any disclaimer, the term of this patent is extended or adjusted under 35 U.S.C. 154(b) by 402 days.

(21) Appl. No.: 16/746,816

(22) Filed: Jan. 18, 2020

(65) Prior Publication Data

US 2020/0313263 A1    Oct. 1, 2020

Related U.S. Application Data

(60) Provisional application No. 62/827,168, filed on Mar. 31, 2019.

(51) Int. Cl.
*H01M 12/02* (2006.01)
*H01M 12/06* (2006.01)

(52) U.S. Cl.
CPC ........... *H01M 12/02* (2013.01); *H01M 12/06* (2013.01)

(58) Field of Classification Search
CPC .............................. H01M 12/02; H01M 12/06
See application file for complete search history.

(56) References Cited

U.S. PATENT DOCUMENTS

| | | | | |
|---|---|---|---|---|
| 2008/0096087 A1* | 4/2008 | Kulakov | ............... | H01M 50/77 429/421 |
| 2015/0050568 A1* | 2/2015 | Wang | .................. | H01M 12/065 429/405 |
| 2017/0170451 A1* | 6/2017 | Englert | ................. | H01M 50/55 |
| 2020/0136153 A1* | 4/2020 | Jaramillo | ................ | H01M 6/52 |

FOREIGN PATENT DOCUMENTS

CN       207705359 U  *  8/2018

* cited by examiner

*Primary Examiner* — Jonathan G Jelsma
(74) *Attorney, Agent, or Firm* — Lambert Shortell & Connaughton; David J. Connaughton, Jr.; Justin P. Tinger

(57) ABSTRACT

A compact battery unit of refillable aluminum-air battery with concurrent hydrogen utilization system comprises a stack core, an electrolyte circulation system, an air circulation system, a hydrogen fuel battery and hydrogen storage facility. The stack core is assembled by one or more cylindrical cells, a cell base, a cell house, an electrolyte cover, an air cover, a hydrogen cover, an electrolyte outlet sink, a electrolyte inlet chamber, soft pipes and a vibrator. The cylindrical cell is further assembled from a cylindrical cathode and a cylindrical anode. The cylindrical cathode comprises a multi-layer cathode electrode, a support frame and a cathode electric connector. And the cylindrical anode comprises an electric-conductive frame, anode membrane meshes, granular aluminia etc. Strong alkaline electrolyte, such as NaOH, is used to make it possible to mechanically recharge the aluminum-air battery.

11 Claims, 31 Drawing Sheets

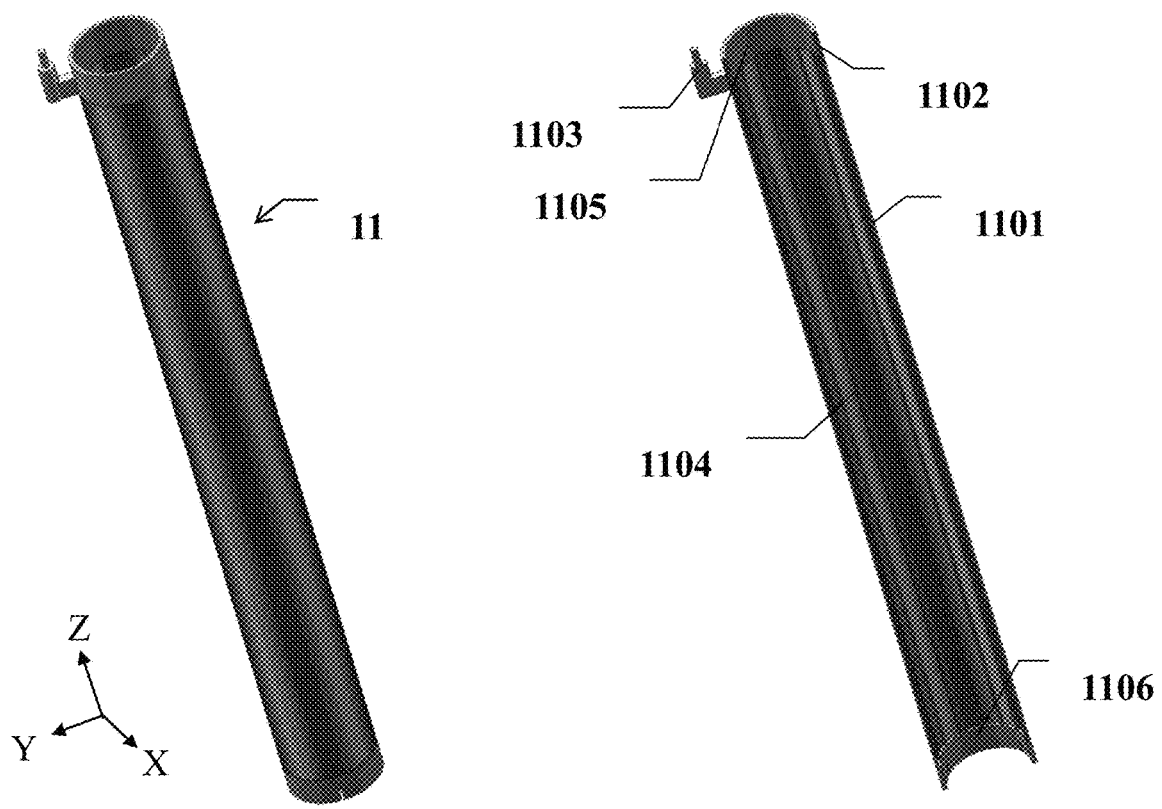
FIG. 4
FIG. 4A
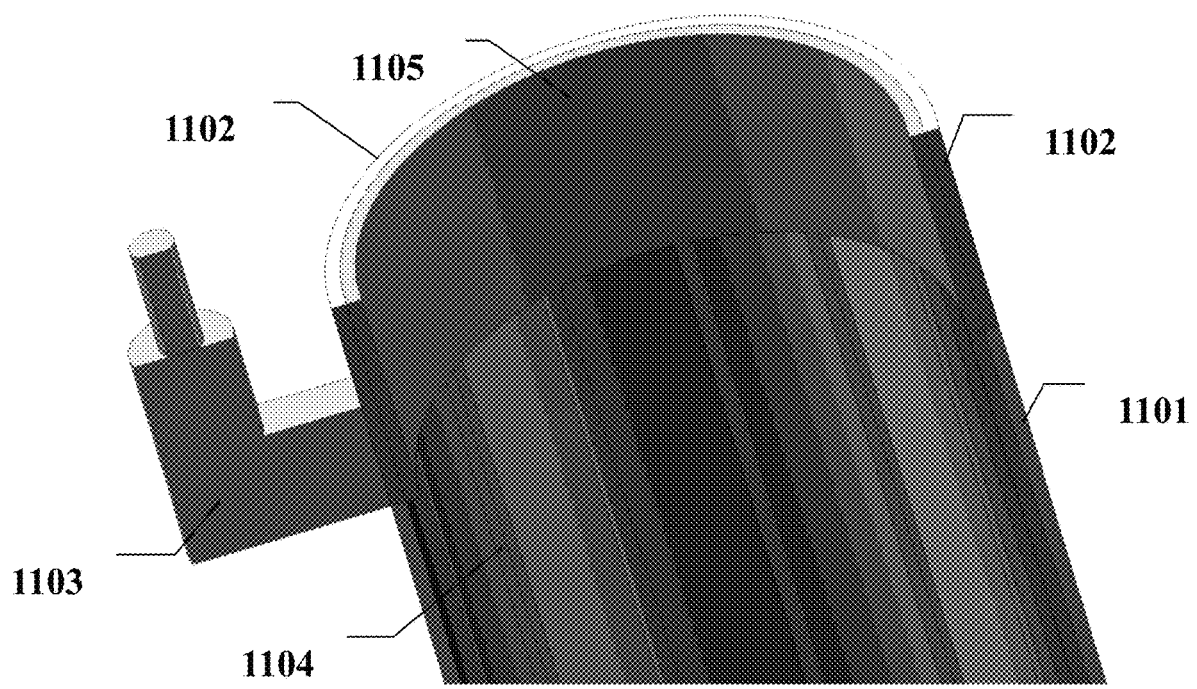
FIG. 4B

COMPACT UNIT OF REFILLABLE ALUMINUM-AIR BATTERY WITH CONCURRENT HYDROGEN UTILIZATION SYSTEM

BACKGROUND OF THE INVENTION

This invention relates to a metal-air battery, in particular to an aluminum-air battery. And it also relate to a hydrogen fuel battery for which hydrogen fuel is generated at the same time when an aluminum-air battery operates.

The aluminum-air battery is a metal-air electrochemical cell or battery that uses oxidation of aluminum at an anode and reduction of oxygen at an air cathode to induce current flow. Typically the air cathode is a sheet-like member, having opposite surfaces respectively exposed to the atmosphere and to the aqueous electrolyte of the cell.

Once the aluminium anode is consumed by its reaction with atmospheric oxygen at a cathode immersed in a water-based electrolyte to form hydrated aluminium oxide, the battery will no longer produce electricity. However, it is possible to mechanically recharge the battery with new aluminium anodes made from recycling the hydrated aluminium oxide. Such recycling would be essential if aluminum-air batteries are to be widely adopted. Strong alkaline electrolyte NaOH may be used to allow the retreatment of alumina via the industrial Hall-Heroult process.

The prior art of metal-air batteries was disclosed by U.S. Pat. Nos. 3,598,655, 3,518,123, 4,551,399, 4,756,980, 4,925,744. These patents explain flat-plate (or semi-wedge flat-plate) structures of electrodes and structures how to replace consumable anodes. However these flat-plate structures are not good enough to bring the metal-air batteries into wide-ranging industry application. For large scale industry application, such as electric vehicle application, of aluminum-air batteries, following problems need to be solved.

(1) It is inconvenient for a car driver to remove hundreds of aluminum-anode mounts from a cell stack and replace with hundreds of mechanically recharged aluminum anodes on the mounts each time when the aluminum anodes are consumed (2) Hydrogen from the aluminum-air battery may be hazardous. A special structure has to be designed so that the hydrogen can be separated from the electrolyte and air of the battery, and can be made use in a safe way.

(3) Electrolyte-circulation passage must be specially designed to enhance electrolyte-ion conductivity in electrolyte-ion-conductive chamber and to decrease the accumulation of the aluminates $Al(OH)_4^-$ on the anode aluminium surface.

(4) For flat-plate electrodes, the gap between the air cathode and the aluminium anode increases with the battery discharging and the aluminium anode consuming. This will increase the internal resistance of the battery and depress the battery discharge efficiency.

So the objects of present invention are: to present a new structure of cell and cell stack so that the anodes can be refilled with granular aluminia just like a car tank refilled with oil; to give a new structure of cell and cell stack so that the hydrogen can be collected and can be used as fuel source for hydrogen fuel battery; to construct an electrolyte-circulation passageway so that electrolyte-ion conductivity can be increased; to adopt a new structure of cell so that the cathode-anode gap can be kept unchanged during the battery discharge; to provide a robust, compact, integrated structure for high power batteries.

This invention is useful for environmentally friendly vehicles, such as cars, buses, trucks, unmanned air vehicles, unmanned sea or underwater vehicles.

BRIEF SUMMARY OF THE INVENTION

Present invention includes an aqueous electrolyte aluminum-air battery and a hydrogen utilization system. The aluminum-air battery comprises a stack core, an electrolyte circulation system and an air circulation system. The hydrogen utilization system comprises a hydrogen fuel battery and hydrogen storage facility. The hydrogen, needed for the hydrogen fuel battery, is generated by the aluminum-air battery when it operates. Strong alkaline electrolyte NaOH is used to make it possible to mechanically recharging the battery. The material used for manufacturing the battery is inactive of the electrolyte.

The stack core consists of one or more cylindrical cells, a cell base, a cell house, a electrolyte cover, an air cover, a hydrogen cover, a electrolyte outlet sink, a electrolyte inlet chamber, soft pipes of various diameters and a vibrator. All these components are assembled to form hydrogen channels, electrolyte channels and a sharing air channel for all cells.

Each cell comprises a cylindrical cathode of larger diameter and a cylindrical anode of smaller diameter so that the cylindrical gap between the cathode and the anode define an electrolyte ion-conductive chamber which is a cylindrical ring-shaped space separated by vertical beams. The cathode comprises a multi-layer cathode electrode, a support frame and a cathode electric connector. The support frame is made of non-conductive material inactive to the electrolyte. It serves not only as a holding and strengthening structure for the cathode electrode, but also as a separated structure to prevent the cathode electrode and the anode from short circuit. The cathode electrode of each cathode typically consists of a catalytic active layer, a hydrophobic layer and a current collector. The catalytic active layer (AL) provides multiple three-phase contact points where gas, electrolyte and carbon supported catalyst meet so that oxygen reduction can occur. The hydrophobic layer (also called gas-diffusion layer) supplies the reactant gas to the active layer and prevents the liquid electrolyte from passing through the cathode. Typically the current collector is a nickel mesh. On the top of the cylindrical cathode, there is a cathode terminal of the cathode electric connector which is connected to the current collector. Outside the cylinders of the cathodes and within the cell house, there is a residual space called cathode-air chamber, between the cathodes, full of the reactant gas. Inside the cylinder of each cathode, the electrolyte flows through the said electrolyte ion-conductive chamber.

The anode of each cell typically consists of a electric-conductive frame (also called anode frame), anode membrane meshes, an anode terminal, a mechanical spring lid and granular aluminia which are filled within the frame. The electric-conductive frame has a construction of two cylinders, with curve-plate thickness of about 3% cylinder diameter, which are made of metal material, such as nickel, inactive to the electrolyte. An annular cylindrical space between the interior cylinder and the exterior cylinder is designed for holding the granular aluminia. This annular cylindrical space may be called granular-aluminium reactant chamber within which the aluminum oxidation occurs. At the bottom of the said two cylinders, there is an annular flat end-plate serving as a connecting structure and also serve as a holding structure to prevent the granular aluminia from leaking from the granular-aluminium reactant chamber. The end-plate is perforated as a porous plate with hole diameter of 1.0 to 5.0 micron so that seed crystals in electrolyte can pass through the holes. The seed crystals are added to the electrolyte to aid precipitation of aluminium hydroxide $Al(OH)_3$ from the electrolyte. Also the seed crystals in electrolyte come from the granular aluminium minified due to the oxidation reaction in the granular-aluminium reactant chamber. This means the seed crystals may not always need to be added from outside of the stack core. The height of the interior cylinder, which is in accord with cathode height, depends on the requirement of the cell current output. At the top of the interior cylinder, there is a cone-shaped cap. Beneath the cone-shaped cap, the space within the interior cylinder forms a cylindrical electrolyte-passageway space for electrolyte circulation from an electrode electrolyte inlet at the bottom of the interior cylinder. Through the multiple holes on the curve surfaces of the interior cylinder and the exterior cylinder, and through the apertures among the granular-aluminia, the electrolyte is further circulated into electrolyte ion-conductive chamber. This passageway stated above may be called anode electrolyte-circulation passageway. The electrolyte inlet at the bottom of the interior cylinder is called electrode electrolyte inlet. Cells are mounted on the cell base. The electrode electrolyte outlet is formed through the multiple holes on the cell base at the bottom of the electrolyte ion-conductive chamber. The diameters of the holes on the curve surfaces of the interior cylinder and the exterior cylinder vary from about 2.5 millimeter at the bottom to 5.0 millimeter at the top. This variation of perforated rate in height direction controls the flowing pattern of the electrolyte circulation in the electrolyte ion-conductive chamber. The anode electrolyte-circulation passageway is designed to make the electrolyte enter the electrolyte-ion-conductive chamber in a direction paralleled to the direction of the electrolyte ion moving to enhance electrolyte-ion conductivity, and also to make the aluminates diffuse easily away from the granular-aluminium surface. On the external surface of the exterior cylinder and on the internal surface of the interior cylinder, there are concentric tube-shaped membrane meshes (also called anode membrane mesh) covered. The meshes should be electric-conductive and inactive to the electrolyte with apertures of 1.0 to 5.0 micron, typically made of nickel. The meshes should electrically be connected to the electric-conductive frame. There are several beams (typically three beams) connecting the interior cylinder and the exterior cylinder to strength the anode frame and also to increase the electric-conductivity of the anode frame. The granular aluminia typically have diameter of 2.3 millimeter which is much larger than the end-plate hole diameter and the apertures of the anode membrane meshes, and is smaller than the gap distance of the granular-aluminium reactant chamber.

To lead out the electric current and hydrogen, and also to increase the storage of the granular aluminia for increasing cell power output, the exterior cylinder is extended above the cone-shaped cap of the interior cylinder. This means the exterior cylinder have lower part, called electrolyte-immerged cylinder with the same height with granular-aluminium reactant chamber, and the upper part called current-hydrogen lead-out cylinder. The current-hydrogen lead-out cylinder also serves for sealing the electrolyte, air and hydrogen through the cell base, the electrolyte cover, the air cover, the hydrogen cover with help of screw threads on the current-hydrogen lead-out cylinder, and with help of the screw nuts with PTFE (polytetrafluoroethylene) sealing tape. The inner space of the current-hydrogen lead-out cylinder forms a storage space of the granular aluminia to supply the granular aluminia for replacing the consumed granular aluminia in the granular-aluminium reactant chamber. It also provides a passageway for granular-aluminium loading. On the top of the exterior cylinder there is a mechanical spring lid to press the granular aluminia so that the granular aluminia can contact tightly for increasing the electric-conductivity of the granular aluminia. The lid is perforated with hole or holes to allow the hydrogen escape. Also there are holes at the position leveled with the top of the electrolyte ion-conductive chamber on the exterior cylinder. These holes provide passages for hydrogen escaping from the electrolyte ion-conductive chamber entering the current-hydrogen lead-out cylinder. At the upper part of the current-hydrogen lead-out cylinder there is an anode terminal.

All the cells are assembled on the cell base. The electrolyte inlet chamber, the electrolyte outlet sink, the cell base, the cell house, the electrolyte cover, the air cover, the hydrogen cover are assembled orderly from the bottom to the top of the stack core. On the right side of the electrolyte inlet chamber there are two stack-electrolyte inlets which intake the electrolyte to the electrolyte inlet chamber. From the electrolyte inlet chamber, the electrolyte is introduced to the electrode electrolyte inlets and their connected electrolyte-inlet nozzles on the cell base through multiple soft pipes which penetrate the electrolyte outlet sink. It flows over the anode electrolyte-circulation passageway and the electrolyte ion-conductive chamber. Then it drains into the electrolyte outlet sink through a group of the electrode electrolyte outlets and their connected electrolyte-outlet holes on the cell base. On the right side of the electrolyte inlet chamber there are two stack-electrolyte outlets which are connected to the electrolyte outlet sink through two soft pipes. From the stack-electrolyte outlets, the electrolyte circulates out and flow into the electrolyte circulation system in the outside of the stack core.

On the right side of the electrolyte inlet chamber there are two stack-air inlets. From the stack-air inlets, the air is taken into a sink-air-intake room through two soft pipes. Then from the sink-air-intake room, the air flows into the cathode-air chamber through a group of soft pipes connected to the air-inlet nozzles under the cell base. On the electrolyte cover, there are holes for the cathode terminals to pass through. And the holes also serve as passages through which the air in the cathode-air chamber flows into the terminal-air compartment which is the space confined by the electrolyte cover and the air cover. From the terminal-air compartment, the air flows out through the air-outlet nozzles under the flange of the electrolyte cover. There are two ways to handle the air to make it circulate out the terminal-air compartment. One is to dump it into the ambient atmosphere. Another is to lead the air to the air collectors under the rims of the electrolyte inlet chamber through the soft pipes connected between the air collectors and the air-outlet nozzles. From the air collectors, two stack air outlet are arranged for the air to circulate into the air circulation system outside the stack core. In this way the air circulation pressure can be better controlled. Besides, cathode terminals and anode terminals within the terminal-air compartment are electrically connected in series. And then it connects to two stack terminals under the flange of the electrolyte cover.

The space formed between the air cover and the hydrogen cover is called hydrogen-collecting room. The hydrogen, originated in the electrolyte ion-conductive chamber and the granular-aluminium reactant chamber, rises up to the hydrogen-collecting room through current-hydrogen lead-out cylinder. Then it is led to the hydrogen utilization system through the hydrogen outlet nozzles on the hydrogen cover.

The stack core is installed on the seat of vehicles through vibration isolators. A vibrator is installed on the bottom of the electrolyte inlet chamber to make the stack core vibrate when it is necessary to prevent cathode pores and anode membrane mesh pores from blocking, and also to make the granular-aluminia contact tightly for enhancing the electric conductivity. Inside the stack core there are various sensors for measuring pressures, temperatures, voltages, electric currents so that the running of the battery unit is controllable with help of circulation systems.

The electrolyte circulation system is located outside the stack core. It includes pipes, valves, powder-water mixing pump, precipitate-filtering pump, heat exchangers, storage tanks etc. Its functions include maintaining the electrolyte circulation, controlling the electrolyte pressure and temperature, filtering the precipitates of aluminum hydroxide $Al(OH)_3$ from the electrolyte, producing the fresh electrolyte from fresh water and sodium-hydroxide powder, adding the seed crystals of hydrargillite (alumina trihydrate) to promote the crystallization of aluminates into insoluble $Al(OH)_3$, quickly removing and injecting the electrolyte for the battery shutting down and starting up.

The air circulation system includes pipes, valves, an air pump, an air-heat exchanger etc. Its functions include maintaining the air circulation, controlling the air pressure, temperature and flow speed through controlling elements such as valves, the air pump and the air-heat exchanger.

The hydrogen utilization system comprises a hydrogen-fuel battery and a hydrogen storage facility. The hydrogen-fuel battery (HFB) has similar structure with the aluminum-air battery (AAB). A cell of HFB can be originated from the cell of AAB by making some changes: (1) taking the electrolyte inlet passageway of AAB as a hydrogen inlet passageway of HFB, (2) extending the interior cylinder of the anode frame upward to form a hydrogen outlet passageway of HFB, (3) making the granular aluminia, the exterior anode membrane mesh and the interior anode membrane mesh of AAB replaced by a hydrogen-diffusion electrode of HFB. For the stack core, the changes should be made as (1) taking the electrolyte inlet chamber of AAB as a hydrogen inlet chamber of HFB, (2) adding an electrolyte outlet cover of HFB between the air cover and the hydrogen cover. The hydrogen storage facility includes pipes, valves, air pumps, a hydrogen reserve vessel etc. The functions of hydrogen utilization system include adjusting the electric power demand for an AAB powered vehicle, storing the spare hydrogen into the hydrogen reserve vessel and controlling the hydrogen supply pressure.

BRIEF DESCRIPTION OF THE DRAWING VIEWS

Definition of directions in figures: Upper and lower directions are respectively defined as positive and negative directions of Z coordinate. Right and left directions are respectively defined as positive and negative directions of X coordinate. Front and rear directions are respectively defined as positive and negative directions of Y coordinate.

A arrow of a lead line in the figures may means an entire component or an entire assembled unit, a space it pointed, a flow direction of a fluid (or granular aluminium flow) passageway. It can be differentiated from the context or the figure situation.

FIG. 1 is a schematic diagram of an aluminum-air battery and a hydrogen utilization system embodying the principle of the present invention and showing the relations between the battery different components.

FIG. 2 is an isometric view of an assembled stack core of an aluminum-air battery embodying the present invention with no soft pipes assembled. FIG. 2A is a semi-assembled view of the FIG. 2 showing inside cells. FIG. 2B is soft pipes which have not been assembled to the stack core.

FIG. 3 is an assembled cylindrical cell. FIG. 3A is a cathode and an anode on the position for assembly. FIG. 3B is a cylindrical cell assembled from a cathode and an anode in half way.

FIG. 3C is a sectional view of the FIG. 3. FIG. 3D is a partial enlargement on the upper part of the FIG. 3C. FIG. 3E is a partial enlargement on the lower part of the FIG. 3C.

FIG. 4 shows an assembled cathode. FIG. 4A is a sectional view of the FIG. 4. FIG. 4B is a partial enlargement on the upper part of the FIG. 4A. FIG. 4C is a partial enlargement on the lower part of the FIG. 4A.

FIG. 5 shows an assembled anode without granular aluminia loaded. FIG. 5A is an anode frame and an exterior anode membrane mesh on the position for assembly. FIG. 5B is an anode frame and an interior anode membrane mesh on the position for assembly, with the exterior anode membrane mesh assembled on the anode frame. FIG. 5C shows an exterior anode membrane mesh. FIG. 5D shows an interior anode membrane mesh, FIG. 5E shows an anode terminal.

FIG. 5F is an anode frame of the anode. FIG. 5G is a sectional view of the FIG. 5F. FIG. 5H is a partial enlargement on the upper part of the FIG. 5G. FIG. 5I is a partial enlargement on the lower part of the FIG. 5G. FIG. 5J is a cutaway view with the upper part removed from the position 5a-5a of the FIG. 5F. FIG. 5K is a partial enlargement on the upper part of the FIG. 5J. FIG. 5L is a cutaway view with the upper part removed from the position 5b-5b of the FIG. 5F. FIG. 5M is a cutaway view with the upper part removed from the position 5c-5c of the FIG. 5F.

FIG. 6 is a cell base. FIG. 6A is a partial enlargement on the left-front part of the FIG. 6. FIG. 6B is the cell base viewing from a lower position. FIG. 6C is a partial enlargement on the left-front part of the FIG. 6B. FIG. 6D is the cell base viewing from the directly upper position. FIG. 6E is the cell base viewing from the directly lower position.

Figure 10:
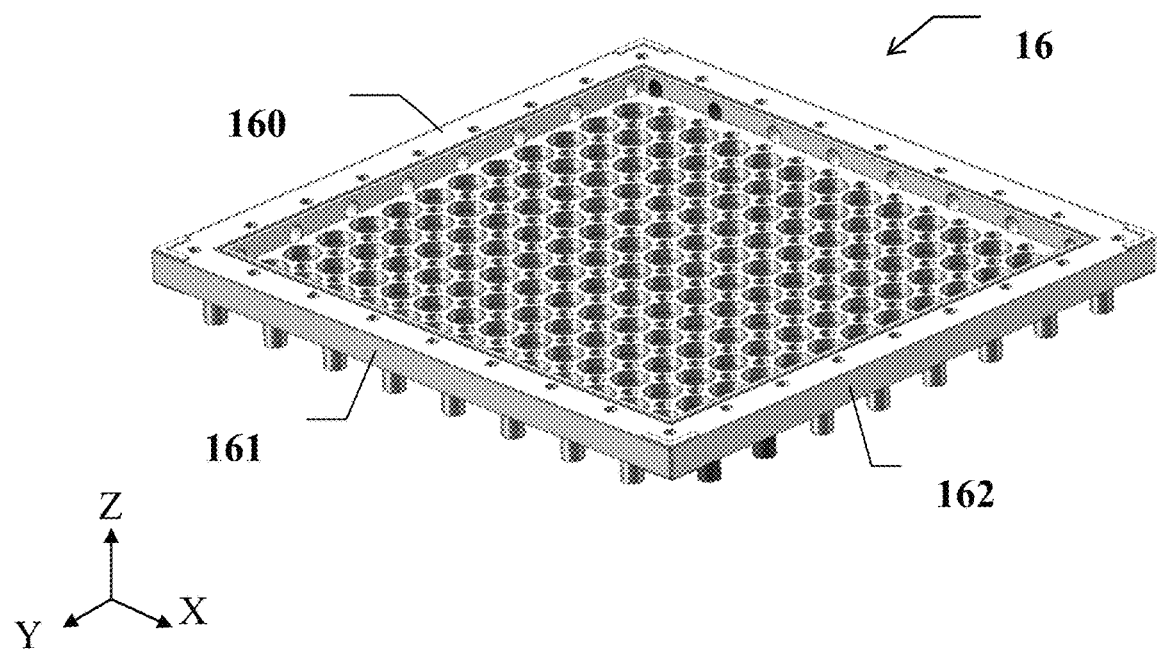
Figure 10A:
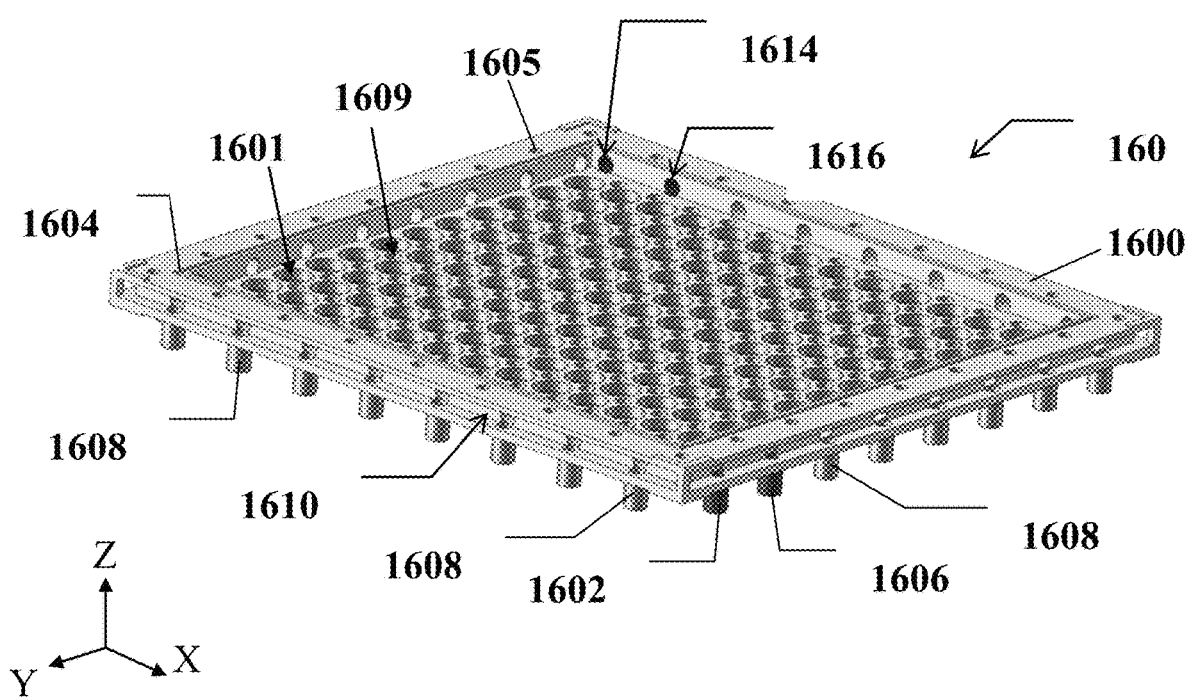
Figure 10B:
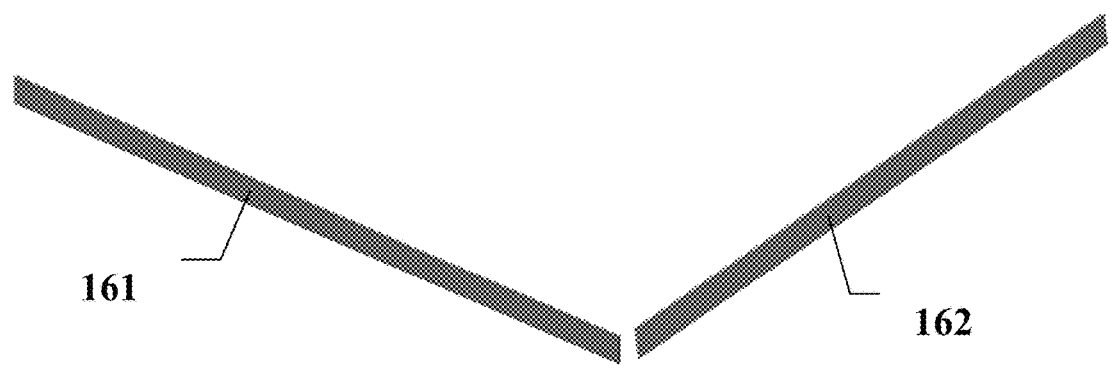
Figure 10C:
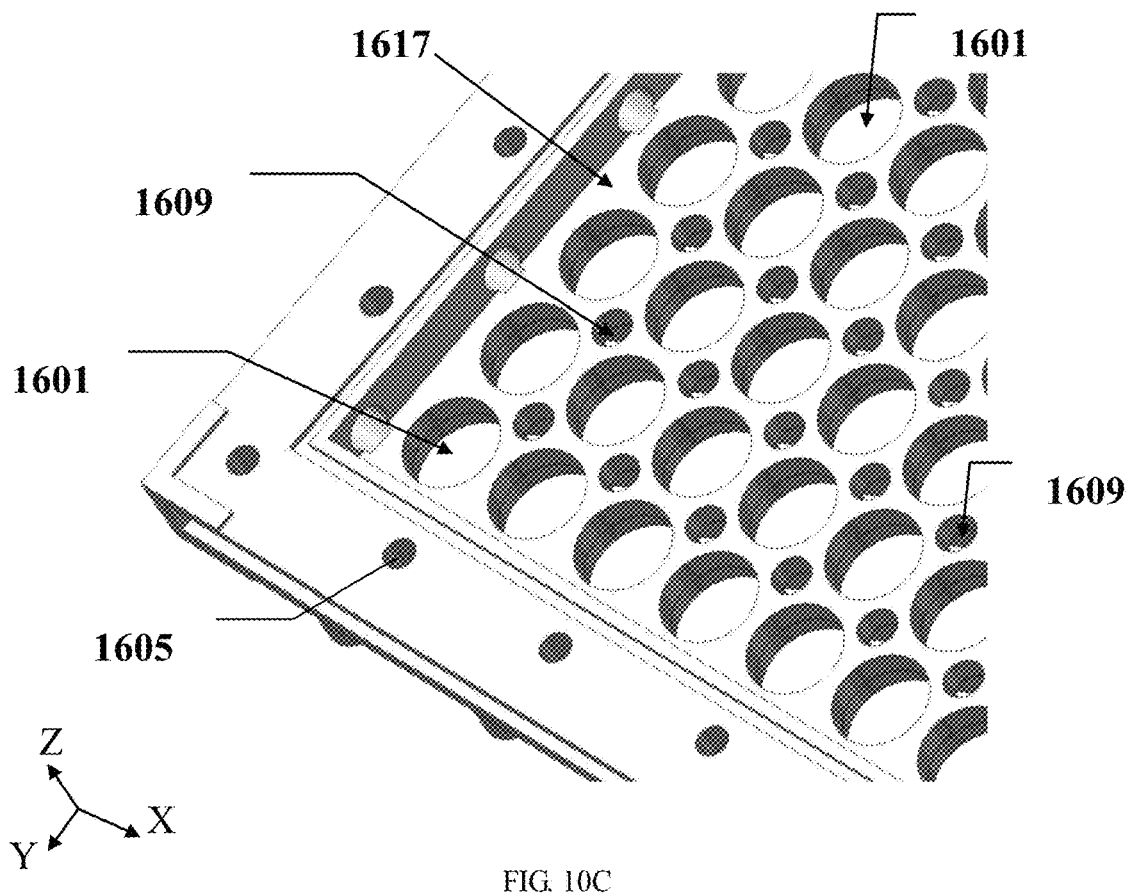
Figure 10D:
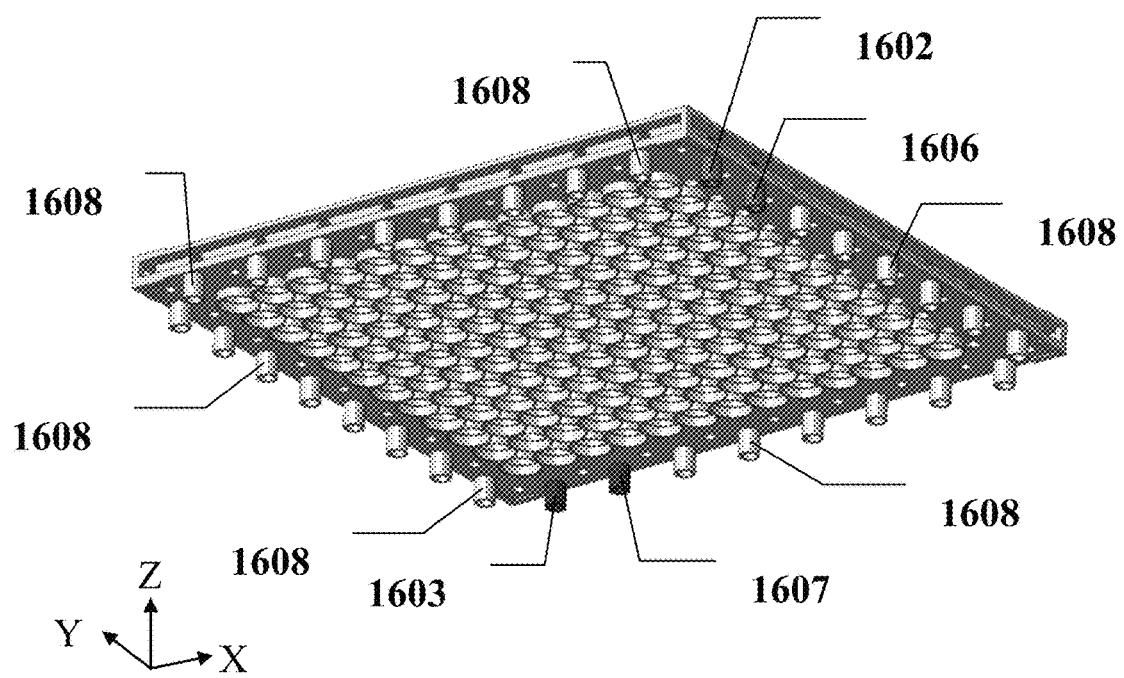
Figure 10E:
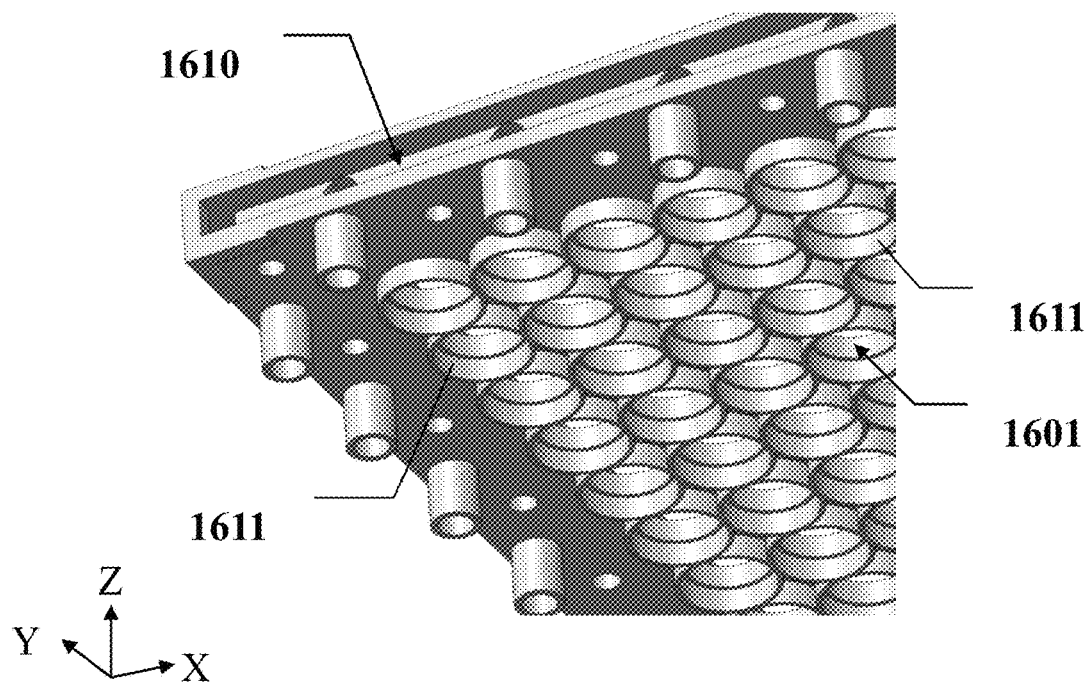
Figure 10F:
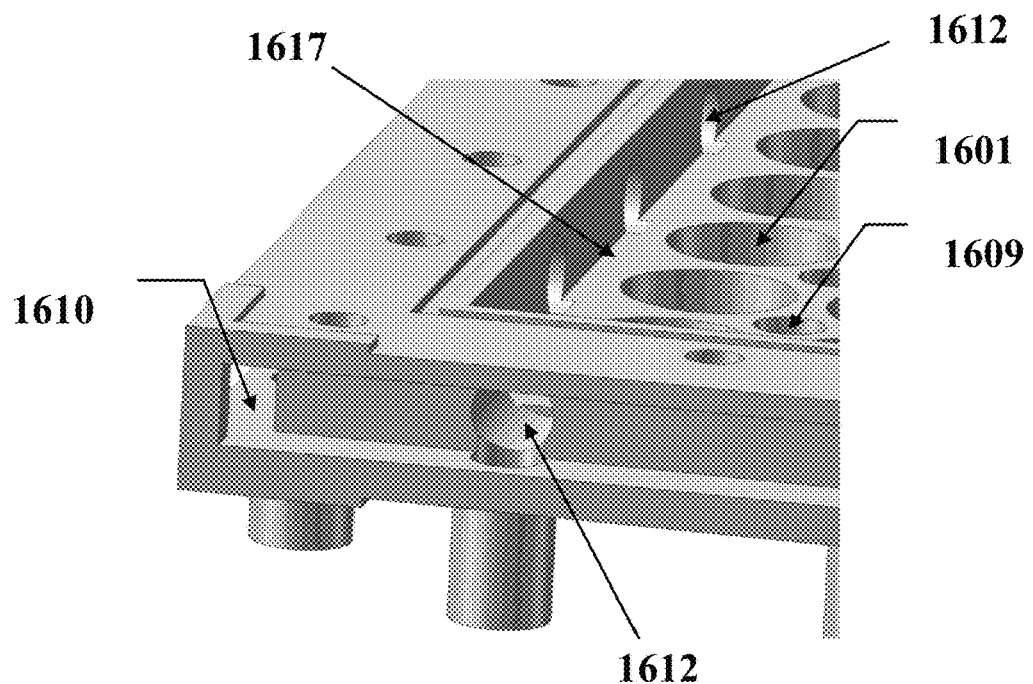
Figure 10G:
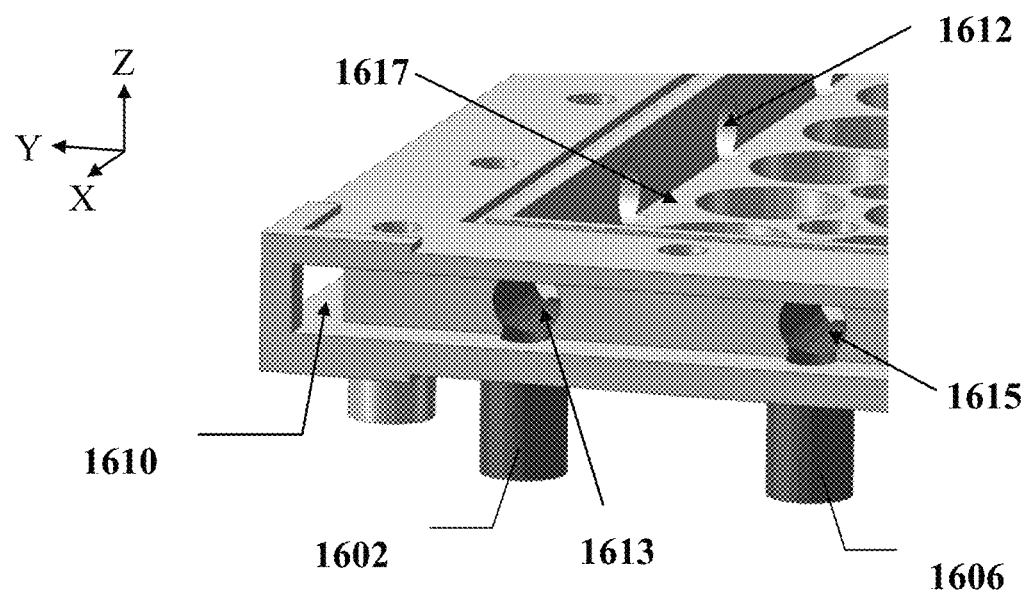
Figure 10H:
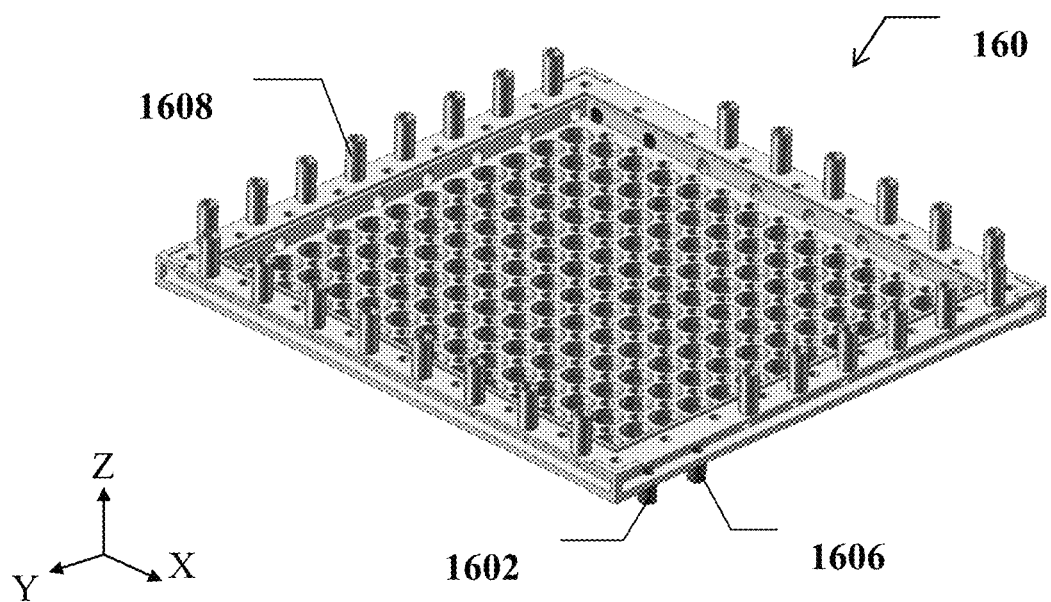

FIG. 10 is an electrolyte cover. FIG. 10A is the electrolyte cover removed the air-sealing side plates. FIG. 10B is air-sealing side plates of the electrolyte cover. FIG. 10C is a partial enlargement on the left-front part of the FIG. 10A with viewing angle further moved toward upper position. FIG. 10D is the FIG. 10A viewing from a lower position. FIG. 10E is a partial enlargement on the left-front part of the FIG. 10D. FIG. 10F is a partial enlargement on the left-front part of the FIG. 10A. FIG. 10G is a partial enlargement on the right-front part of the FIG. 10A viewing from right-upper position. FIG. 10H is the FIG. 10A with air outlet nozzles mounted upward.

Figure 9:
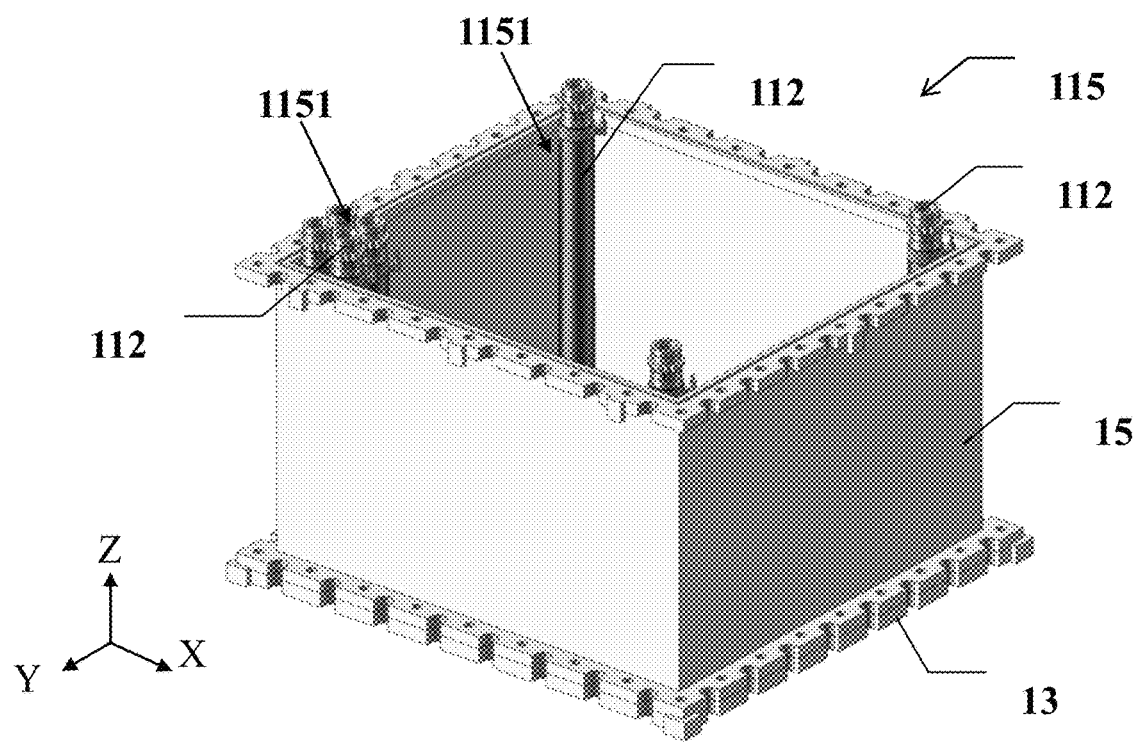
FIG. 9 is the FIG. 7A assembled with a cell house.
Figure 11:
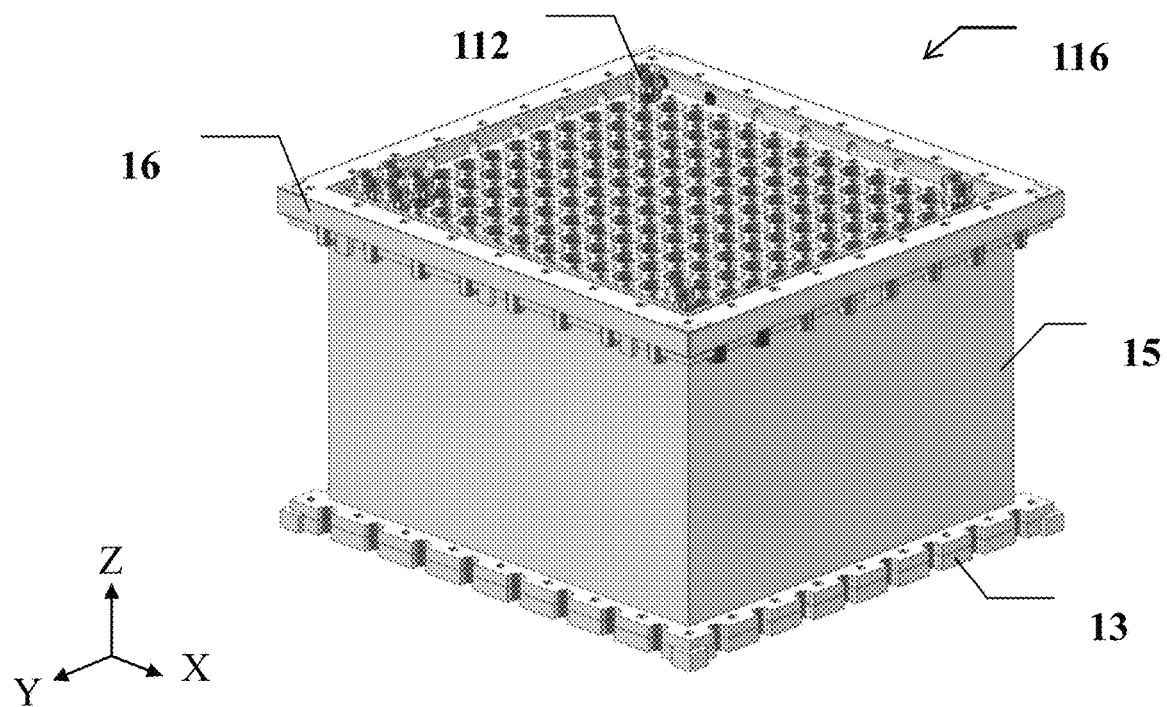
Figure 11A:
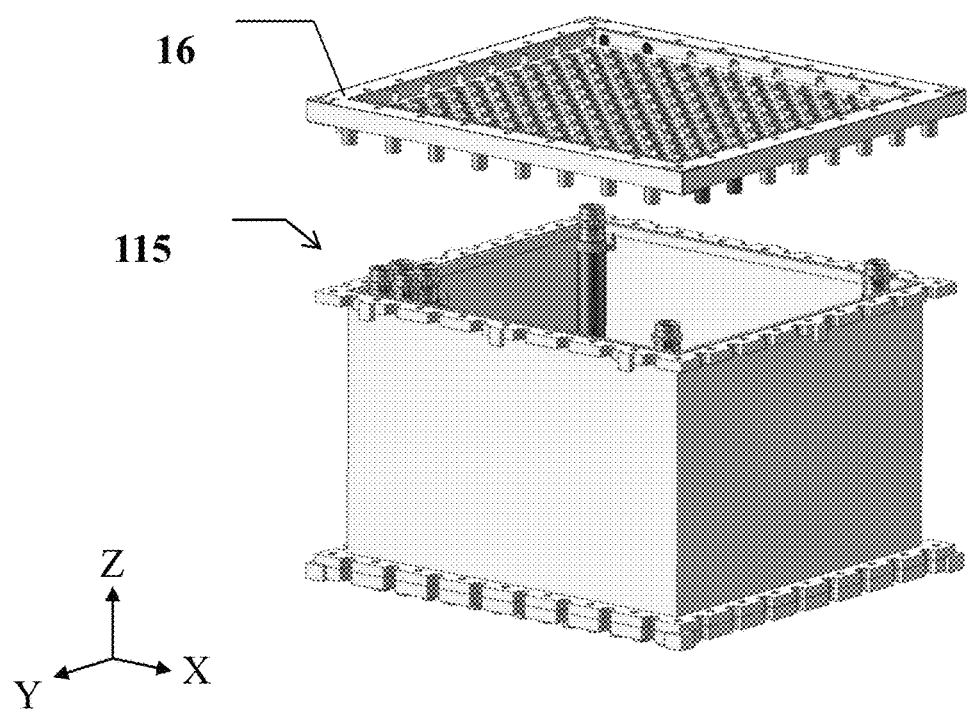
Figure 11B:
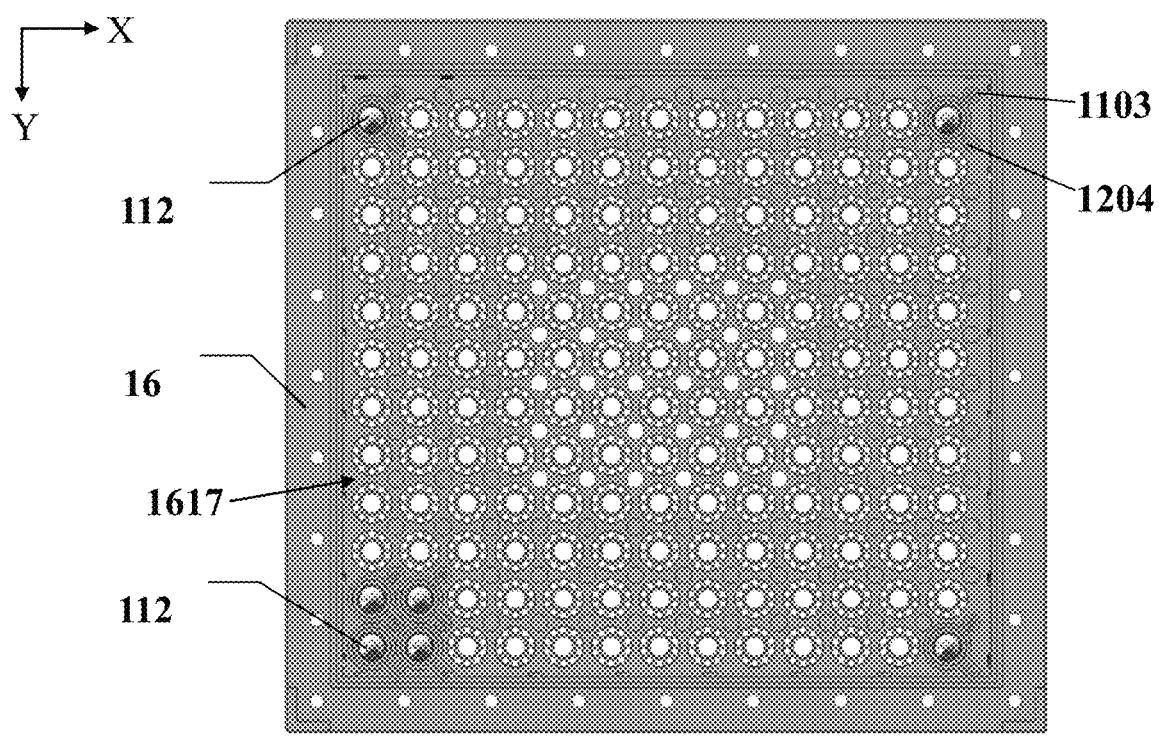

FIG. 11 is the FIG. 9 assembled with the electrolyte cover. FIG. 11A is the FIG. 9 with the electrolyte cover in the position for assembly. FIG. 11B is the FIG. 11 viewing in right downward direction.

Figure 12:
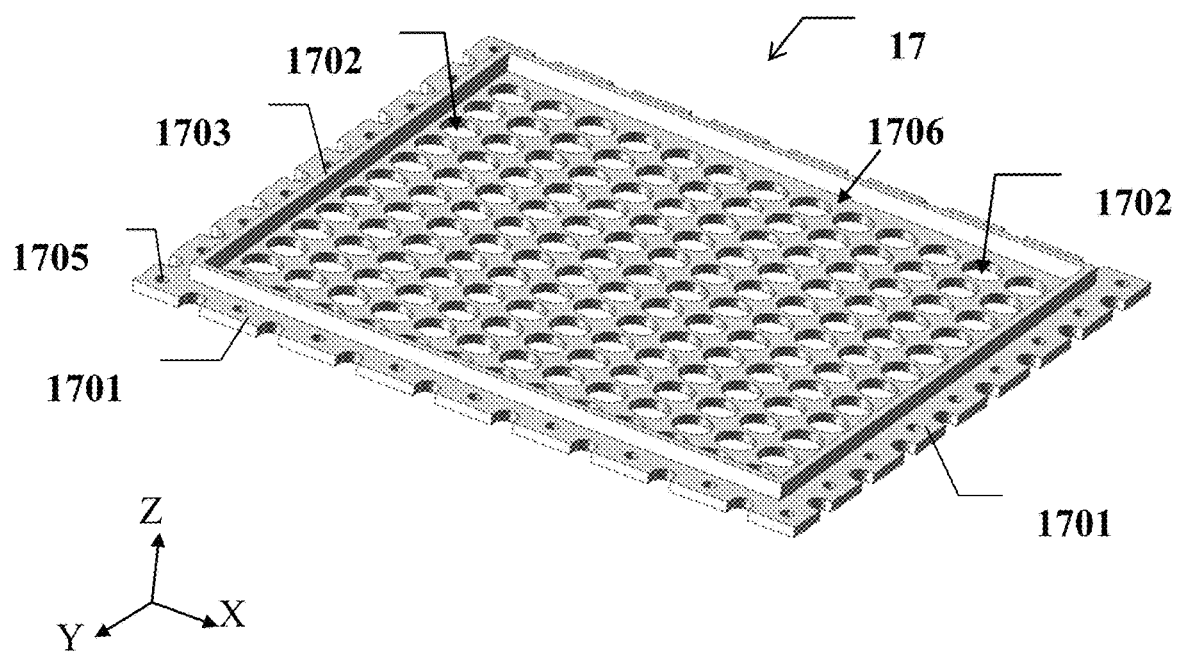

FIG. 12 is an air cover.

Figure 13:
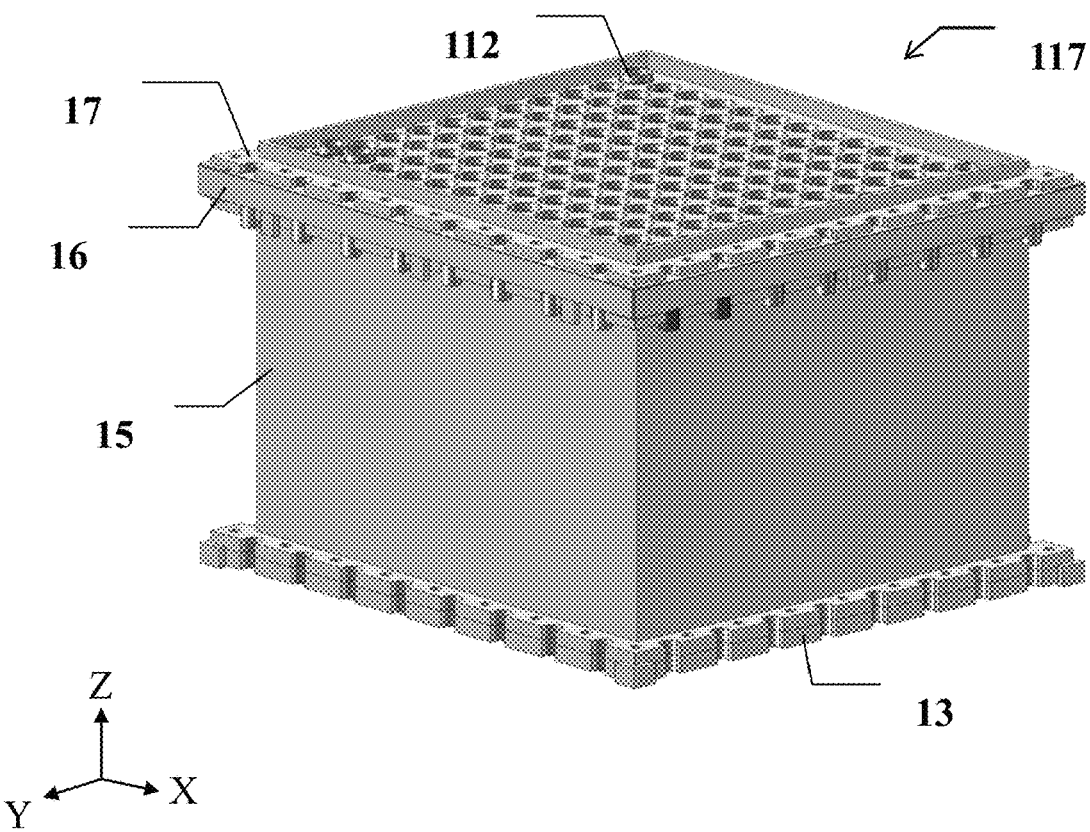
Figure 13A:
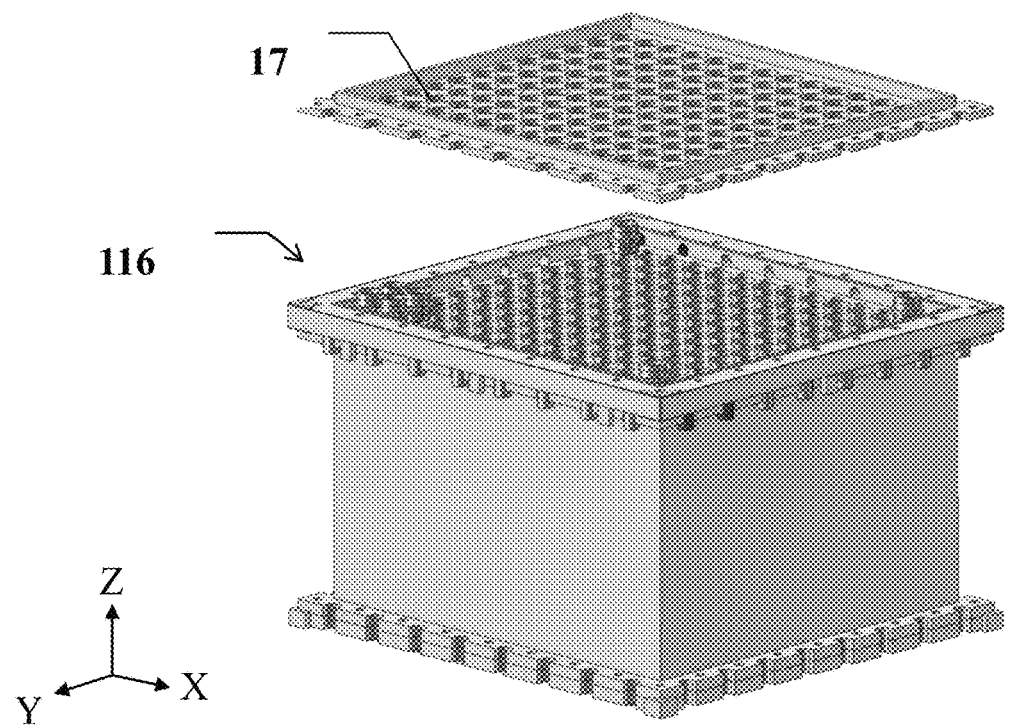

FIG. 13 is the FIG. 11 assembled with the air cover. FIG. 13A is the FIG. 13 with the air cover in the position for assembly.

Figure 14:
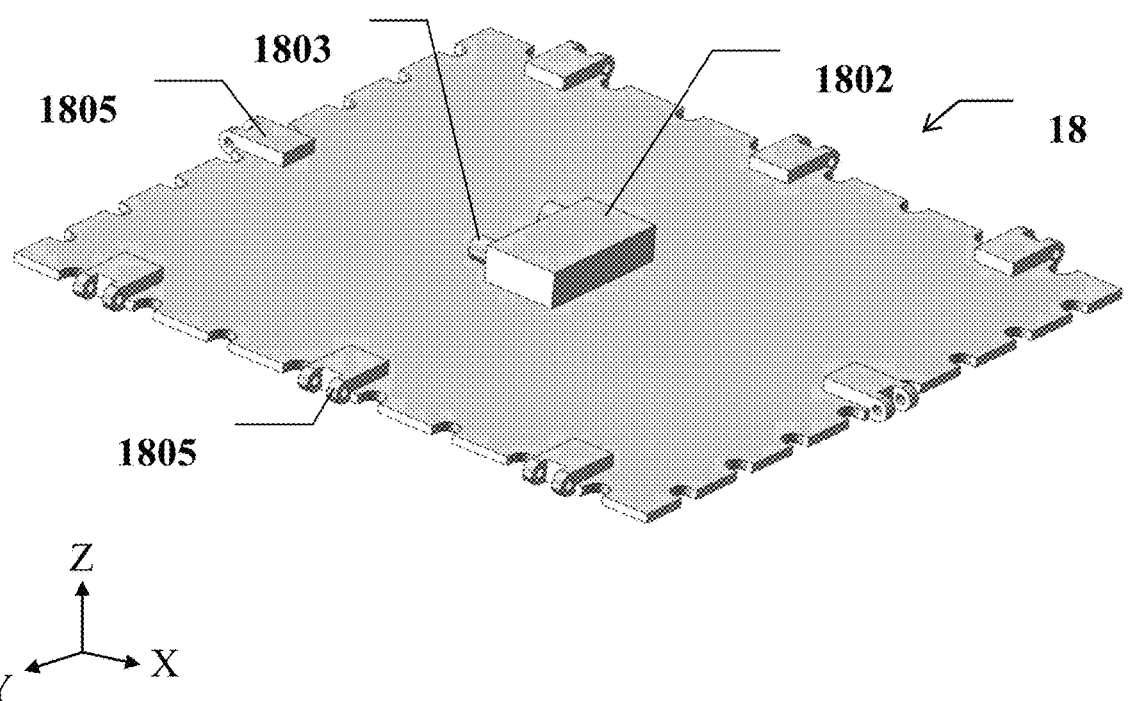
Figure 14A:
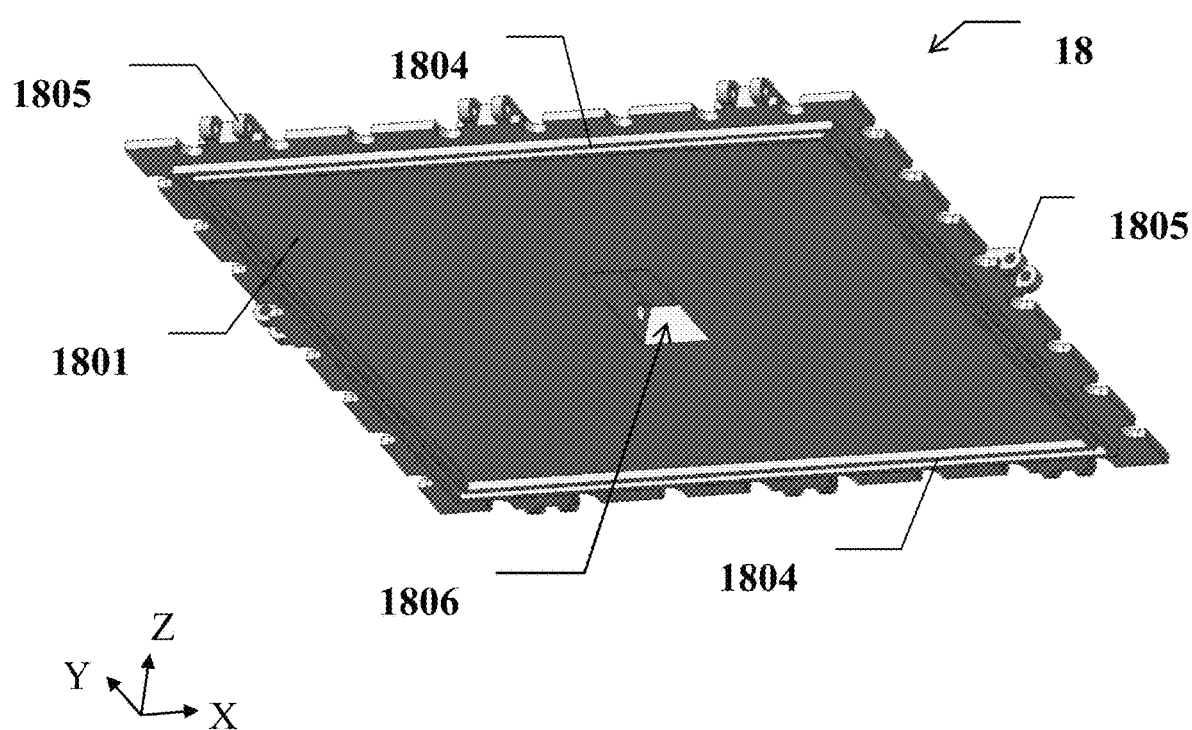

FIG. 14 is a hydrogen cover. FIG. 14A is the FIG. 14 viewing from a lower position.

Figure 15:
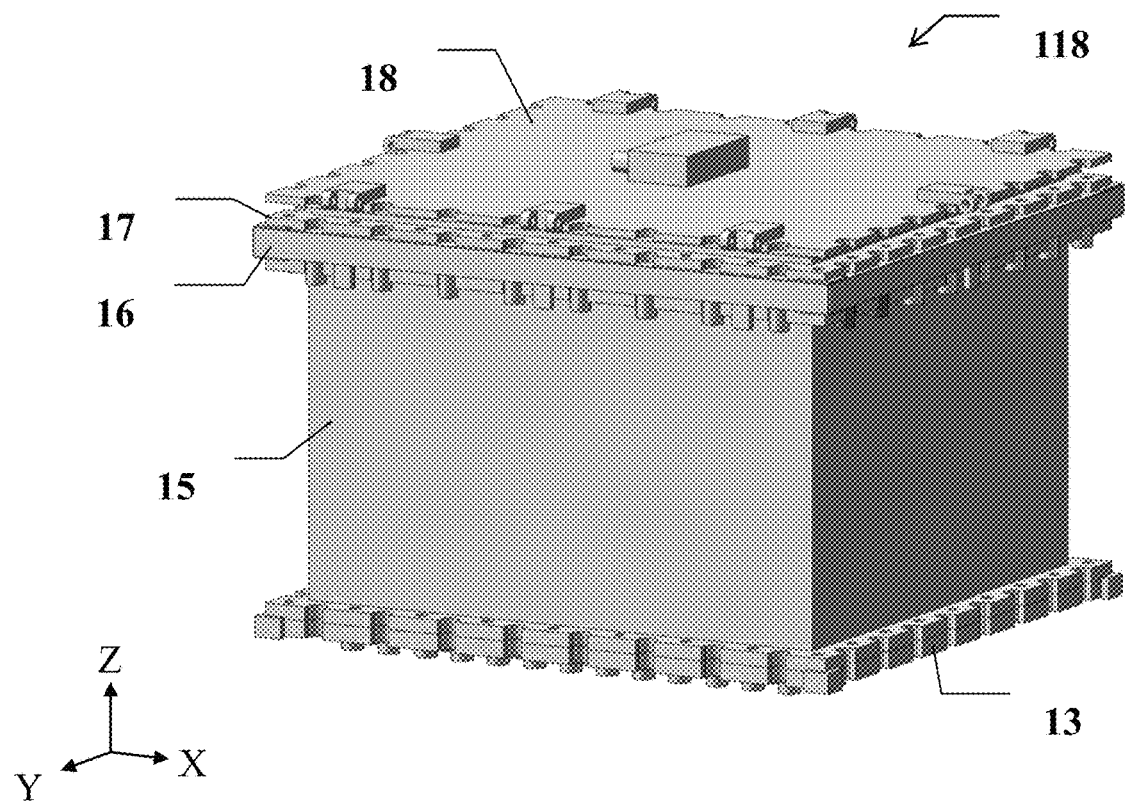
Figure 15A:
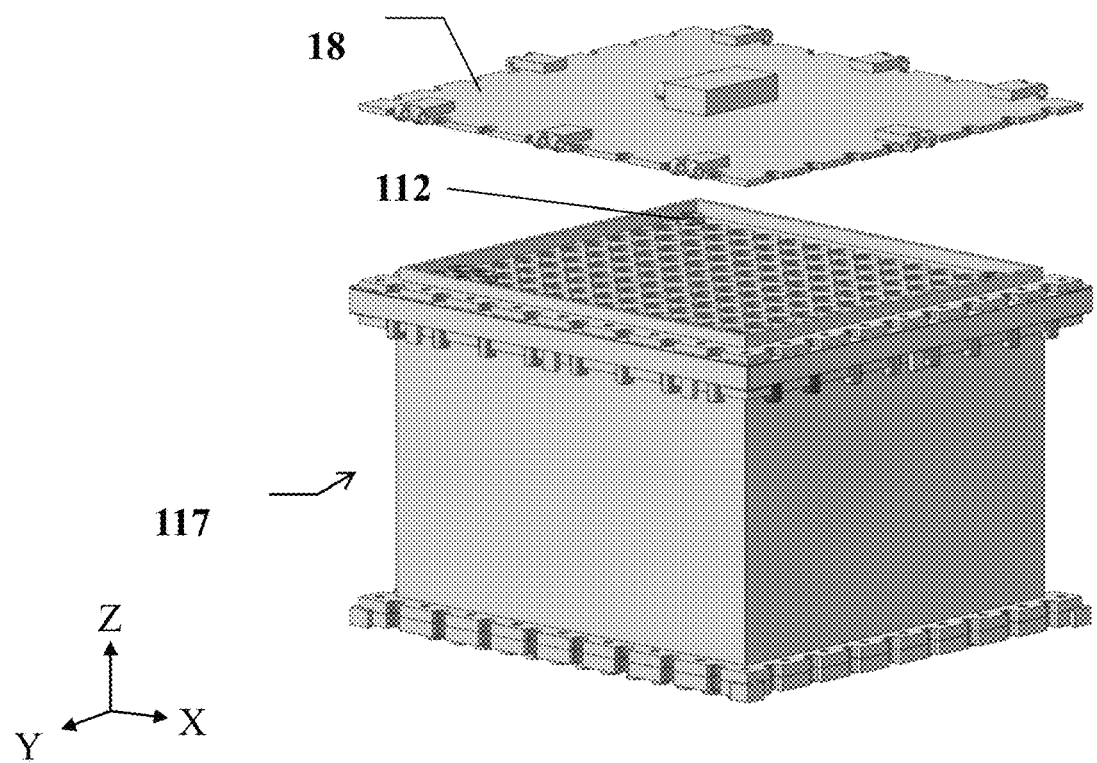
Figure 15B:
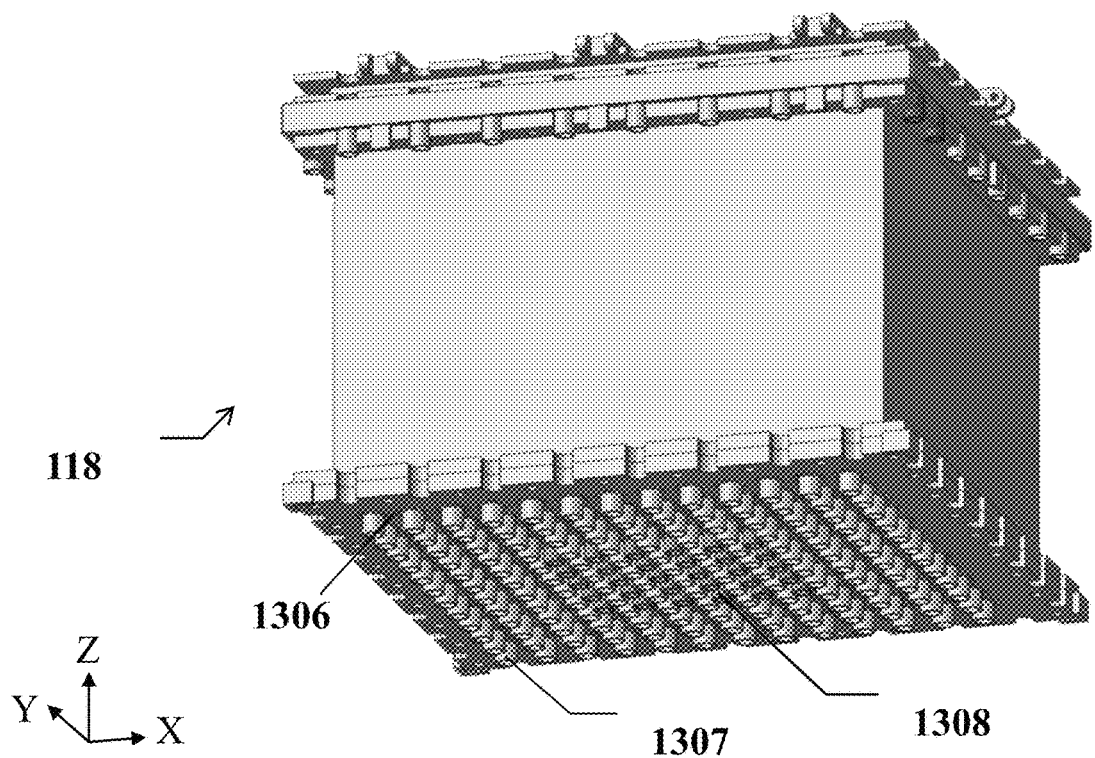

FIG. 15 is the FIG. 13 assembled with the hydrogen cover. FIG. 15A is the FIG. 13 with the hydrogen cover in the position for assembly. FIG. 15B is the FIG. 15 viewing from a lower position.

Figure 16:
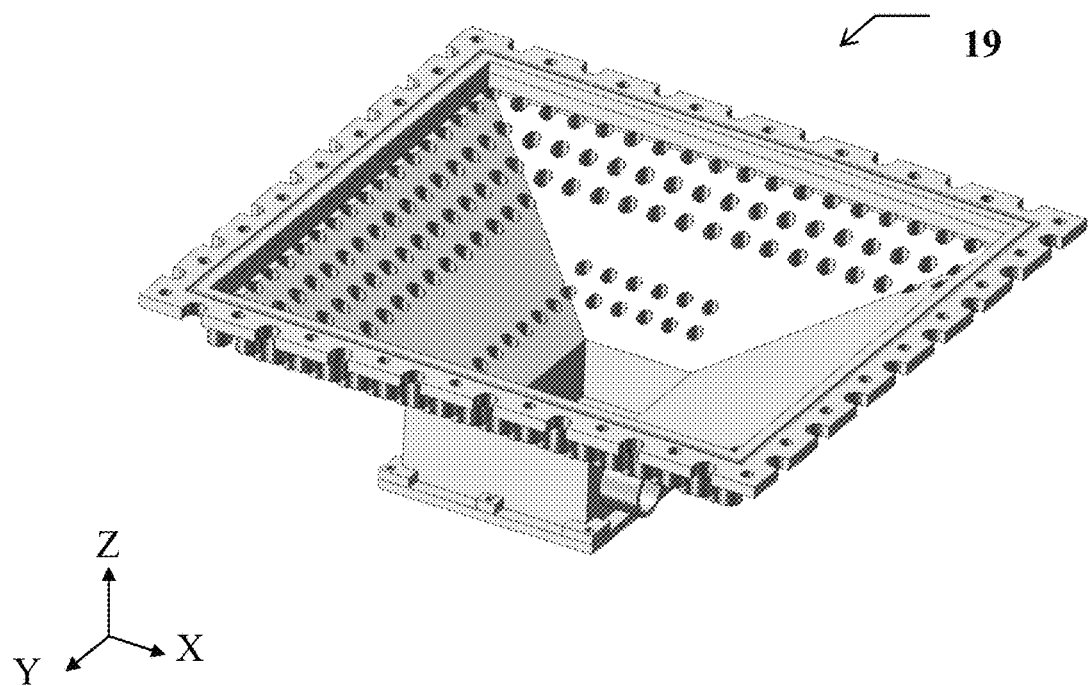
Figure 16A:
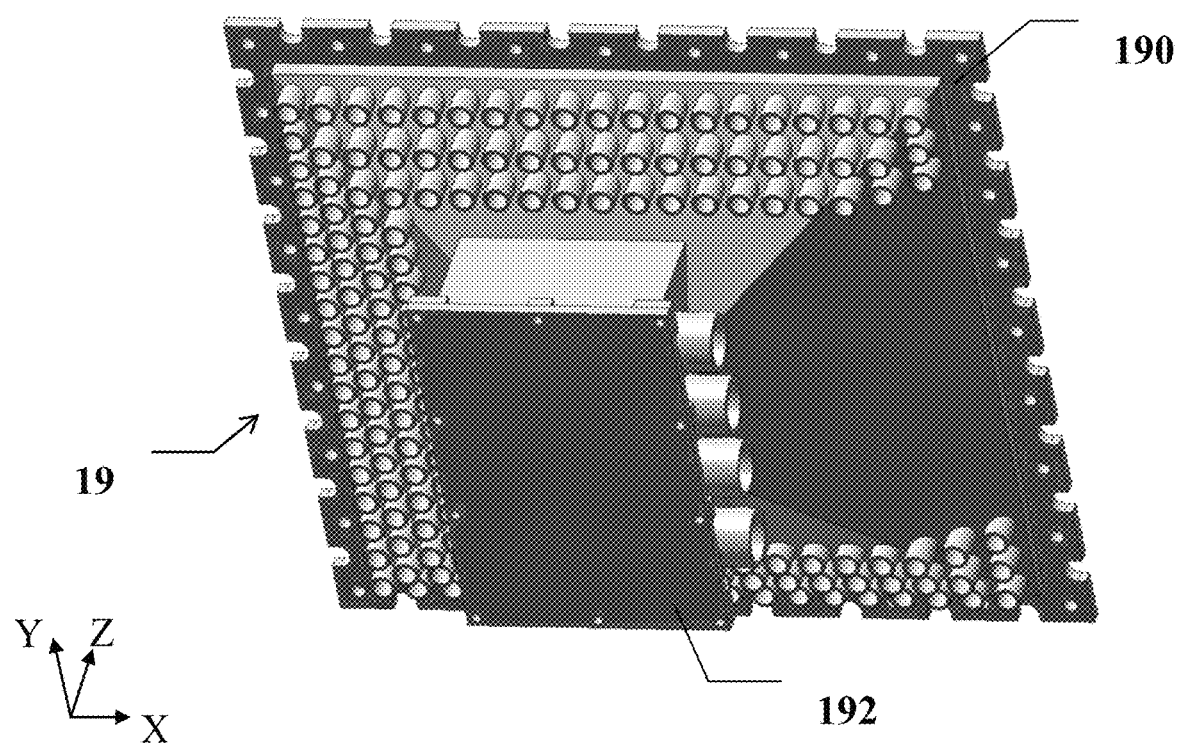
Figure 16B:
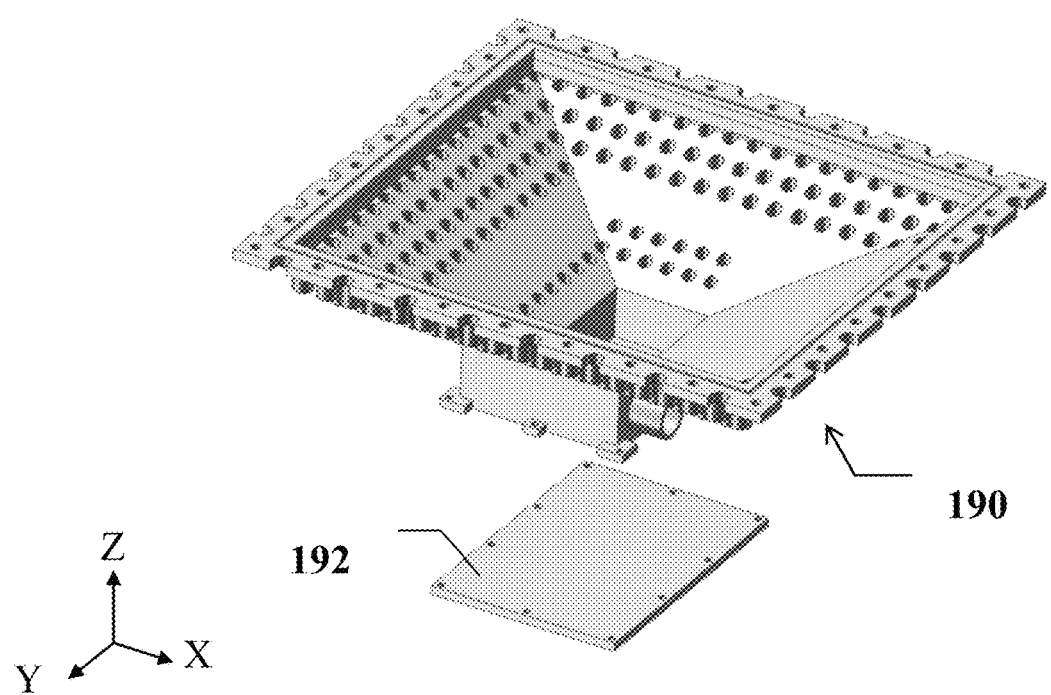
Figure 16C:
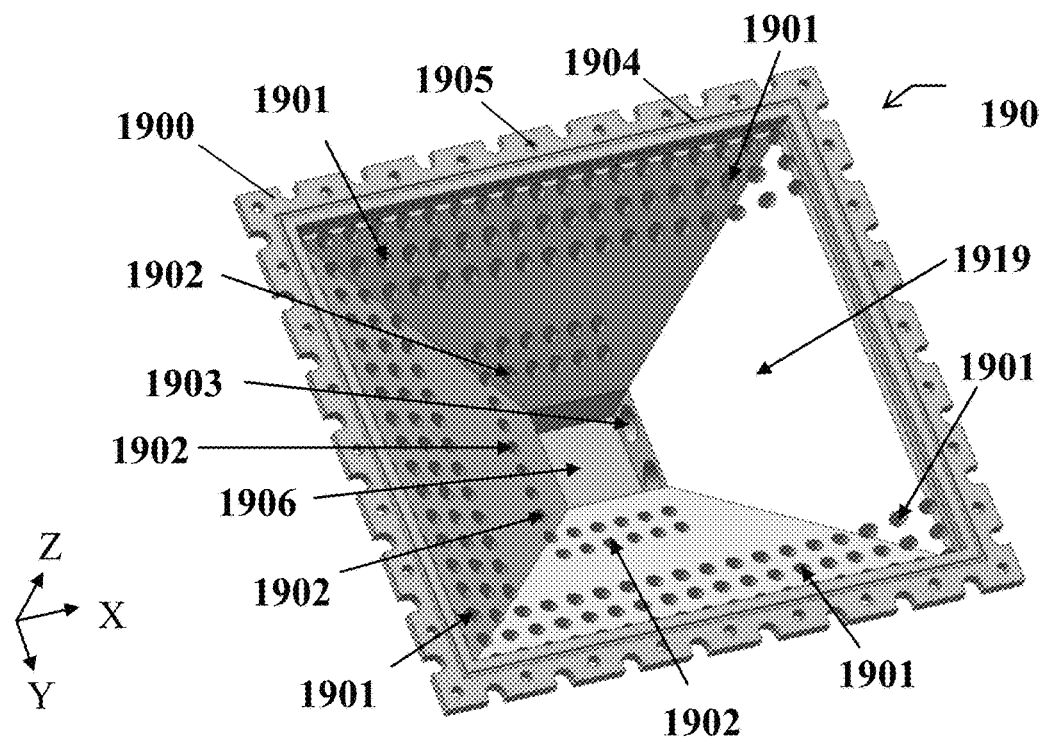
Figure 16D:
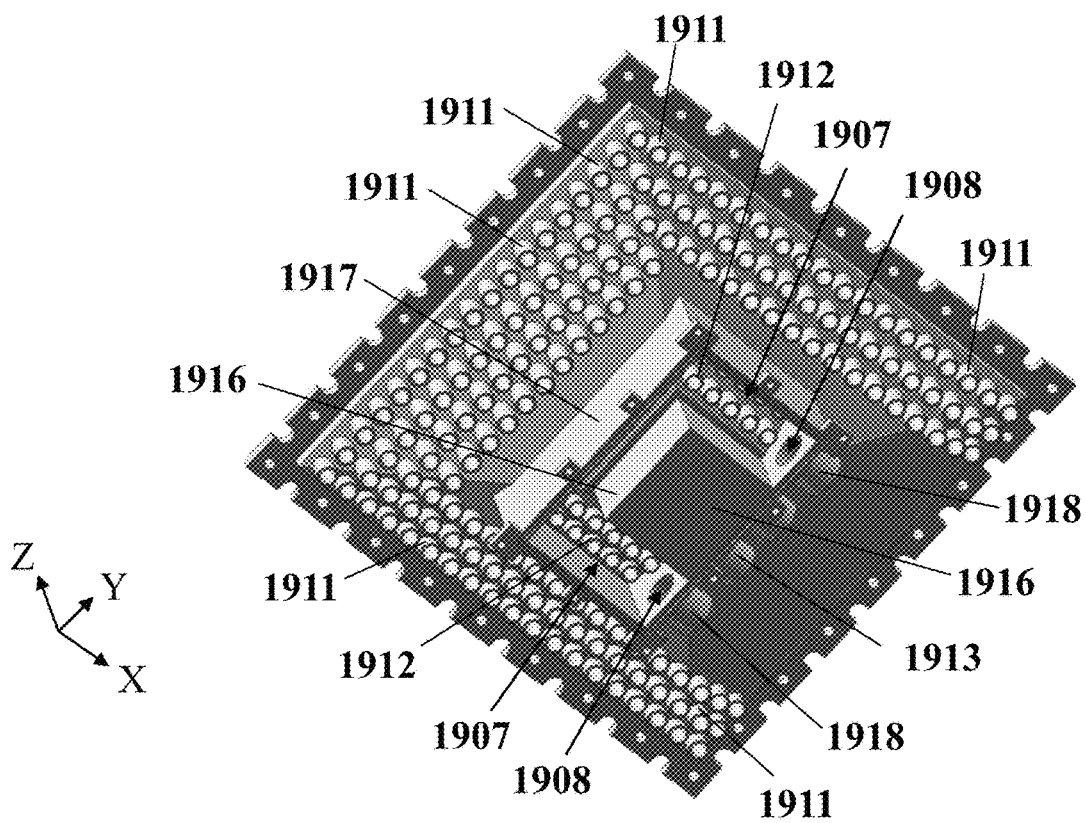
Figure 16E:
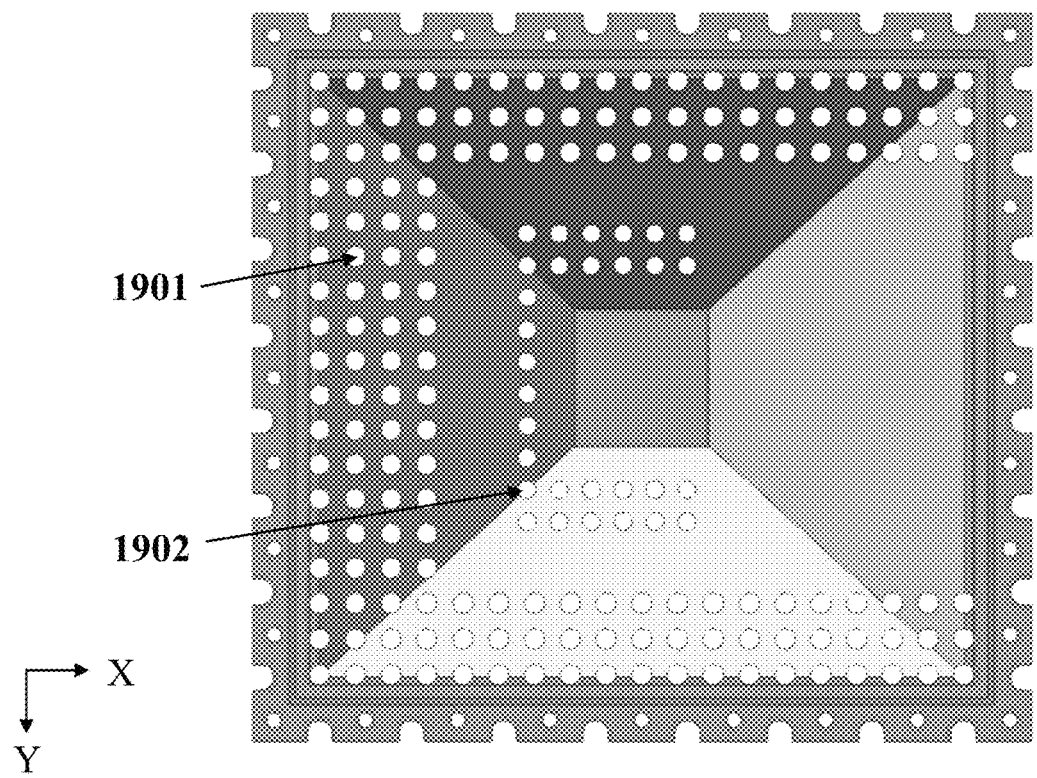
Figure 16F:
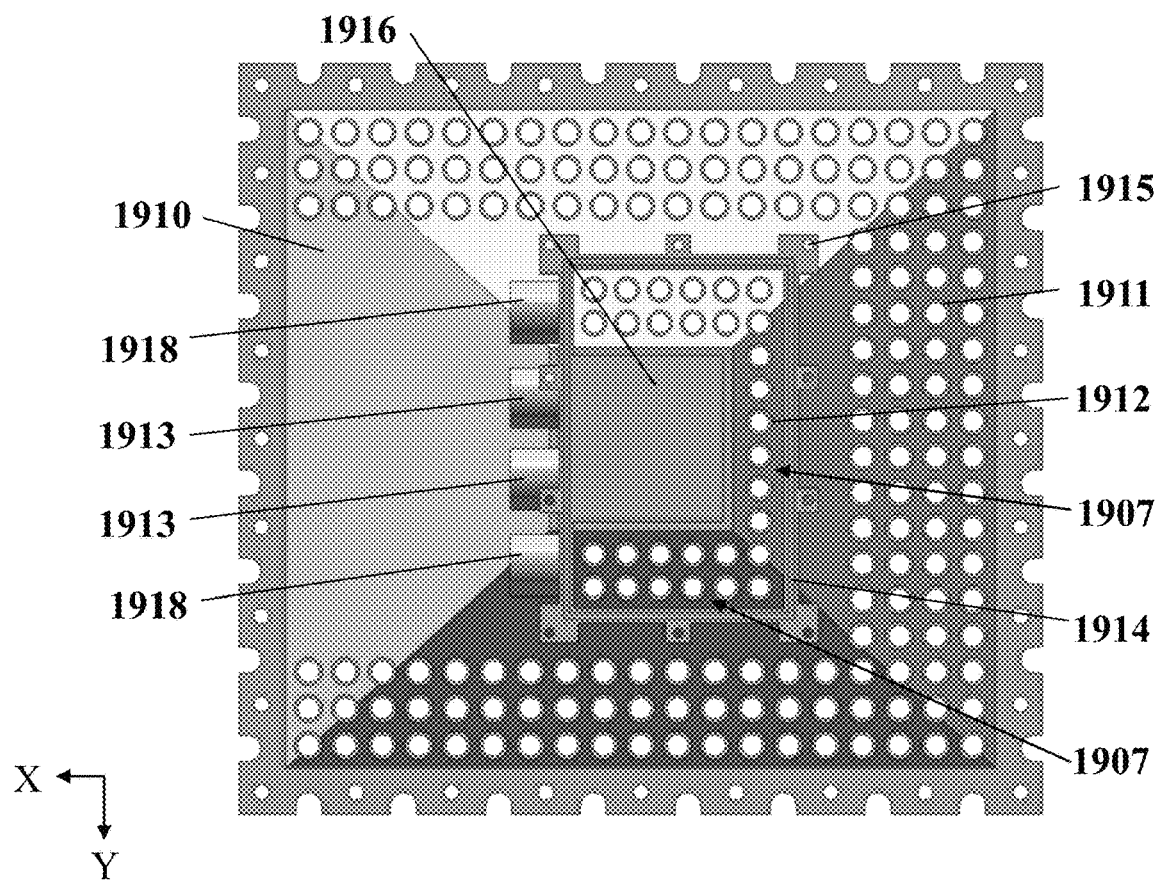

FIG. 16 is an electrolyte outlet sink. FIG. 16A is the FIG. 16 viewing from a lower position. FIG. 16B is the FIG. 16 with an air sealing plate in the position for assembly. FIG. 16D is the FIG. 16B with the air sealing plate removed. FIG. 16C is the FIG. 16D viewing from a upper position. FIG. 16E is the FIG. 16D viewing from a right upper position. FIG. 16F is the FIG. 16D viewing in right lower position.

Figure 17:
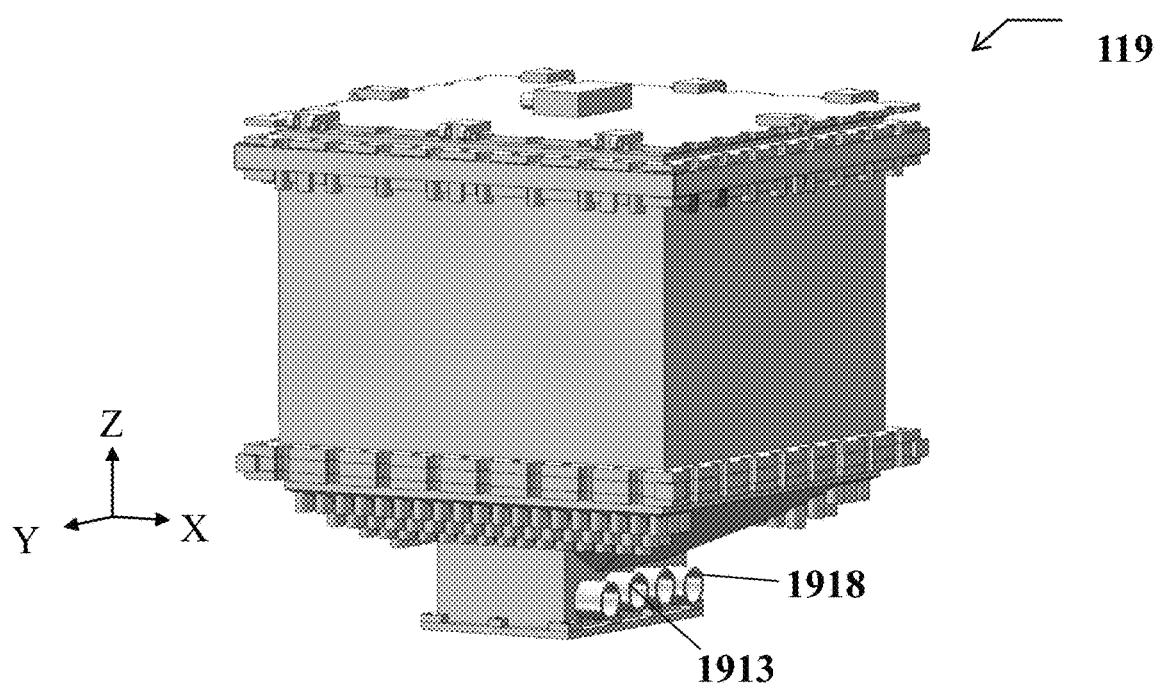
Figure 17A:
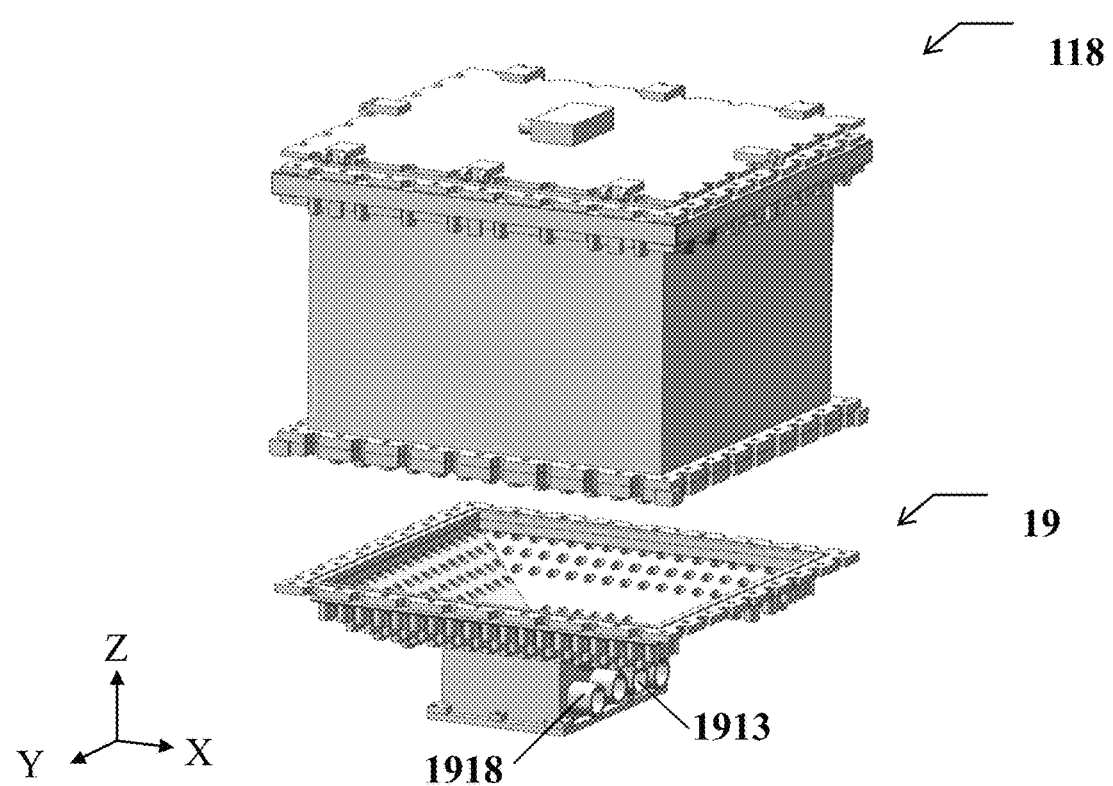

FIG. 17 is the FIG. 15 assembled with the electrolyte outlet sink. FIG. 17A is the FIG. 17 with the electrolyte outlet sink in the position for assembly.

Figure 18:
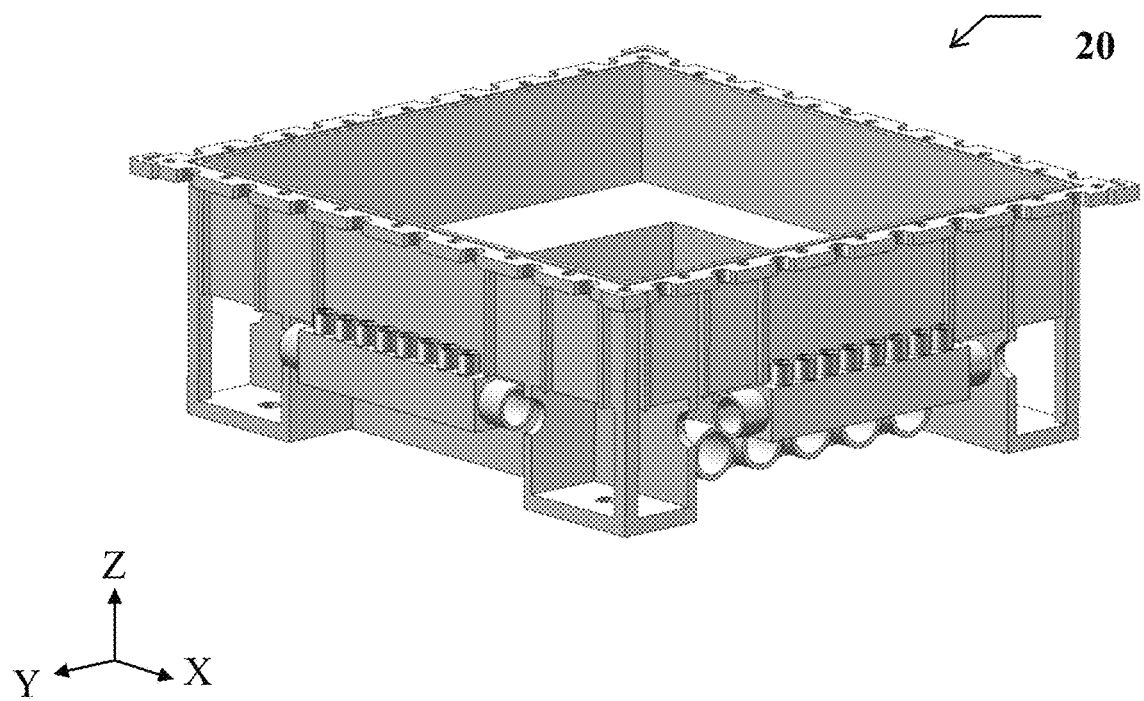
Figure 18A:
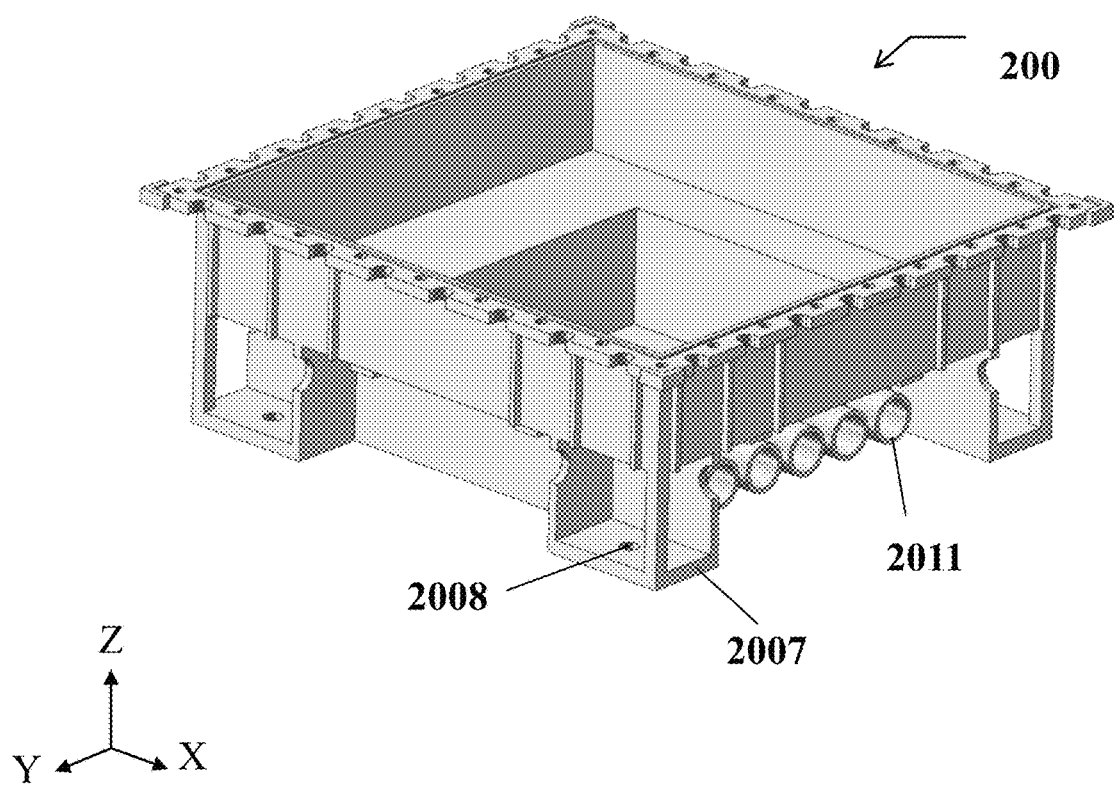
Figure 18B:
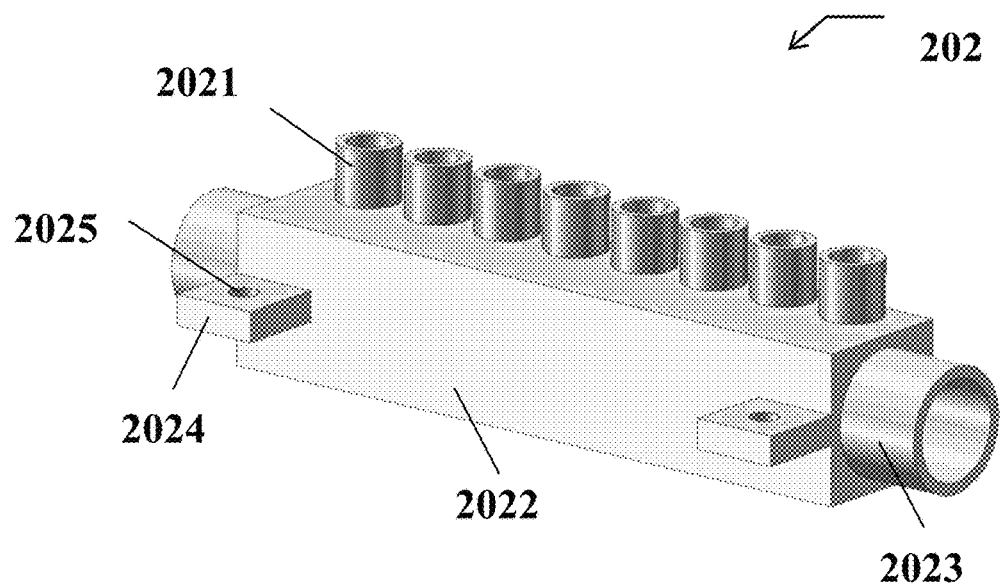
Figure 18C:
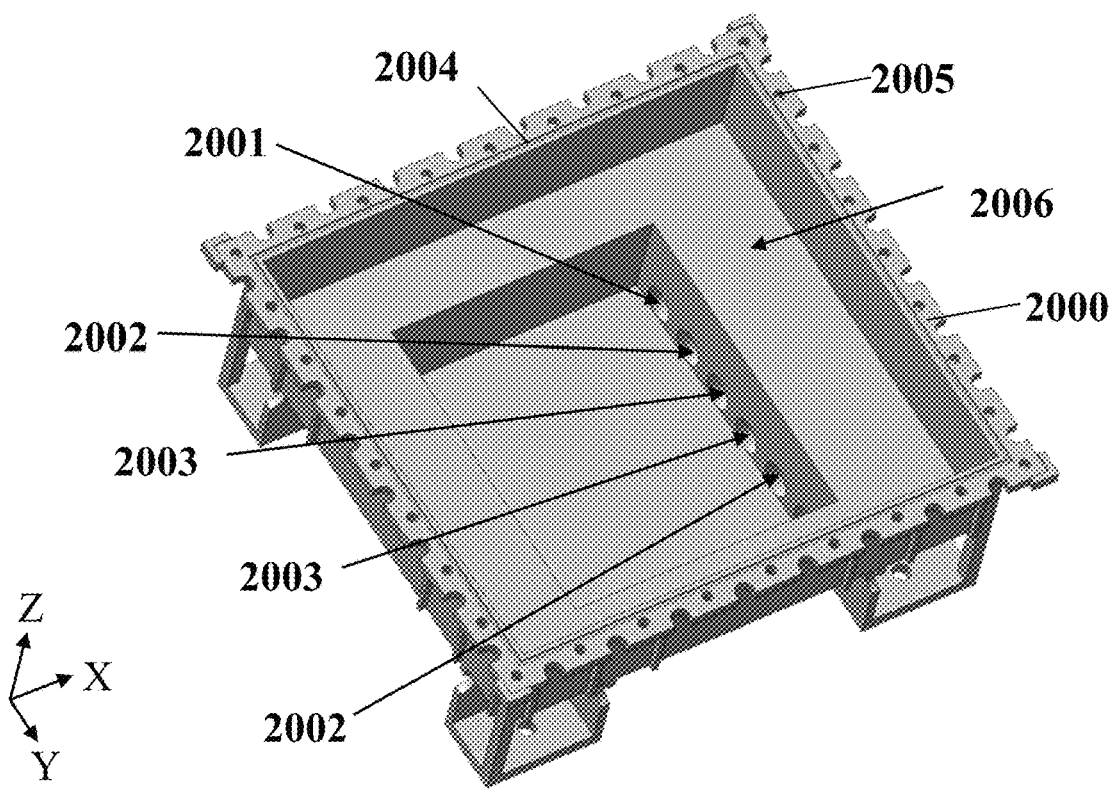
Figure 18D:
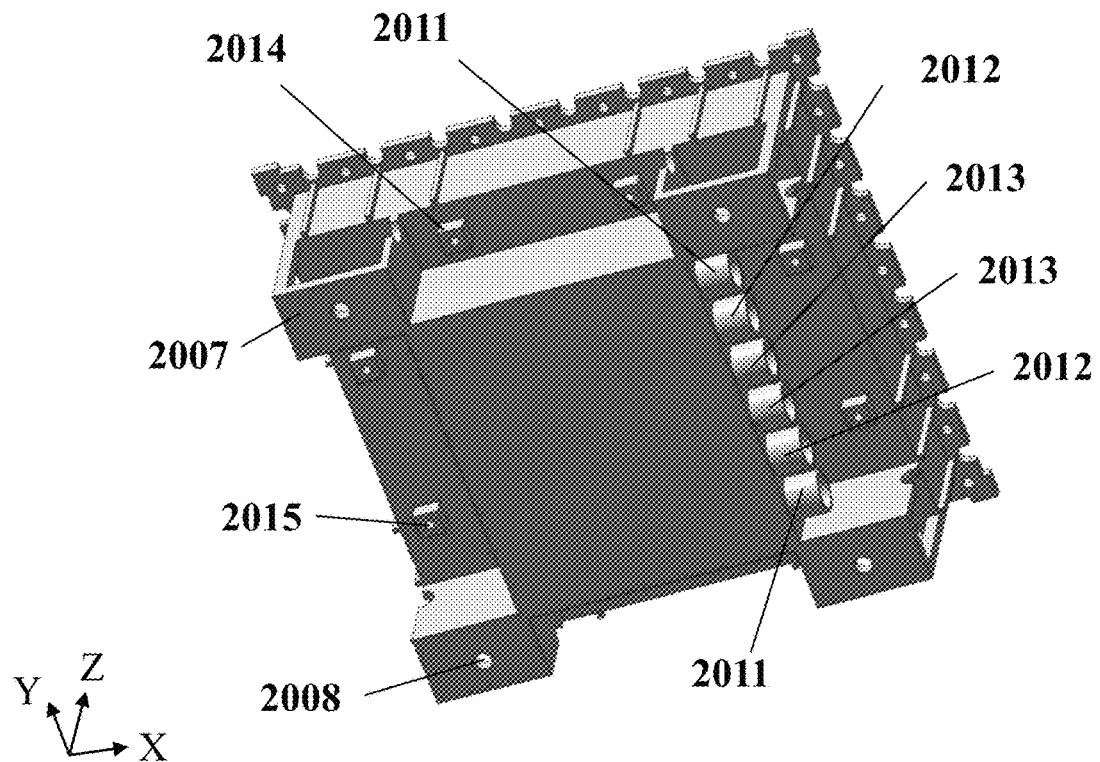

FIG. 18 is an electrolyte inlet chamber. FIG. 18A is the electrolyte inlet chamber with an air collector removed. FIG. 18B is the air collector. FIG. 18C is the FIG. 18A viewing from a upper-left position. FIG. 18D is the FIG. 18A viewing from a lower-right position.

Figure 19:
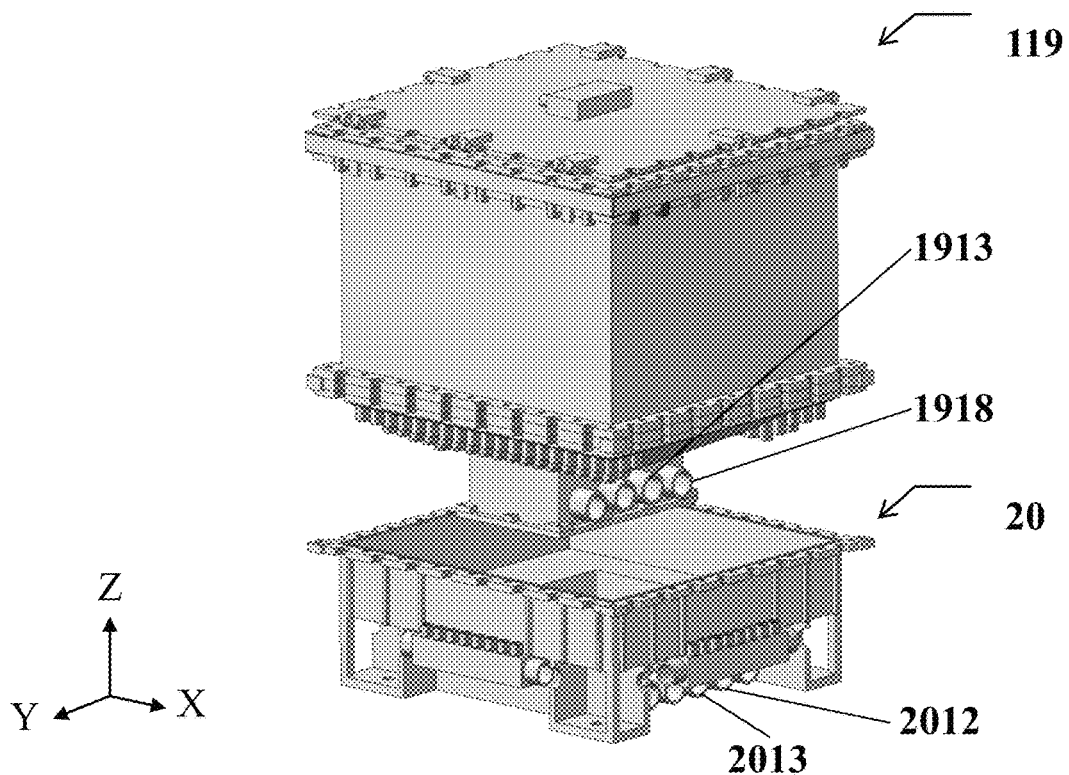

FIG. 19 is the FIG. 17 assembled with the electrolyte inlet chamber.

DETAILED DESCRIPTION OF THE INVENTION

Figure 1:
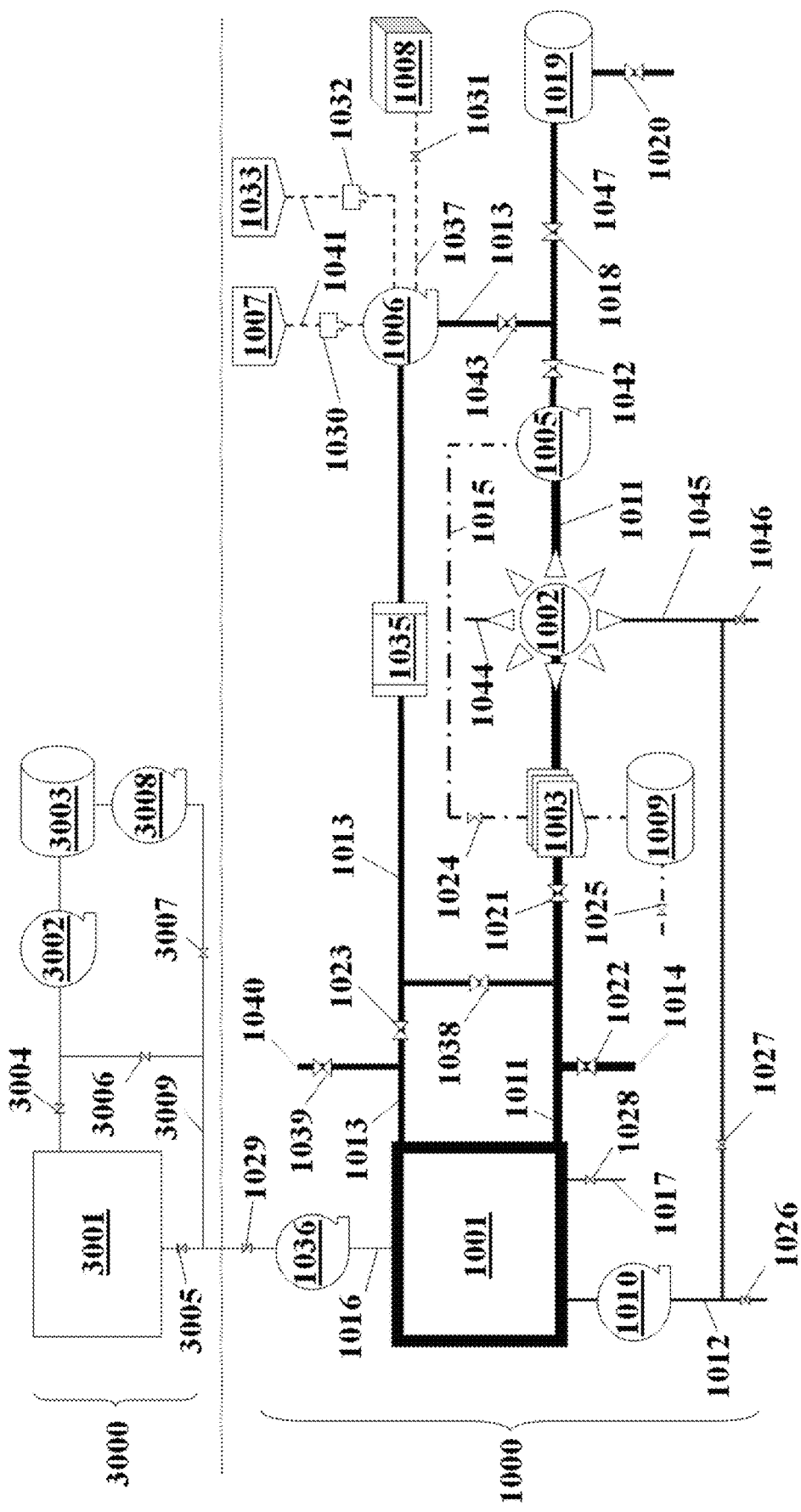

FIG. 1 shows a compact battery unit of present invention comprises an aluminum-air battery 1000 and a hydrogen utilization system 3000 distinguished by a dot line. The aluminum-air battery 1000 provides hydrogen to the hydrogen utilization system 3000 through a pipe 1016. Through an air pump 1036, valves 1029 and 3005, the hydrogen flows into a hydrogen-fuel battery 3001 to generate electricity. The unconsumable hydrogen outflowing from the hydrogen-fuel battery 3001 will be compressed into a reserve pressure vessel 3003 through a pump 3002 and a valve 3004 with the valve 3006 switched off. If the hydrogen supply from the aluminum-air battery 1000 surpasses the electric power demand, the hydrogen can be reserved into the pressure vessel 3003 through the valve 3006 and the pump 3002. If the hydrogen supply from the aluminum-air battery 1000 is deficient for the electric power demand, the hydrogen can be presented from the pressure vessel 3003 through the valve 3007 and the pump 3008. In some case if there is no power need from the hydrogen-fuel battery 3001, the hydrogen will simply store into the pressure vessel 3003 through the pipe 3009, the valves 3006, 1029 and the pump 3002 with the valves 3005, 3004, 3007 switched off.

As shown in the FIG. 1, a stack core 1001 of the aluminum-air battery 1000 is connected to the electrolyte circulation system through the inlet pipe 1013 and the outlet pipe 1011. In a normal process of the battery discharge, the electrolyte circulates through a valve 1021, a water-distillation device 1003, an air-heat exchanger 1002, a precipitate-filtering pump 1005, valves 1042 and 1043, a powder-water mixing pump (i.e. pressure pump) 1006, an electrolyte heater 1035 and a valve 1023 with valves 1022, 1038, 1047, 1031, 1039 switched off. If necessary the seed crystals of hydrargillite (alumina trihydrate) may be added to the electrolyte through an alumina-trihydrate powder vessel 1033 and a powder-feeding device 1032 in the process. In this normal process, the aqueous precipitation of aluminum hydroxide $Al(OH)_3$ is separated by the precipitate-filtering pump 1005, and then stores in a precipitate-collecting tank 1009 through a pipe 1015 and a vale 1024 after further removing the water from the aqueous precipitation through the water-distillation device 1003 which make use of the heat from the hot electrolyte.

In a process of the fresh electrolyte injecting, the fresh water from a fresh-water tank 1008 is mixed by the pump 1006 with solute NaOH from a sodium-hydroxide powder vessel 1007 and a powder-feeding device 1030 so that the fresh electrolyte is produced, and then the fresh electrolyte is injected into the stack core 1001 through the electrolyte heater 1035 and the valve 1023 with valves 1038, 1039 switched off. In a process of removing the used electrolyte, simply open the valves 1022 and 1039.

In a process of the battery shutting down, the electrolyte comes out from the stack core 1001 through the pipe 1011 and the valve 1021, and then quickly dumps into an electrolyte-storage tank 1019 through the water-distillation device 1003, the air-heat exchanger 1002, the precipitate-filtering pump 1005, the valves 1042 and 1018. In this process the valve 1039 is opened and the vales 1043, 1024, 1038, 1022 are switched off.

In a process of the battery starting up, the electrolyte comes out from electrolyte-storage tank 1019 through the pipe 1047, the valves 1018 and 1043, and then is quickly pushed into the stack core 1001 through the pressure pump 1006, the heater 1035, the valve 1038 and part of the pipe 1011 with the valves 1021, 1022, 1042, 1031, 1023 switched off.

As shown in the FIG. 1, the fresh air is inhaled into the stack core 1001 of the aluminum-air battery 1000 through an inlet pipe 1012, a valve 1026 and an air pump 1010. Unconsumed air is exhaled from the stack core 1001 through an outlet pipe 1017 and a valve 1028. In some case when it is necessary to control the temperature of the inhaling air, the fresh air can be taken in from a pipe 1044, the air is heated by the air-heat exchanger 1002, and then fed into the stack core 1001 through a valve 1027 and the air pump 1010. The hot air from the pipe 1045 may also supply into the inside of a vehicle serving as an air conditioner through a valve 1046.

Figure 2:
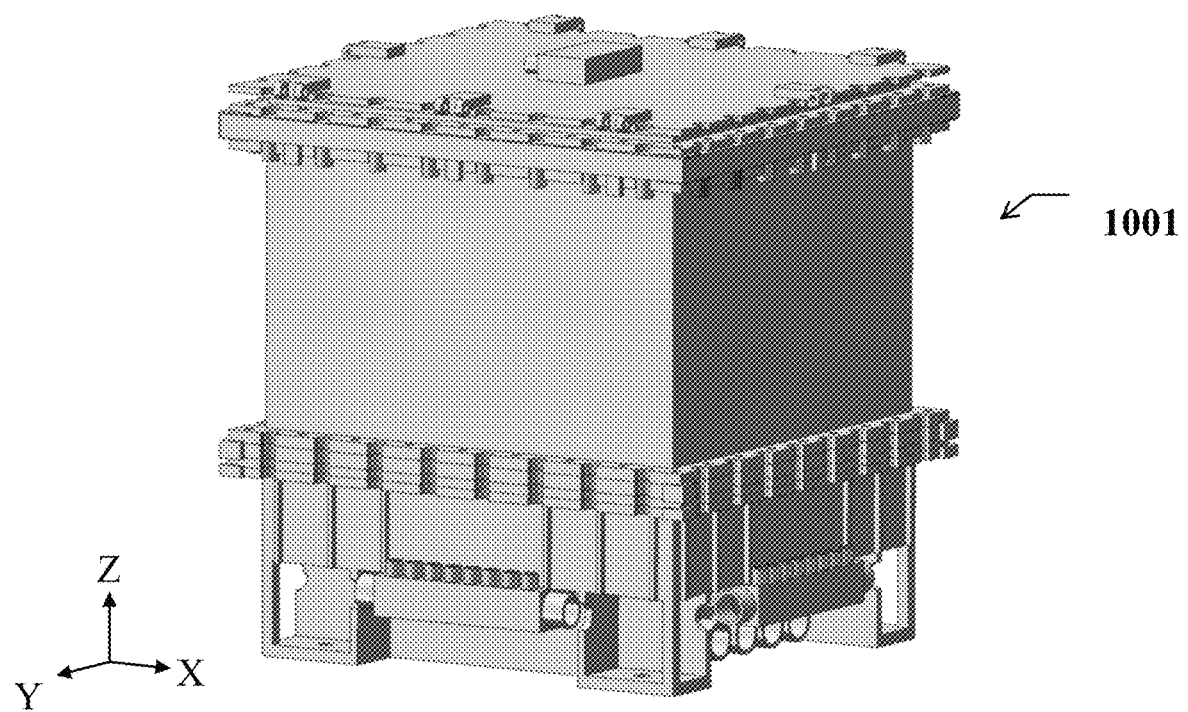
Figure 2A:
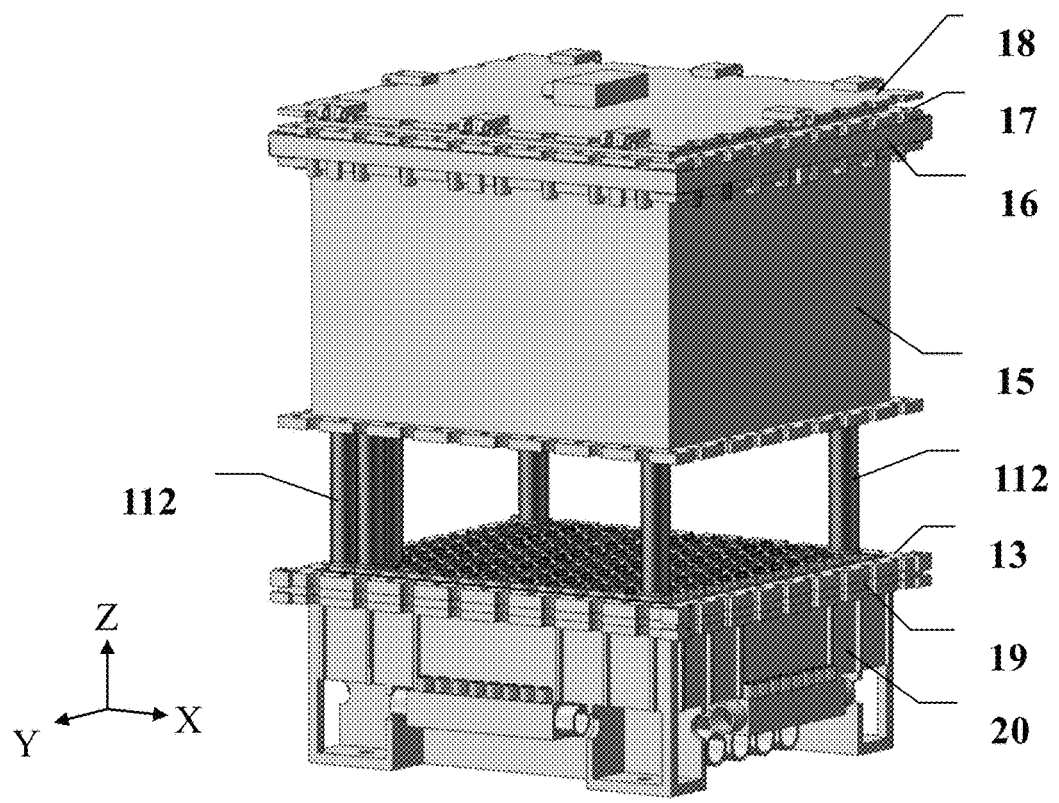
Figure 2B:
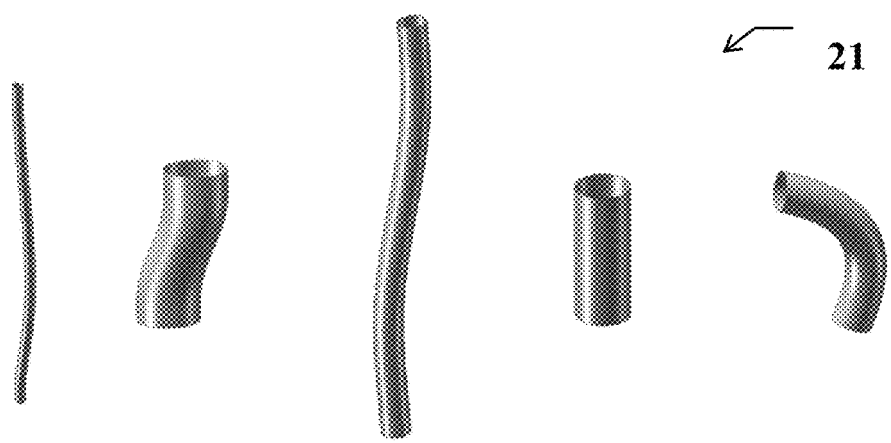

The key equipment of the present invention is the stack core 1001 as shown in FIG. 2. It comprises one or more cylindrical cells 112, a cell base 13, a cell house 15, an electrolyte cover 16, an air cover 17, a hydrogen cover 18, an electrolyte outlet sink 19, an electrolyte inlet chamber 20 as shown in FIG. 2A, soft pipes of various diameters 21 as shown in FIG. 2B, and a vibrator which is not shown in above figures.

Figures 3, 3A, 3B:
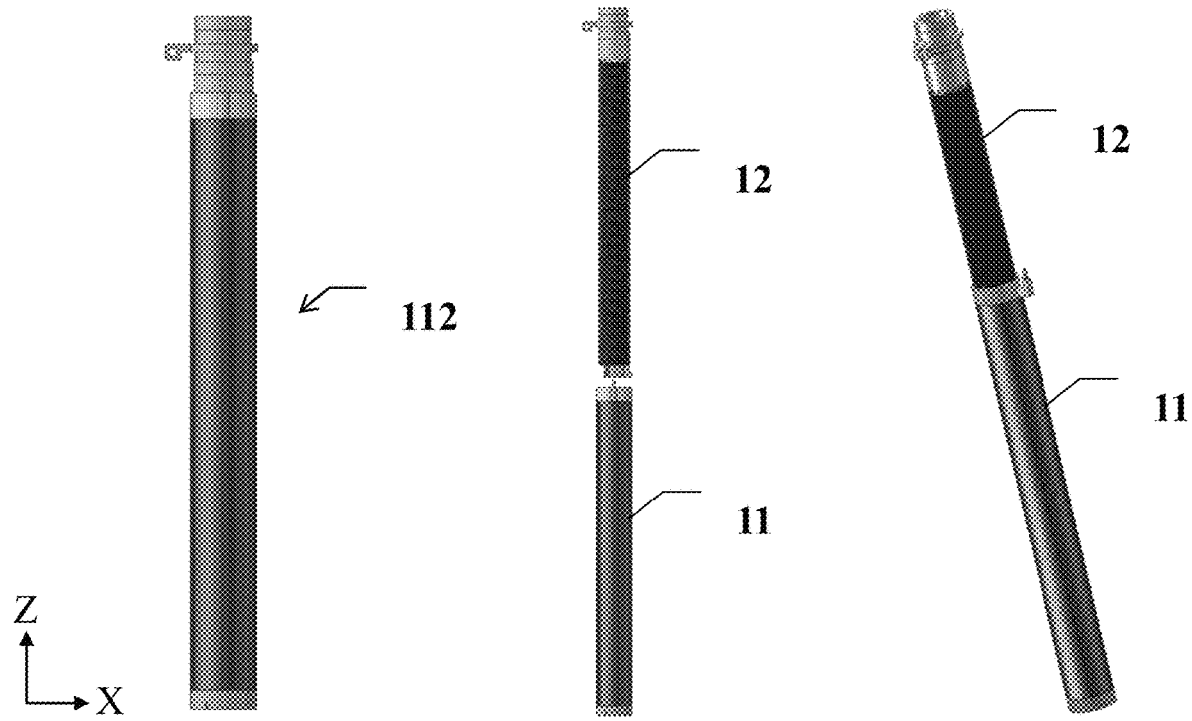
Figure 3C:
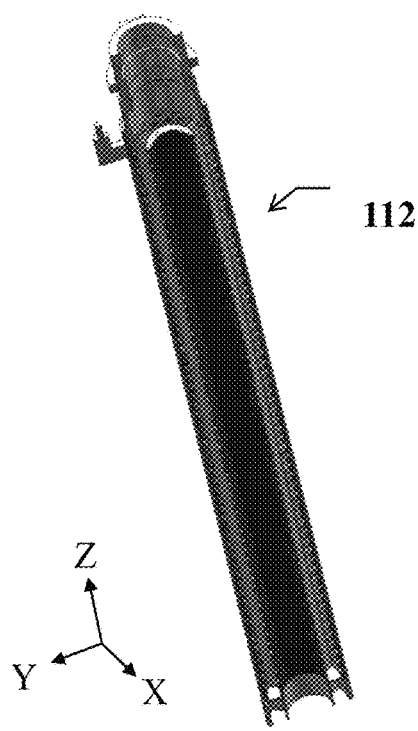
Figure 3D:
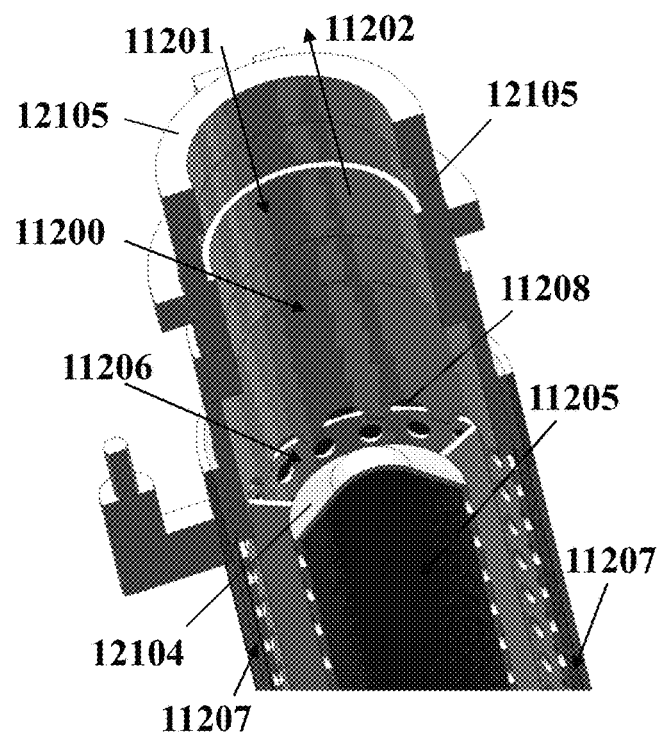
Figure 3E:
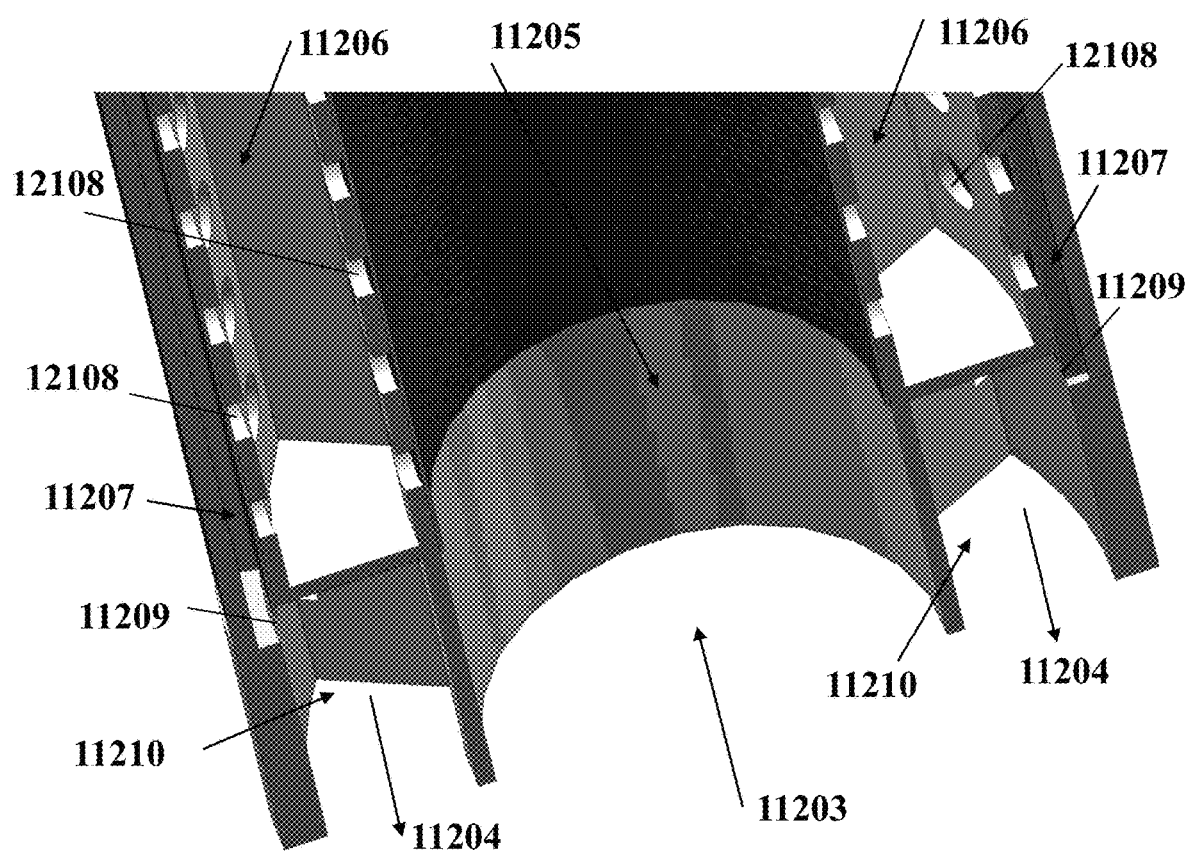

FIG. 3 shows an assembled cylindrical cell 112. It comprises a cathode 11 and an anode 12 as shown in FIG. 3A. FIG. 3B shows the cylindrical cell when the anode 12 is halfway assembled into the cathode 11. FIG. 3C is a sectional view of the FIG. 3. FIG. 3D is a partial enlargement of the upper part of the FIG. 3C and FIG. 3E is a partial enlargement of the lower part of the FIG. 3C. From the FIG. 3E it can be seen that an electrolyte ion-conductive chamber 11207, which is a cylindrical ring-shaped space, is defined by a cylindrical gap between the cathode 11 and the anode 12 when they are assembled. From the FIG. 3D, FIG. 3E, FIG. 5K and FIG. 5L, it can be seen that a granular-aluminium reactant chamber 11206 is defined by an annular cylindrical space between the exterior cylinder 12101 and the interior cylinder 12102 shown in FIG. 5M and FIG. 5L.

In the FIG. 3E, an electrode electrolyte inlet is indicated by a lead-line arrow 11203 showing the direction in which the electrolyte circulates into the cell 112, and an electrode electrolyte outlet is indicated by a lead-line arrow 11204 showing the direction in which the electrolyte circulates out the cell 112. Once the electrolyte enters the cylindrical passageway space 11205, it further flow to pass through the granular-aluminium reactant chamber 11206 through the holes 12108 on the anode cylindrical surfaces (which form anode electrolyte-circulation passageway as stated in the section of Brief Summary of the Invention) and to pass through the electrolyte ion-conductive chamber 11207 through the apertures 11209 between the cathode 11 and anode 12 at the bottom part of the cell 112. And then the electrolyte comes out from the electrolyte passageway space 11210 at the electrode electrolyte outlet 11204.

In the FIG. 3D, a lead-line arrow 11201 shows the direction in which the granular aluminia load and a lead-line arrow 11202 shows the direction in which the hydrogen comes out from the storage space 11200 of the granular aluminia. From the FIG. 3D, it can be seen that the current-hydrogen lead-out cylinder 12105 is located above the cone-shaped cap 12104 of the interior cylinder 12102 shown in FIG. 5G, FIG. 5L and FIG. 5M. The inner space of the current-hydrogen lead-out cylinder forms a storage space 11200 of the granular aluminia to supply the granular aluminia so that the consumed granular aluminia, in the granular-aluminium reactant chamber 11206, are replaced. The storage space 11200 also provides a passageway for granular-aluminium loading. On the top of the current-hydrogen lead-out cylinder 12105 there is a mechanical spring lid which is not shown in the FIG. 3D. The lid is perforated with hole or holes to allow the hydrogen escape. Also in the FIG. 3D there are holes 11208 at the position leveled with the top of the electrolyte ion-conductive chamber 11207 on the exterior cylinder 12101 shown in FIG. 5G, FIG. 5L and FIG. 5M. These holes provide passages for hydrogen escaping from the electrolyte ion-conductive chamber 11207 entering to the storage space 11200 within the current-hydrogen lead-out cylinder 12105.

Figure 4C:
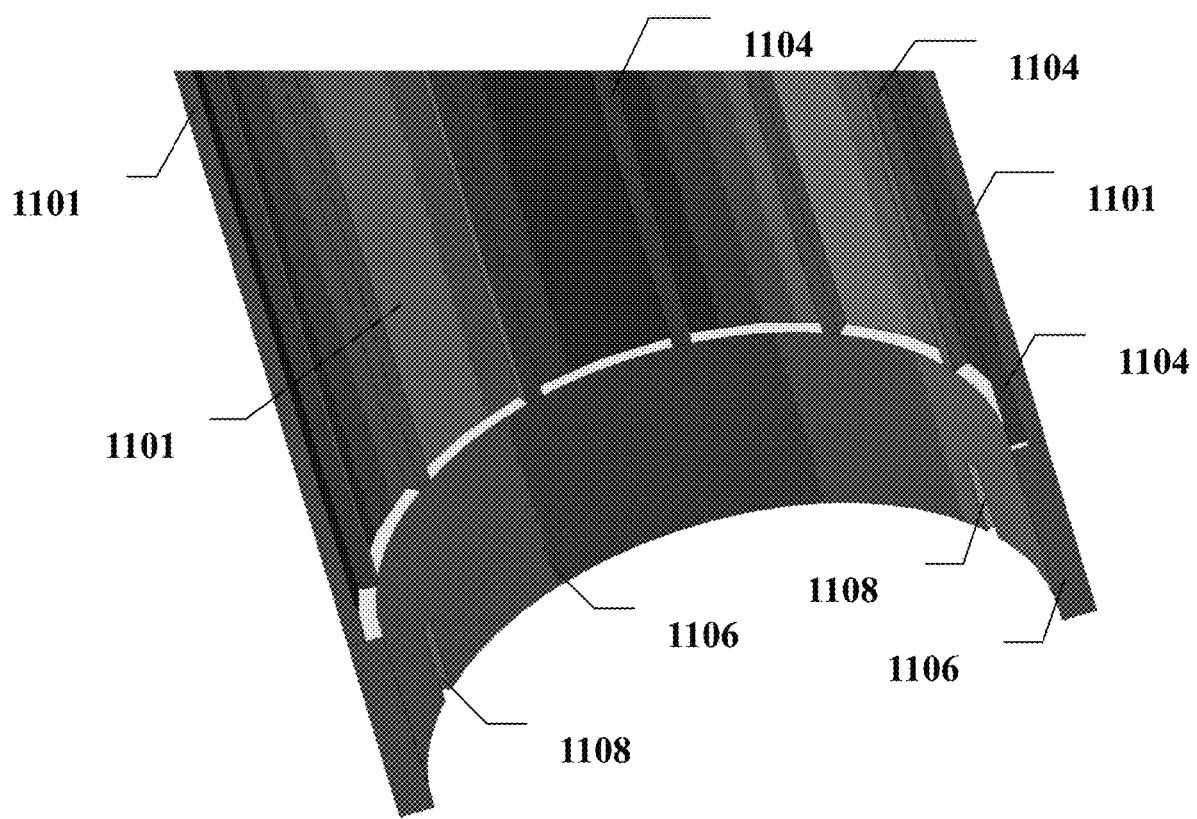

FIG. 4 shows an assembled cathode 11. It comprises a multi-layer cathode electrode 1101, a support frame and a cathode electric connector. The support frame consists of an upper support ring 1105, vertical beams 1104, and a lower support ring 1106 as shown in FIG. 4A, FIG. 4B and FIG. 4C. On the lower support ring 1106, there are position-check indentations 1108 which are used for assembling with the anode. The cathode electric connector consists of an electric conductive ring 1102 and a cathode terminal 1103 as shown in FIG. 4B and FIG. 4A.

Figures 5, 5A, 5B:
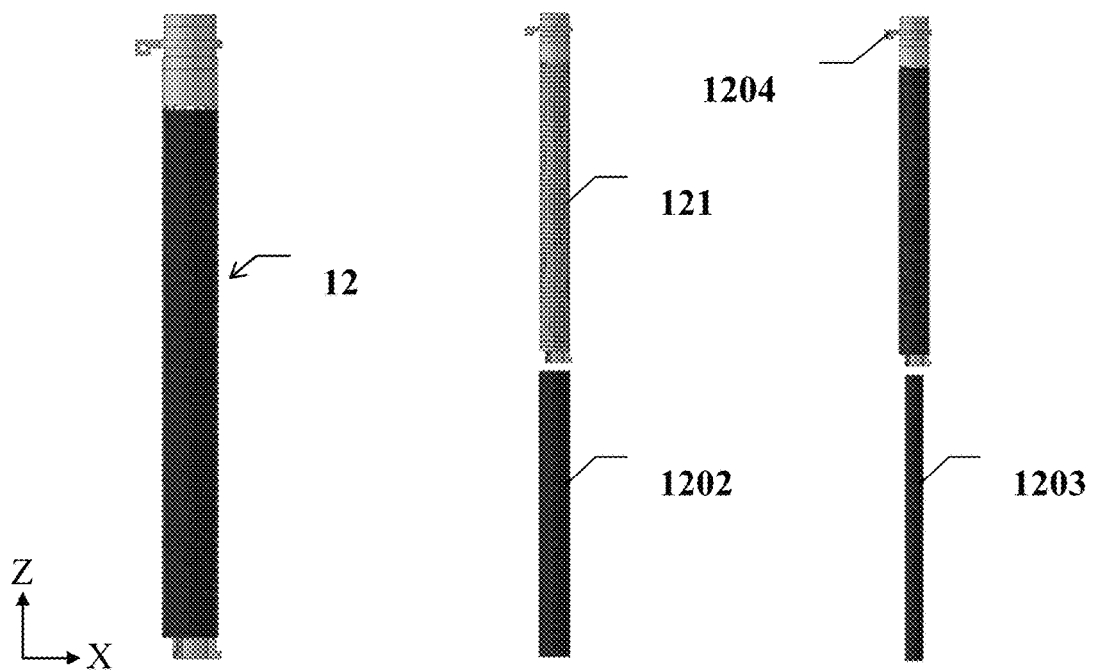
Figure 5C:
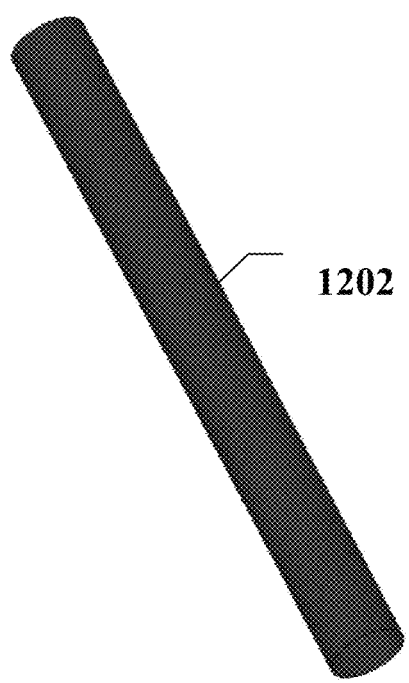
Figure 5D:
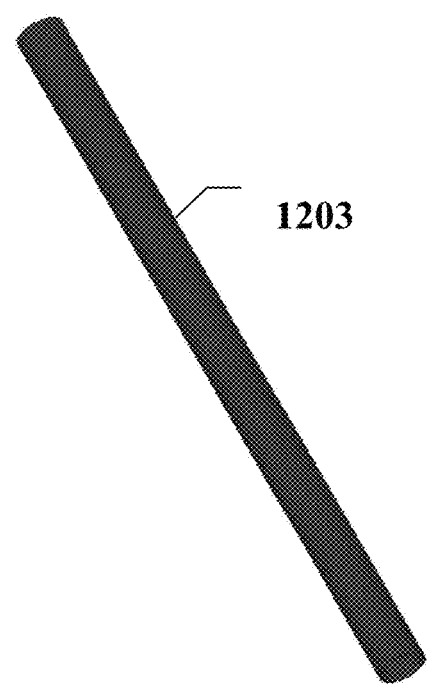
Figure 5E:
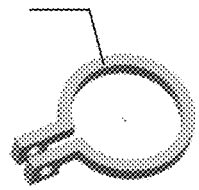
Figure 5F:
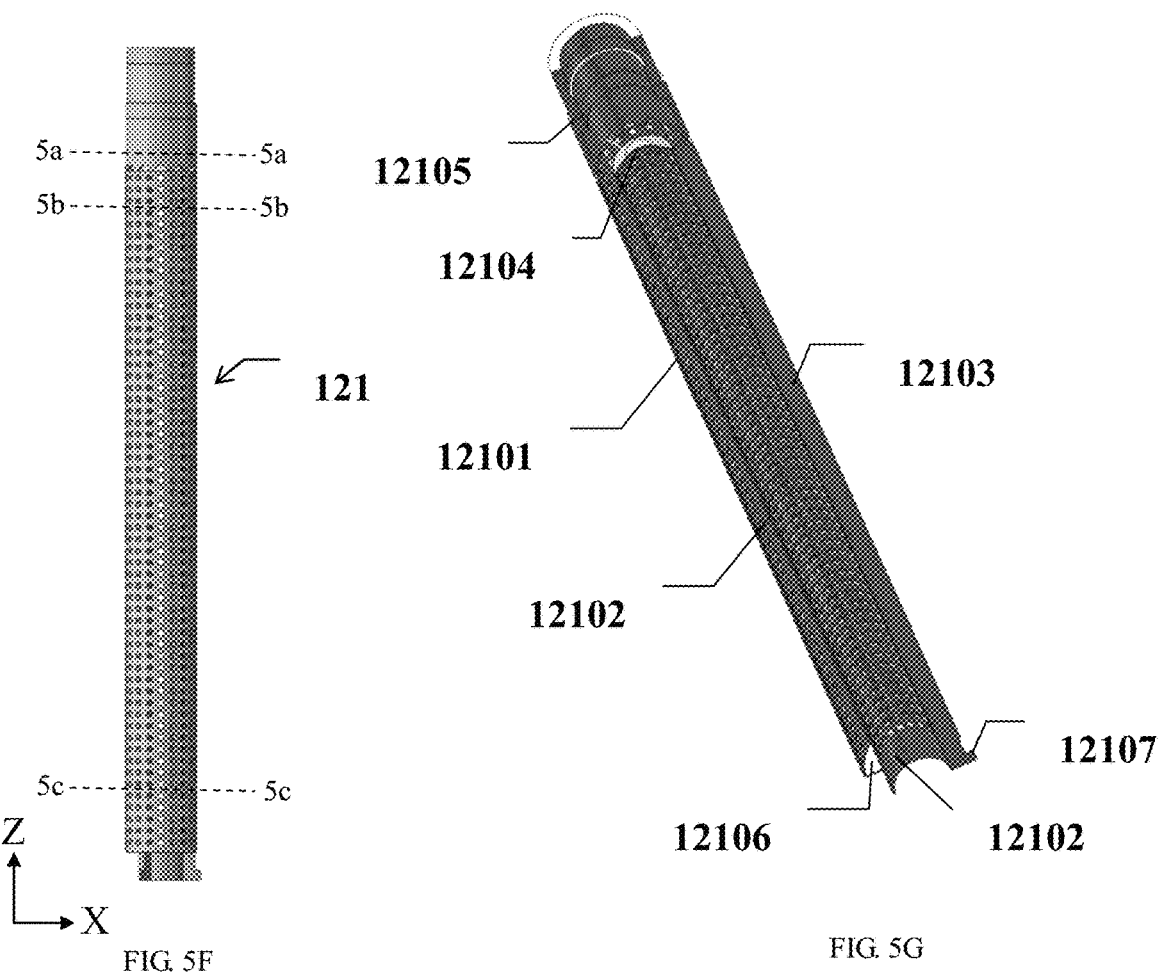
Figure 5G:
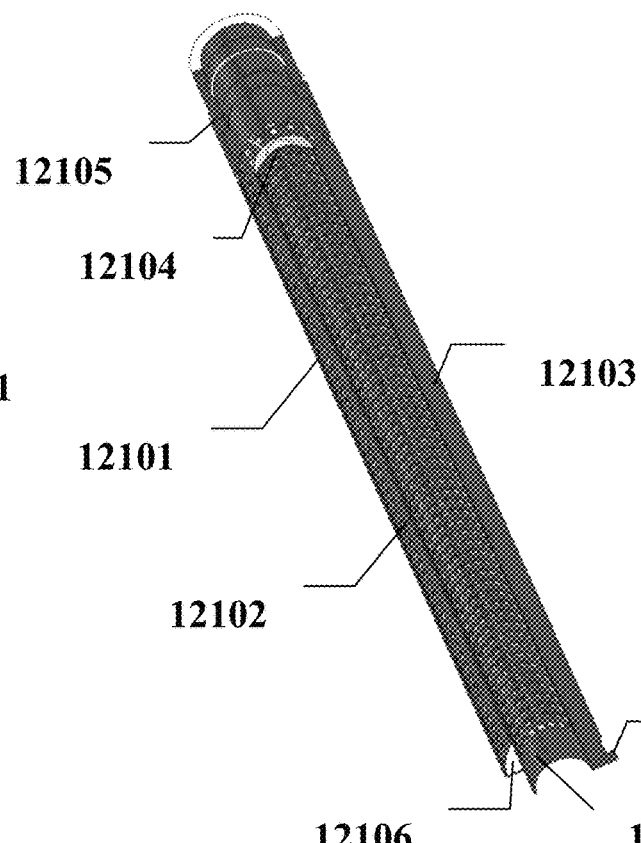
Figures 5H, 5I:
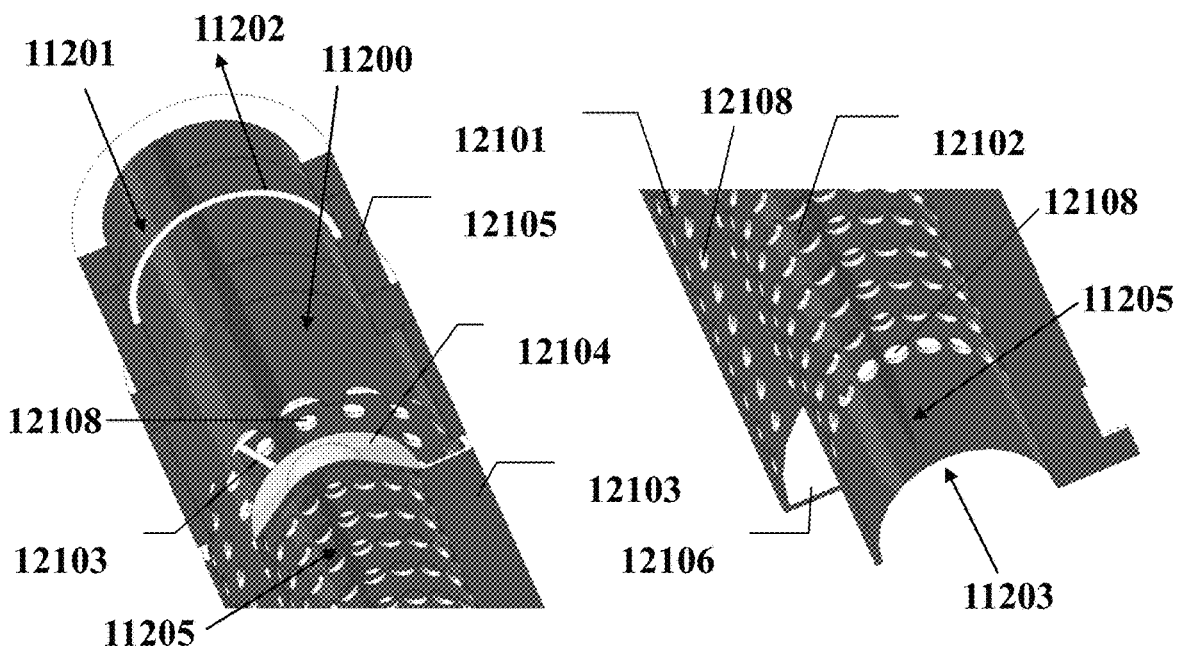
Figures 5J, 5K:
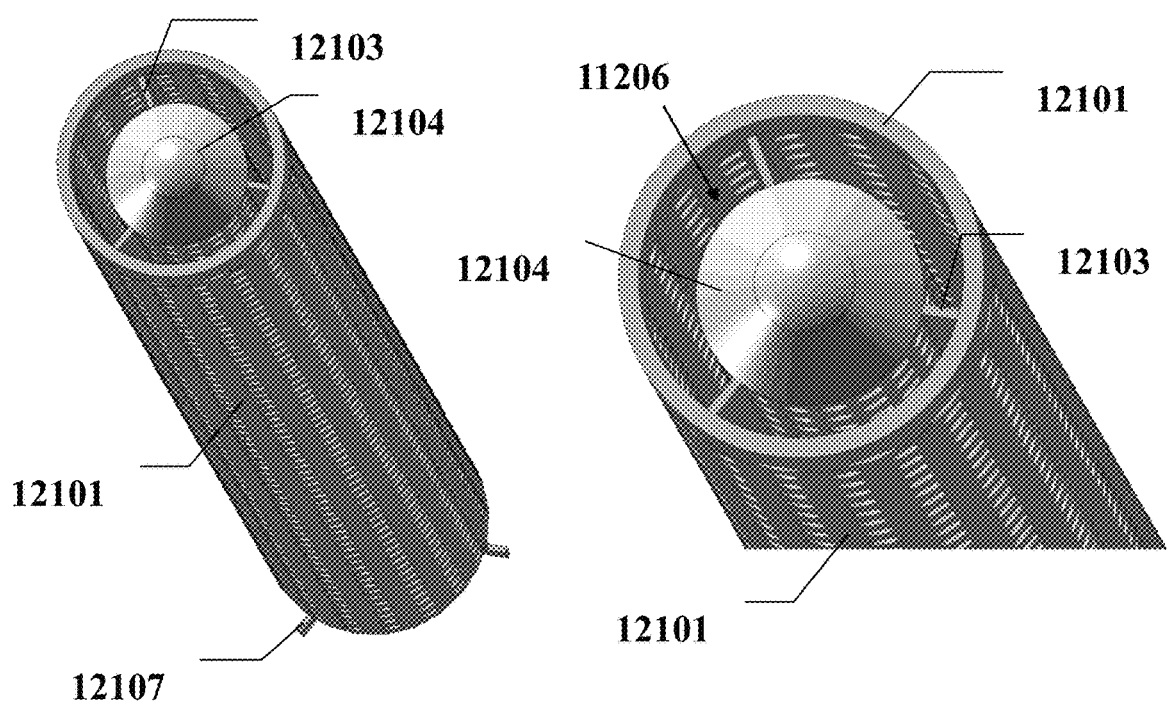
Figures 5L, 5M:
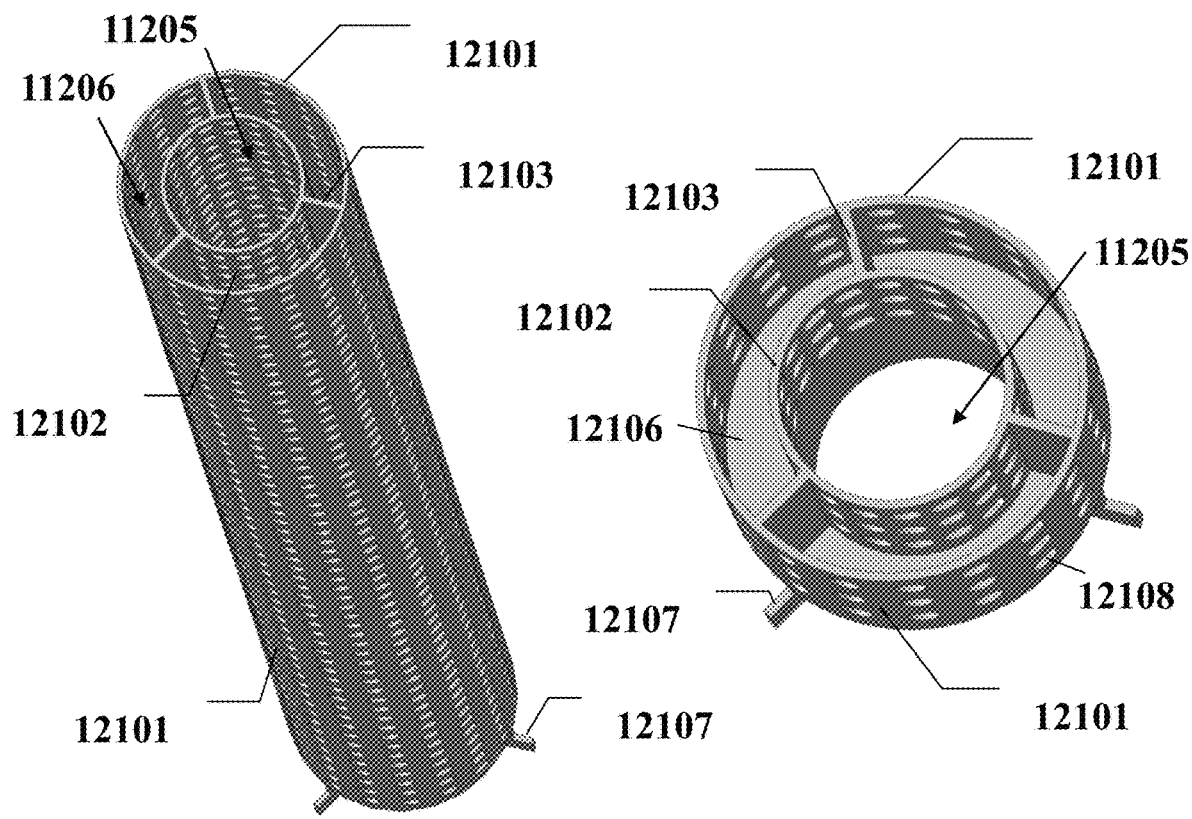

FIG. 5 shows an assembled anode 12 without granular aluminia loaded. As shown in FIG. 5A to FIG. 5E, the anode 12 of each cell typically comprises a electric-conductive frame 121 (also called anode frame 121), an exterior anode membrane mesh 1202, an interior anode membrane mesh 1203, an anode terminal 1204, a mechanical spring lid which is not shown in the figures and granular aluminia which are not filled within the frame in the figures. The anode is made of metal material inactive to the electrolyte except the granular aluminia. FIG. 5F is an anode frame 121. The electric-conductive frame 121 has a construction of two cylinders, the interior cylinder 12102 and the exterior cylinder 12101 as shown in FIG. 5G to FIG. 5M. An annular cylindrical space between the interior cylinder 12102 and the exterior cylinder 12101 is defined for holding the granular aluminia. This annular cylindrical space is called the granular-aluminium reactant chamber 11206 within which the aluminum oxidation occurs. At the bottom of the said two cylinders, there is an annular flat end-plate 12106 as shown in FIG. 5G, FIG. 5I and FIG. 5M. It serves as a connecting structure and also serves as a holding structure to prevent the granular aluminia from leaking from the granular-aluminium reactant chamber 11206. The end-plate 12106 is perforated with small holes which are too small to show in the figures. The holes are a passageway through which seed crystals in electrolyte can pass through. At the top of the interior cylinder 12102, there is a cone-shaped cap 12104. Beneath the cone-shaped cap 12104, the space within the interior cylinder 12102 forms a cylindrical electrolyte-passageway space 11205 for electrolyte circulation from the electrode electrolyte inlet 11203 at the bottom of the interior cylinder 12102. Through the multiple holes 12108 on the curve surfaces of the interior cylinder 12102 and the exterior cylinder 12101, and through the apertures among the granular-aluminia, the electrolyte is further circulated into electrolyte ion-conductive chamber 11207. These passageway stated above is the anode electrolyte-circulation passageway. As shown in FIG. 5J to FIG. 5M and FIG. 5H, there are vertical beams 12103 (typically three beams) which are connecting structures between the interior cylinder 12102 and the exterior cylinder 12101 to strength the anode frame 121 and also to increase the electric-conductivity of the anode frame 121. There are position check bulges 12107 at the bottom of the anode frame 121 for assembling with the cathode. At the upper part of the anode frame 121, there is a current-hydrogen lead-out cylinder 12105 extended from the exterior cylinder 12101 as shown in FIG. 5H. The inner space of the current-hydrogen lead-out cylinder 12105 forms a storage space 11200 of the granular aluminia. The current-hydrogen lead-out cylinder 12105 also serves for sealing the electrolyte, air and hydrogen through the cell base 13, the electrolyte cover 16, the air cover 17, the hydrogen cover 18 with help of screw nuts and screw threads on the respective positions of the cylinder 12105. The screw nuts are not shown in the figures.

Figure 6:
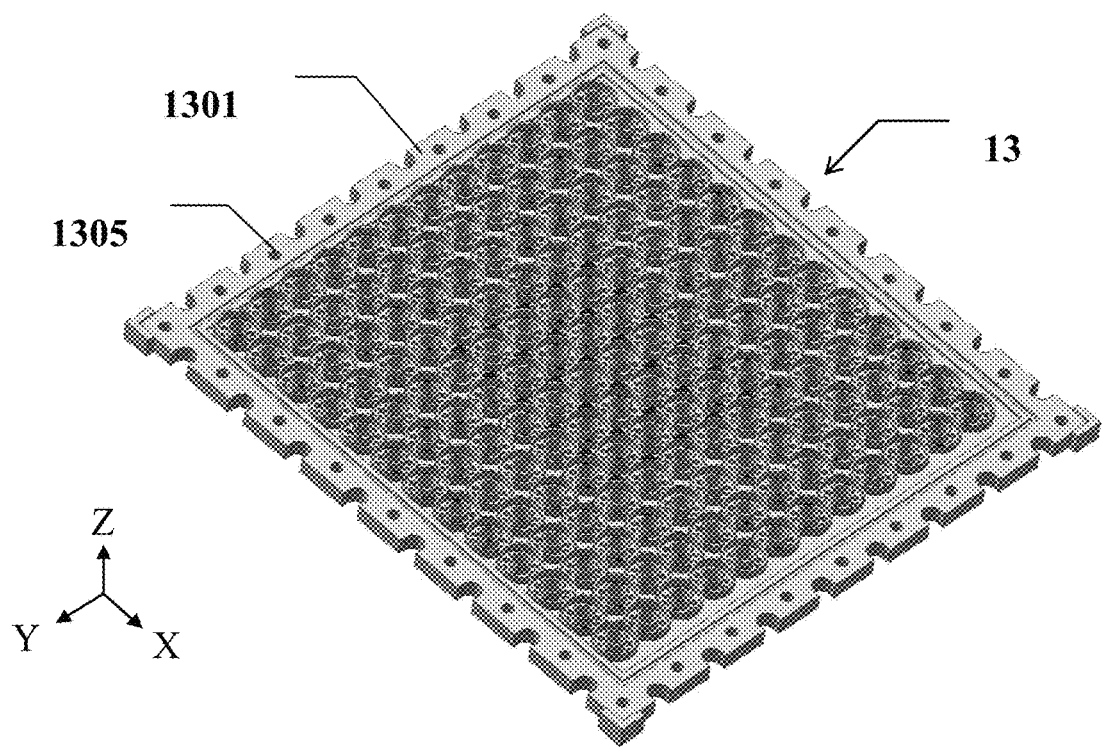
Figure 6A:
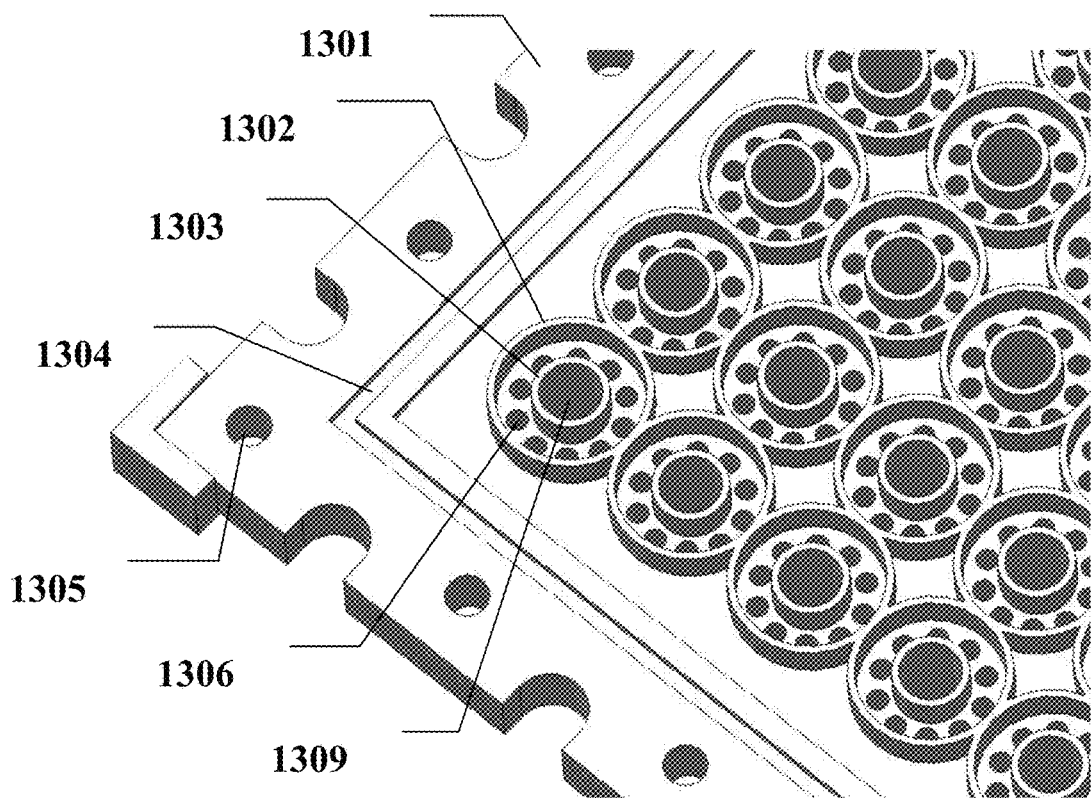
Figure 6B:
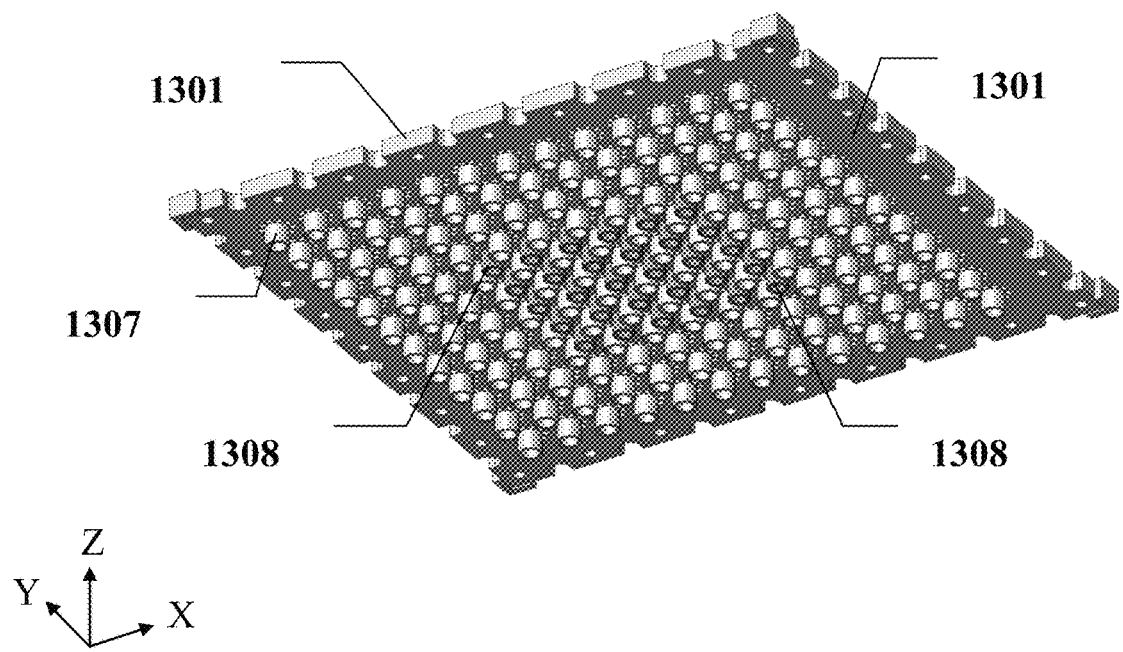
Figure 6C:
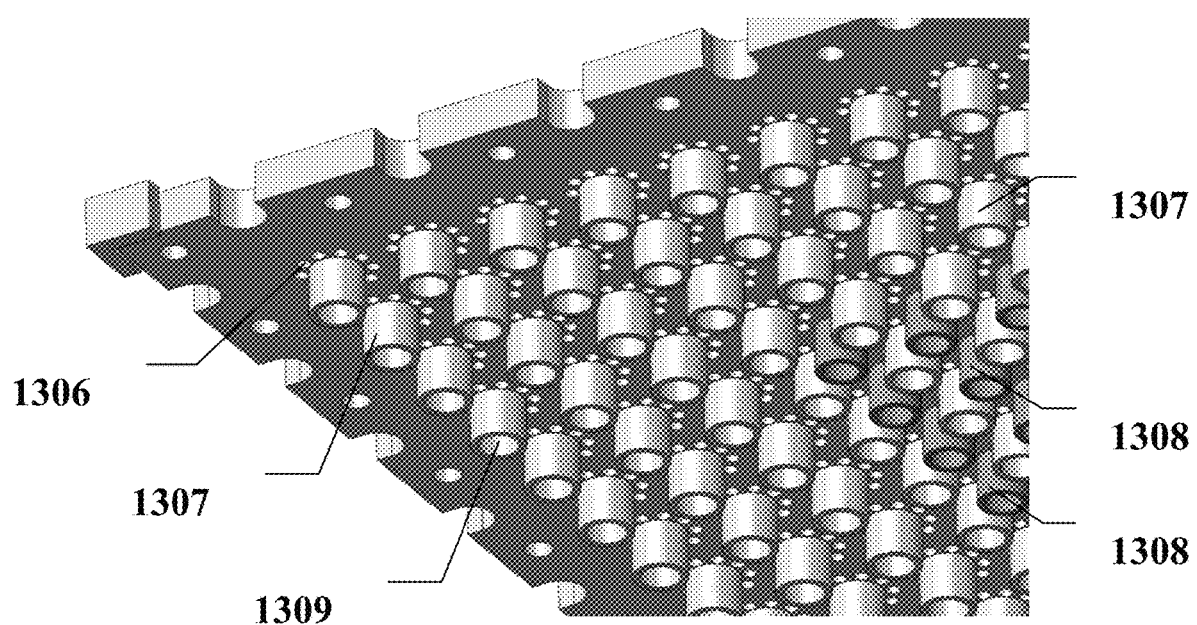
Figure 6D:
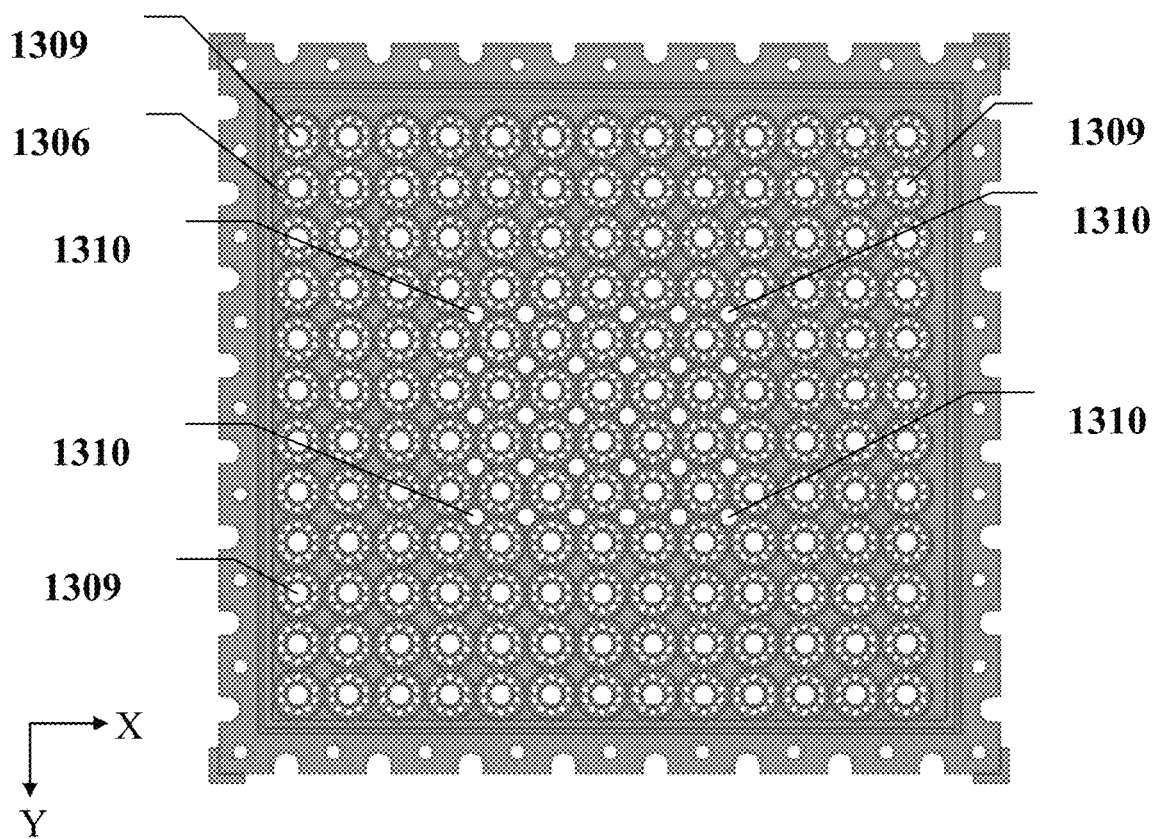
Figure 6E:
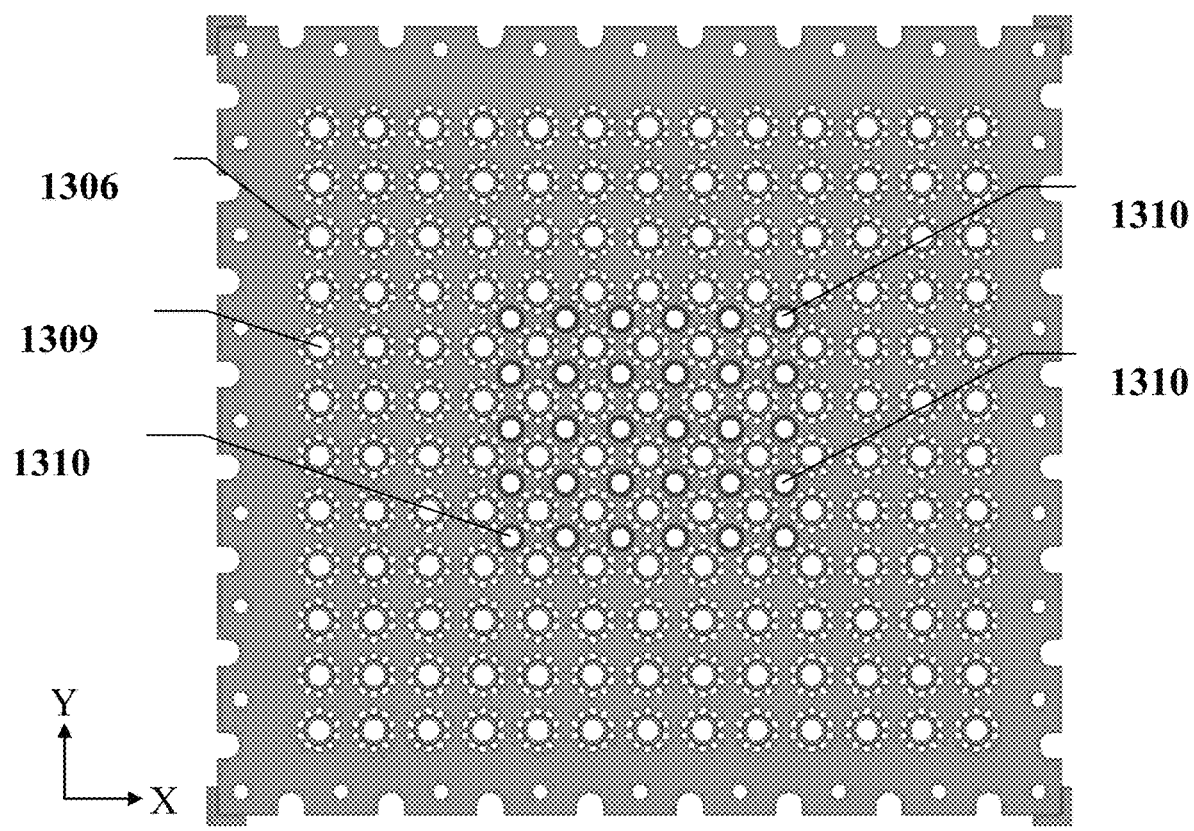

FIG. 6 is a cell base 13 of oblong. On the peripheral side of the base, there are a flange 1301, multiple flange holes 1305 for the stack core 1001 assembling, and a sealing groove 1304 shown in FIG. 6A. In present embodiment shown in FIG. 6 to FIG. 6E, there are 156 cell seats of 12 rows and 13 columns. Each seat consists of a cathode seat 1302, an anode seat 1303, an electrolyte-inlet hole 1309, electrolyte-outlet holes 1306 and an electrolyte-inlet nozzle 1307 as shown in FIG. 6A to FIG. 6E. In the centre of the cell base of present embodiment, there are 30 air-inlet nozzles 1308 and 30 air-inlet holes 1310 of 5 rows and 6 columns as shown in the FIG. 6B to FIG. 6E.

All the cells 112 are assembled on the cell base 13. The electrolyte inlet chamber 20, the electrolyte outlet sink 19, the cell base 13, the cell house 15, the electrolyte cover 16, the air cover 17, the hydrogen cover 18 are assembled orderly from the bottom to the top of the stack core 1101 as shown in FIG. 2 and FIG. 2A. The electrolyte circulation route can be stated as following. From the electrolyte inlet chamber 20, the electrolyte is introduced to the electrode electrolyte inlets 11203 and their connected electrolyte-inlet nozzle 1307 on the cell base through multiple soft pipes 21 which penetrate the electrolyte outlet sink 19. It flows over the anode electrolyte-circulation passageway (referenced as the cylindrical electrolyte-passageway space 11205, the apertures among the granular-aluminia and holes 12108) and flows over the electrolyte ion-conductive chamber 11207. Then it drains into the electrolyte outlet sink 19 through a group of the electrode electrolyte outlets 11204 and their connected electrolyte-outlet holes 1306 on the cell base.

Figure 7:
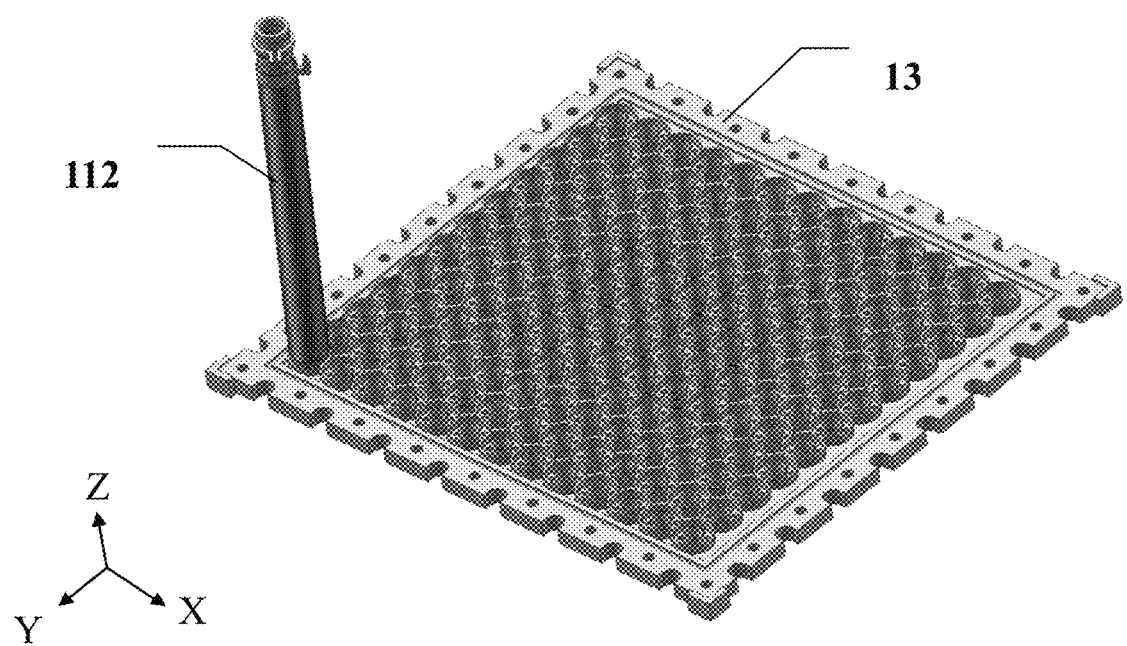
FIG. 7 shows a cylindrical cell assembled on a cell base.
Figure 7A:
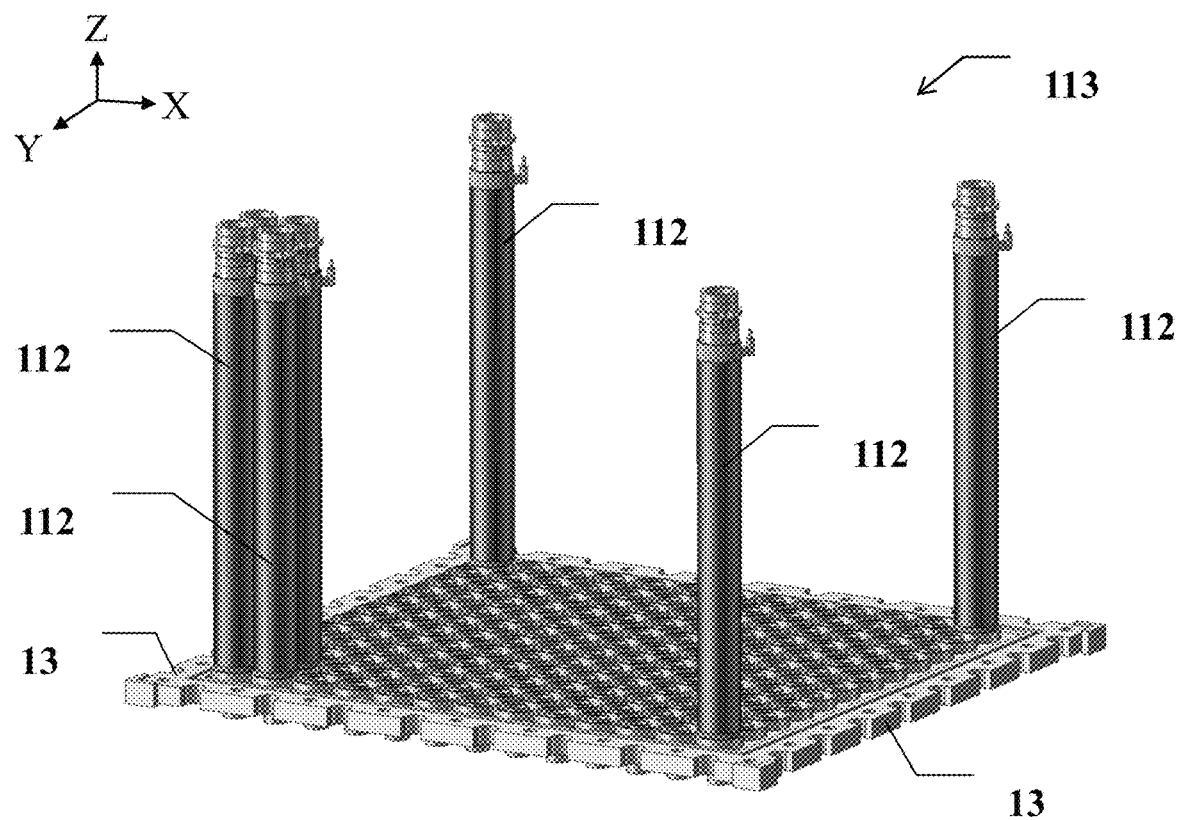
FIG. 7A shows seven cylindrical cells assembled on a cell base.

FIG. 7 shows a cylindrical cell 112 assembled on a cell base 13. It is indistinct to have all 156 cells assembled on the cell base. Therefore in FIG. 7A only seven cylindrical cells 112 are assembled on the cell base 13.

Figure 8:
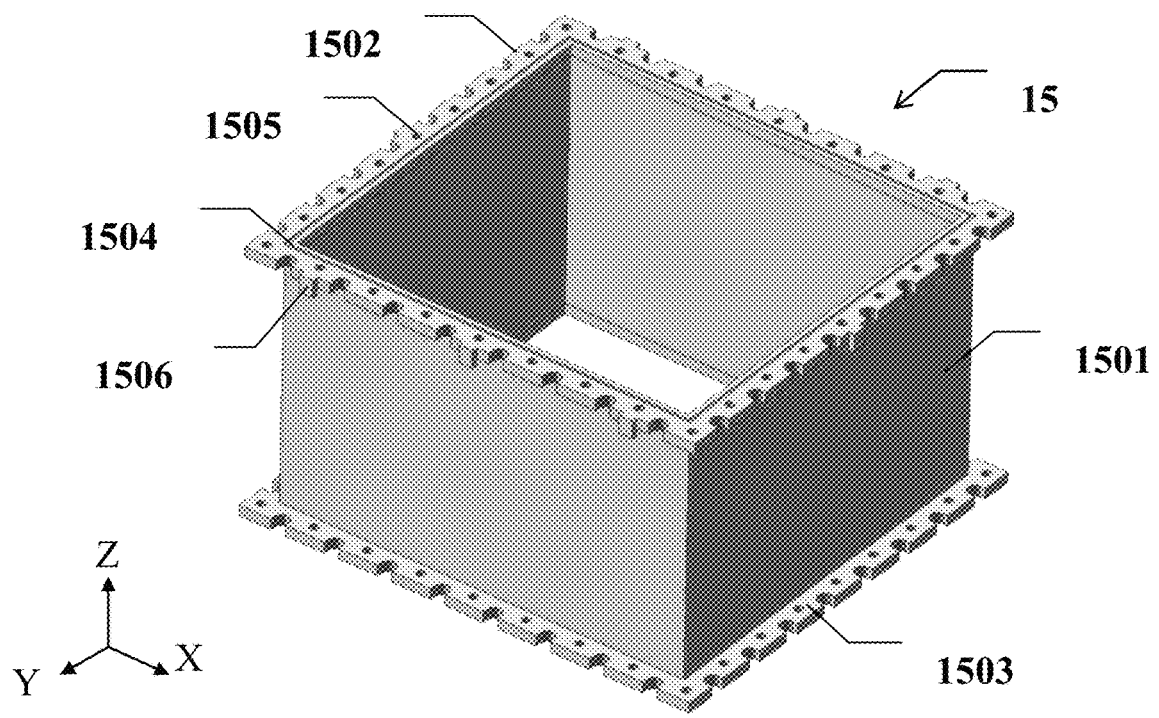
FIG. 8 is a cell house.

FIG. 8 shows a cell house 15. It consists of a house side 1501, an upper flange 1502, a lower flange 1503, sealing grooves 1504 and multiple flange holes 1505 for the stack core 1001 assembling. There are several buckle stakes 1506 for the hydrogen cover 18 and an automatic refilling device, of the granular aluminia, to be fixed.

In FIG. 9, seven cylindrical cells 112 and the cell house 15 are assembled on the cell base 13 to form an assembled part 115. Outside the cylinders of the cathodes 11 of the cell 112 and within the cell house 15, there is a residual space called cathode-air chamber 1151 between the cathodes 11. The reactant gas, such as air, is full of the cathode-air chamber 1151 to maintain the oxygen-reduction reaction on the gas-diffusion cathode 11.

In order to constrain the electrolyte within the electrolyte ion-conductive chamber 11207, it is necessary to have an electrolyte cover 16 as shown in FIG. 10. It comprises an electrolyte-cover base 160, front-rear air-sealing side plates 161 and left-right air-sealing side plates 162 as shown in FIG. 10A and FIG. 10B. On the peripheral side of the electrolyte-cover base 160, there are a flange 1600, multiple flange holes 1605 for the stack core 1001 assembling, and a sealing groove 1604 as shown in FIG. 10A. In present embodiment shown in FIG. 10A, FIG. 10C to FIG. 10G, there are 156 anode-terminal-hydrogen holes 1601 of 12 rows and 13 columns. Each of these anode-terminal-hydrogen holes 1601 has its corresponding cathode seat 1611 as shown in FIG. 10E for the cell assembling. These anode-terminal-hydrogen holes 1601 allow current-hydrogen lead-out cylinders 12105 to penetrate the electrolyte cover 16 and to be sealed by screw nuts. They also allow the electric current to be introduced to the anode terminal 1204. From FIG. 10A and FIG. 10C, it can be seen that there are 156 cathode-terminal-air holes 1609 of 12 rows and 13 columns. These cathode-terminal-air holes 1609 allow the cathode terminal 1103 to penetrate the electrolyte cover 16 for the cells 112 electrically connecting. And they also allow the air in the cathode-air chamber 1151 to penetrate the electrolyte cover 16 and to enter a terminal-air compartment 1617 which is the space confined by the electrolyte cover 16 and the air cover 17. The terminal-air compartment 1617 is indicated by a lead-line arrow 1617 in FIG. 10C, FIG. 10F and FIG. 10G. The air in the terminal-air compartment 1617 enters an air groove 1610 through side holes 1612 as shown in FIG. 10E, FIG. 10F and FIG. 10G. And then the air in the air groove 1610 comes out from air outlet nozzles 1608 under the flange 1600 of the electrolyte cover 16 as shown in FIG. 10D. This is a robust way to control the air circulation. It leads the air to the air collectors 202 (as shown in FIG. 18B) under the rims of the electrolyte inlet chamber 20 through the soft pipes 21 connected between the air collectors 202 and the air-outlet nozzles 1608. In some case when it is not necessary to accurately control the air circulation, the air outlet nozzles 1608 might be designed upward as shown in FIG. 10H. This is a way to simply dump air into the ambient atmosphere through the air outlet nozzles 1608.

In the terminal-air compartment 1617, cathode terminals 1103 and anode terminals 1204 are electrically connected in series. Then first cathode-terminal cable is led out from a stack positive terminal 1603 through a side hole 1614 and last anode-terminal cable is led from a stack negative terminal 1602 through a side hole 1613 as shown in FIG. 10A, FIG. 10D and FIG. 10G. Two signal cables for the stack core controlling are led out from two signal-cable terminals 1607 and 1606 through two side holes 1616 and 1615.

In FIG. 11, FIG. 11A and FIG. 11B, seven cylindrical cells 112, the cell house 15, the electrolyte cover 16 are assembled on the cell base 13 to form an assembled part 116. It can be seen from FIG. 11B that cathode terminals 1103 and anode terminals 1204 can be easily connected in series in the terminal-air compartment 1617.

FIG. 12 is an air cover 17. It includes a flange 1701, multiple flange holes 1705 for the stack core 1001 assembling, and a convex lip 1703 for seal coupling with a sealing groove 1804 as shown in FIG. 14A. In FIG. 12 there are 156 anode-aluminium-hydrogen holes 1702 of 12 rows and 13 columns. It allow current-hydrogen lead-out cylinders 12105 to penetrate the air cover 17 and to be sealed by screw nuts of the mechanical spring lids. The holes on the spring lids allow hydrogen in the current-hydrogen lead-out cylinders 12105 entering the hydrogen-collecting room 1706 which is a space formed between the air cover 17 and the hydrogen cover 18. When the mechanical spring lids are taken away, the granular aluminia can be loaded into the storage space 11200 as shown in FIG. 3D and FIG. 5H.

In FIG. 13 and FIG. 13A, seven cylindrical cells 112, the cell house 15, the electrolyte cover 16, the air cover 17 are assembled on the cell base 13 to form an assembled part 117. It can be seen from FIG. 13 that only the screw-thread part of the cell 112 emerges above the air cover 17 for the mechanical spring lid to be screwed up.

FIG. 14 is a hydrogen cover 18. It includes a cover plate 1801, a sealing groove 1804 bulging on the cover plate 1801, a hydrogen collecting house 1802 which form an upper hydrogen-collecting room 1806, hydrogen outlet nozzles 1803, and buckle seats 1805 to pair with buckle stakes 1506 as shown in FIG. 8. The sealing groove 1804, filling with a gasket, couples with the convex lip 1703 to prevent hydrogen leaking from the hydrogen-collecting room 1706.

In FIG. 15, FIG. 15A and FIG. 15B, seven cylindrical cells 112, the cell house 15, the electrolyte cover 16, the air cover 17, the hydrogen cover 18 are assembled on the cell base 13 to form an assembled part 118. It can be seen from FIG. 15 that the hydrogen cover 18 can be easily removed through a spring buckles (not shown in the figures) which are jointed between the buckle seats 1805 and buckle stakes 1506. Once the hydrogen cover 18 is removed, an automatic refilling device of the granular aluminia can be located on the stack core 1001 through the convex lip 1703 on the air cover 17 and the buckle stakes 1506 on the cell house 15. In this way a vehicle with aluminum-air battery can be quickly refilled with granular-aluminium fuel just like a car filling with oil. In FIG. 15B it can be seen that the electrolyte-outlet holes 1306 (referenced to FIG. 6C for more clear view), the electrolyte-inlet nozzle 1307 and the air-inlet nozzles 1308 have not been explained how they are related to the electrolyte outlet sink 19 and the electrolyte inlet chamber 20. This is stated as following.

FIG. 16 is an electrolyte outlet sink 19. It comprises an electrolyte-outlet-sink base 190, an air sealing plate 192 as shown in FIG. 16A and FIG. 16B. On the electrolyte-outlet-sink base 190, there are a flange 1900, a sealing groove 1904 and multiple flange holes 1905 for the stack core 1001 assembling. After removing the air sealing plate 192, three inside passageways for electrolyte flowing in, electrolyte flowing out and air intaking can be seen more clearly from FIG. 16C to FIG. 16F.

The first group of 156 sink electrolyte-intake holes 1901 forms a U-shape hole group on a funnel-shape house 1910.

On the lower side of the funnel-shape house 1910 there are 156 sink electrolyte-intake nozzles 1911 connected to these holes 1901. When the electrolyte outlet sink 19 is assembled into the assembled part 118, there are 156 soft pipes 21 of proper diameter to make the sink electrolyte-intake nozzles 1911 connected to the electrolyte-inlet nozzles 1307. This allows the electrolyte to penetrate the electrolyte outlet sink 19 to enter the cylindrical cells 112 for circulation. And then it circulates out from the cells 112 entering a funnel-shape electrolyte room 1919 and an electrolyte-precipitate room 1906 through the electrolyte-outlet holes 1306 on the cell base. The funnel-shape electrolyte room 1919 is a space formed by the funnel-shape house 1910 and the electrolyte-precipitate room 1906 is a space formed by an oblong electrolyte house 1916. On the right side of the oblong electrolyte house 1916, there are two bigger sink-electrolyte holes 1903 which connect to two sink-electrolyte outlet nozzles 1913 outside the oblong electrolyte house 1916. Note that the sink electrolyte-intake holes 1901 in the figure are more than 156 for redundance design.

The second group of 30 sink air-intake holes 1902 forms a smaller U-shape hole group on the lower part of the funnel-shape house 1910. On the lower side of the funnel-shape house 1910 there is an air intake house 1917 within which 30 sink air-intake nozzles 1912 are connected to the 30 sink air-intake holes 1902. There is also a sink air-intake room 1907 which is an U-shape space defined by the air intake house 1917, the oblong electrolyte house 1916 and the air sealing plate 192. On the right side of the air intake house 1917, there are two sink air inlets 1908 which are connected to two sink-air nozzles 1918. When the electrolyte outlet sink 19 is assembled into the assembled part 118, there are 30 soft pipes 21 of proper diameter to make the sink air-intake nozzles 1912 connected to the air-inlet nozzles 1308 on the cell base 13. The circulation air flows into the sink air-intake room 1907 from the sink-air nozzles 1918. Then the air in the sink air-intake room 1907 penetrates the electrolyte outlet sink 19 entering the cathode-air chamber 1151 in the cell house 15. On the air intake house 1917, there are a sealing groove 1914 and screw bolt holes 1915 for the air sealing plate 192 assembling.

In FIG. 17 and FIG. 17A, cylindrical cells 112, the cell house 15, the electrolyte cover 16, the air cover 17, the hydrogen cover 18 and the electrolyte outlet sink 19 are assembled on the cell base 13 to form an assembled part 119. It can be seen that the sink-electrolyte outlet nozzles 1913, the sink-air nozzles 1918 have not been explained how they are related to the electrolyte inlet chamber 20. This is stated as following.

FIG. 18 is an electrolyte inlet chamber 20. It comprises an electrolyte-inlet-chamber base 200 and four air collectors 202 as shown in FIG. 18A and FIG. 18B. On the air collector 202, there are air-collector-inlet nozzles 2021, air-collector nozzles 2023, an air collector base 2022, fixing plates 2024 and screw-bolt holes 2025 for the air collector 202 installing on the fixing seats 2014 and their screw-bolt holes 2015 as shown in FIG. 18D. Four air collectors 202 can be connected through soft pipe 21 of proper diameter to form two stack-air-outlet nozzles which are two of the air-collector nozzles 2023.

On the electrolyte-inlet-chamber base 200, there are a flange 2000, a sealing groove 2004, flange holes 2005 for the stack core 1001 assembling, stack seats 2007 and screw-bolt holes 2008 for the installation of the stack core 1001. Two stack-electrolyte inlets 2001, two stack-electrolyte outlets 2003, two stack-air inlets 2002 are respectively connected to two stack-electrolyte-inlet nozzles 2011, two stack-electrolyte-outlet nozzles 2013, two stack-air-inlet nozzles 2012 to form three passageways of electrolyte flowing in, electrolyte flowing out and air intaking as shown in FIG. 18C and FIG. 18D. The electrolyte flows into an electrolyte-inlet compartment 2006 through the stack-electrolyte inlets 2001 and the stack-electrolyte-inlet nozzles 2011. The electrolyte-inlet compartment 2006 is a space confined between the electrolyte inlet chamber 20 and the electrolyte outlet sink 19. A vibrator which is not shown in above figures can be fixed between two stack seats 2007 under the air collector 202.

In FIG. 19 and FIG. 2, cylindrical cells 112, the cell house 15, the electrolyte cover 16, the air cover 17, the hydrogen cover 18, the electrolyte outlet sink 19 and the electrolyte inlet chamber 20 are assembled on the cell base 13 to form an assembled stack core 1001. From FIG. 19, it can be seen that the sink-electrolyte outlet nozzles 1913, the sink-air nozzles 1918 can be respectively connected to the stack-electrolyte-outlet nozzles 2013 and the stack-air-inlet nozzles 2012 through the soft pipes 21 of proper diameters.

The electrolyte-circulation route in the stack core 1001 is given as following. From the stack-electrolyte-inlet nozzles 2011 of the electrolyte inlet chamber 20, the electrolyte enters the electrolyte-inlet compartment 2006. Through the soft pipes 21 connected from the sink electrolyte-intake nozzles 1911 to the electrolyte-inlet nozzles 1307, it flows over the anode electrolyte-circulation passageway (referenced as the cylindrical passageway space 11205 and holes 12108) and flows over the electrolyte ion-conductive chamber 11207. Then it flows into the funnel-shape electrolyte room 1919 of the electrolyte outlet sink 19 through a group of the electrode electrolyte outlets 11204 and their connected electrolyte-outlet holes 1306 on the cell base. Through the soft pipes 21 connected from the sink-electrolyte outlet nozzles 1913 to the stack-electrolyte-outlet nozzles 2013, it further flows from the electrolyte-precipitate room 1906 to the outside of the stack core 1001. The stack-electrolyte-outlet nozzles 2013 and the stack-electrolyte-inlet nozzles 2011 are respectively connected to the outlet pipe 1011, the inlet pipe 1013 of the electrolyte circulation system as shown in FIG. 1.

The air-circulation route in the stack core 1001 is given as following. The air flows into the sink air-intake room 1907 through the soft pipes connected from the stack-air-inlet nozzles 2012 to the sink-air nozzles 1918. It enters the cathode-air chamber 1151 through the soft pipes connected from the sink air-intake nozzles 1912 to the air-inlet nozzles 1308. Then it flows into the terminal-air compartment 1617 and the air groove 1610 through the cathode-terminal-air holes 1609 and the side holes 1612. And then it flows into the air collectors 202 through the soft pipes connected from the air outlet nozzles 1608 to the air-collector-inlet nozzles 2021. The stack-air-outlet nozzles which are two of the air-collector nozzles 2023, the stack-air-inlet nozzles 2012 are respectively connected to the outlet pipe 1017, the inlet pipe 1012 of the air circulation system as shown in FIG. 1.

The hydrogen-collection route in the stack core 1001 is given as following. The hydrogen is generated from the cylindrical cells 112. It flows into the hydrogen-collecting room 1706. Then it enters the hydrogen utilization system 3000 through the hydrogen outlet nozzles 1803 connected to the pipe 1016 as shown in FIG. 1.

In the embodiment of present invention, the granular aluminia can be quickly loaded into the cylindrical cells 112 by the automatic refilling device of the granular aluminia. It

Example 1

297 cylindrical cells were assembled into a battery stack core and were connected in series to form an aluminum-air battery with electric power 30 kilowatts (kW). The dimension of the stack core measured in meter is length 1.273 m×width 0.591 m×height 0.830 m. Similarly, 198 cells were assembled into a 20 kW stack core with the dimension of 0.899 m×0.591 m×0.830 m. Both of the batteries were designed at the electrode power density of 0.252 Watt per square centimeter. A battery group of two 30 kW aluminum-air batteries and one 20 kW aluminum-air battery gives total power 80 kW which is typically the supply power for a car. The granular aluminia filling in the battery group provide a power capacity of 1432.0 kilowatt hours (kWh). The hydrogen produced by the battery group during the battery discharging is reserved into a 105 litre vessel with pressure resistant capacity of 40 mPa (Megapascal). This 105 L×40 mPa hydrogen can supply a 5 kW hydrogen fuel battery as a second power for 17.9 hours. This 89.5 kWh is not included in the power capacity of 1432.0 kWh.

Example 2

In this example, two 30 kW aluminum-air batteries combined with one 20 kW hydrogen fuel battery form a battery group of total power 80 kW. The hydrogen is prefilled into a 350 L×40 mPa vessel to secure a power capacity from hydrogen fuel battery at the beginning of battery discharge. The dimension of the stack core of the 30 kW aluminum-air batteries is 1.273 m×0.591 m×0.741 m with the height lower than the example 1 and with the electrode power density unchanged. In this case, the granular aluminia filling in two 30 kW batteries combined with hydrogen prefilled in the 350×40 mPa vessel provide a power capacity of 1160.0 kWh. The hydrogen produced by above two 30 kW aluminum-air batteries during the battery discharging can be replenished into the 350×40 mPa vessel. But this accompanied hydrogen is not calculated into the power capacity of 1160.0 kWh.

Example 3

In this example, 775 cylindrical cells were assembled into a battery stack core and were connected in series to form an aluminum-air battery with electric power 80 kilowatts (kW). The dimension of the stack core measured in meter is length 1.443 m×width 1.187 m×height 0.830 m. This one single battery provides a power capacity of 1432.0 kilowatt hours (kWh) with other parameters same as Example 1.

I claim:

1. A compact battery, comprising:
   a stack core;
   an electrolyte;
   wherein the stack core comprises:
     two or more cylindrical cells which are further assembled from a cylindrical cathode and a cylindrical anode;
     a cell base including cell seats, electrolyte-inlet holes, electrolyte-outlet holes, an electrolyte-inlet nozzle, air-inlet nozzles, air-inlet holes, a first flange, and first flange holes;
     a cell house including a house side, an upper flange, a lower flange, and buckle stakes;
     an electrolyte cover including anode-terminal-hydrogen holes, cathode seats, an air groove, side holes, air-sealing side plates, air outlet nozzles, a stack positive terminal, a stack negative terminal, signal-cable terminals, a third flange, third flange holes;
     an air cover including anode-aluminium-hydrogen holes, a convex lip, a fourth flange, fourth flange holes;
     a hydrogen cover including an upper hydrogen-collecting room, hydrogen outlet nozzles, buckle seats, a cover plate;
     an electrolyte outlet sink including sink electrolyte-intake holes, sink electrolyte-intake nozzles, a funnel-shape house, a funnel-shape electrolyte room, an electrolyte-precipitate room, sink-electrolyte holes, sink-electrolyte outlet nozzles, sink air-intake holes, an air intake house, a sink air-intake room, sink air-intake nozzles, sink air inlets, sink-air nozzles, an air sealing plate, a sixth flange, sixth flange holes;
     an electrolyte inlet chamber including stack-electrolyte inlets, stack-electrolyte outlets, stack-air inlets, stack-electrolyte-inlet nozzles, stack-electrolyte-outlet nozzles, stack-air-inlet nozzles, an electrolyte-inlet compartment, air collectors, stack seats, a seventh flange, seventh flange holes; and
     a vibrator, having fixing seats and screw-bolt holes;
   wherein the two or more cylindrical cells comprise granular aluminia loaded into a plurality of granular-aluminium reactant chambers and storage spaces as anode reactant without necessity of removing unconsumed anode aluminium;
   wherein an automatic refilling device is positioned and fixed on the convex lip of the air cover by connection through the buckle stakes on the cell house,
   wherein a cathode-anode gap defined by an electrolyte ion-conductive chamber, within the two or more cells of the stack core, is unchanged as the granular aluminia is consumed, so that an internal resistance of the compact battery is kept unchanged when the compact battery discharges;
   wherein a plurality of electrolyte-circulation channels within the stack core are defined through the stack-electrolyte-inlet nozzles, the electrolyte-inlet compartment, the sink electrolyte-intake nozzles, a first plurality of soft pipes, the electrolyte-inlet nozzle, the electrode electrolyte inlets, a plurality of anode electrolyte-circulation passageways, the electrolyte ion-conductive chamber, a plurality of electrode electrolyte outlets, the funnel-shape electrolyte room, the electrolyte-precipitate room, the sink-electrolyte outlet nozzles, a second plurality of soft pipes, and the stack-electrolyte-outlet nozzles which are connected to an electrolyte circulation system outside the stack core
   wherein a sharing air circulation channel within the stack core is constructed through the stack-air-inlet nozzles, the sink air-intake room, the sink air-intake nozzles, a third plurality of soft pipes, the air-inlet nozzles, a cathode-air chamber, a terminal-air compartment, a plurality of air-outlet nozzles, the air collectors, and a plurality of stack-air-outlet nozzles which are connected to an air circulation system outside the stack core;
   wherein a plurality of hydrogen collection channels within the stack core are constructed through a plurality of current-hydrogen lead-out cylinders, a hydrogen-collecting room, the upper hydrogen-collecting room, and the hydrogen outlet nozzles which are connected to a hydrogen utilization system outside the stack core;

further comprising means for enhancing electrolyte-ion conductivity in the electrolyte ion-conductive chamber comprising:

electrolyte circulation in the anode electrolyte-circulation passageways to push aluminates and aluminium hydroxides in the electrolyte away from the granular aluminia in the plurality of granular-aluminium reactant chambers, into the electrolyte ion-conductive chamber and further into the electrolyte outlet sink, a quantity of seed crystals, in the electrolyte outlet sink, which make part of the aluminium hydroxides precipitate into precipitates of first aluminium hydroxides so that some of the aluminates can be shifted into second aluminium hydroxides and second hydroxide ions, an air-heat exchanger, in the electrolyte circulation system, which cools the electrolyte outside the stack core so that another part of the aluminates in the cooled electrolyte will decompose into third aluminium hydroxides and third hydroxide ions, a precipitate-filtering pump, in the electrolyte circulation system, which removes the precipitates of the first aluminium hydroxides, precipitates of the second aluminium hydroxides, precipitates of the third aluminium hydroxides, from the cooled electrolyte so that the precipitates of the first, second, third aluminium hydroxides can not be reversed into the aluminates, and the second hydroxide ions, the third hydroxide ions can not be consumed during a subsequent process of electrolyte heating by a electrolyte heater in the electrolyte circulation system, a pressure pump in the electrolyte circulation system to make the electrolyte with the second hydroxide ions, the third hydroxide ions return to the cells within the stack core;

means for enhancing oxygen-reduction reactions on the cylindrical cathodes of the cells within the stack core, and means for utilizing thermal energy of hot electrolyte through the air-heat exchanger, in the electrolyte circulation system, which makes use of the thermal energy of the hot electrolyte produced in the cells, and increases supplied air temperature within the cathode-air chamber, so that the oxygen-reduction reactions of the cells are enhanced with the increase of the supplied air temperature.

2. The compact battery according to claim 1 wherein the cylindrical cathode is constructed and assembled from:

a multi-layer cathode electrode including a catalytic active layer, a hydrophobic layer and a current collector;

a support frame which is made of non-conductive material inactive to the electrolyte, including an upper support ring, vertical beams, and a lower support ring;

and a cathode electric connector including a cathode terminal, an electric conductive ring which is electrically connected to the current collector.

3. The compact battery according to claim 1 wherein the cylindrical anode, which is made of metal material inactive to the electrolyte except the granular aluminia, with an electric-conductive frame including an interior cylinder, an exterior cylinder, vertical beams, an annular flat end-plate, a cone-shaped cap, position check bulges and the current-hydrogen lead-out cylinder, is constructed and assembled from:

the interior cylinder perforated with first holes of diameters varying from 2.5 millimeter to 5.0 millimeter;

the exterior cylinder perforated with second holes of diameters varying from 2.5 millimeter to 5.0 millimeter;

the vertical beams which connect the interior cylinder with the exterior cylinder;

the annular flat end-plate perforated with third holes of diameter of 1.0 to 5.0 micron;

the cone-shaped cap which is configured to separate a cylindrical electrolyte-passageway space from the storage spaces of the granular aluminia;

the current-hydrogen lead-out cylinder, machined with two screw threads at sealing positions of the electrolyte cover and the air cover;

exterior anode membrane mesh and interior anode membrane mesh, each having first apertures of 1.0 to 5.0 micron;

an anode terminal;

a mechanical spring lid perforated with fourth holes which are means for hydrogen escaping;

and the granular aluminia.

4. The compact battery according to claim 3 wherein the electric-conductive frame defines The plurality of granular-aluminium reactant chamber which is a space between the interior cylinder and the exterior cylinder;

at least one of the plurality of anode electrolyte-circulation passageways which is formed through the second holes on the exterior cylinder, the first holes on the interior cylinder, the first apertures of the exterior anode membrane mesh and the interior anode membrane mesh, second apertures among the granular aluminia and the cylindrical electrolyte-passageway space within the interior cylinder under the cone-shaped cap;

a storage space within the current-hydrogen lead-out cylinder for storing granular aluminia;

a first passageway within the current-hydrogen lead-out cylinder which is a means for granular-aluminium loading;

a second passageway within the current-hydrogen lead-out cylinder which is a means for the hydrogen escaping.

5. The compact battery according to claim 4 wherein the at least one of the plurality of anode electrolyte-circulation passageways provides means to control flowing patterns of the electrolyte circulation in the electrolyte ion-conductive chamber, and to enhance the electrolyte-ion conductivity and aluminate diffusion in the electrolyte ion-conductive chamber through adjusting perforated rates on the interior cylinder and the exterior cylinder.

6. The compact battery according to claim 3 wherein the electric-conductive frame, combined with the exterior anode membrane mesh and the interior anode membrane mesh, the granular aluminia, the mechanical spring lid, the vibrator, and the anode terminal, provides an electric-conductive means.

7. The compact battery according to claim 3, wherein the first apertures of the exterior anode membrane mesh and the interior anode membrane mesh, the third holes of the annular flat end-plate, and the vibrator provides a means for the seed crystals leaking into the electrolyte outlet sink, wherein the granular aluminia in the granular-aluminium reactant chamber are minified into the seed crystals through aluminum oxidation.

8. The compact battery according to claim 1 wherein the stack core provides means for enhancing precipitation of aluminium hydroxide into the electrolyte-precipitate room through the funnel-shape electrolyte room in which the seed crystals combine with the aluminium hydroxides and grow into the precipitates of the first aluminium hydroxides, the precipitates of the first aluminium hydroxides drop onto the funnel-shape house with direction of gravity and with direction of the electrolyte circulation, and the precipitates of the first aluminium hydroxides on the funnel-shape house slide with flow into the electrolyte-precipitate room with help of the vibrator.

9. The compact battery according to claim 1:
wherein the electrolyte circulation system comprises
first storage-transmittal components including a fresh-water tank, an electrolyte-storage tank, a precipitate-collecting tank, powder vessels, a first plurality of pipes;
and first controlling elements including a water-distillation device, the air-heat exchanger, the precipitate-filtering pump, a powder-water mixing pump, the electrolyte heater, the first powder-feeding device, second powder-feeding device, first valves;
wherein the air circulation system comprises second pipes and second controlling elements which include second valves, a second air pump and the air-heat exchanger;
wherein the hydrogen utilization system comprises a hydrogen-fuel battery which is a variant of the stack core, second storage-transmittal components including third pipes, a hydrogen reserve vessel, and third controlling elements including third valves and third air pumps.

10. The compact battery according to claim 9 wherein the hydrogen utilization system combined with the hydrogen collection channel within the stack core provides
means for making use of the hydrogen generated by the cells within the stack core,
means for adjusting the electric power demand,
means for storing spare hydrogen into the hydrogen reserve vessel and controlling hydrogen supply through the hydrogen-fuel battery, and the second storage-transmittal components.

11. The compact battery according to claim 9 wherein the electrolyte circulation system provides:
means for producing fresh electrolyte and injecting the fresh electrolyte into the stack core through the first storage-transmittal components,
means for adding the seed crystals into the electrolyte through the storage-transmittal components and the first controlling elements.

* * * * *